(12) United States Patent
Lee et al.

(10) Patent No.: US 12,155,470 B2
(45) Date of Patent: Nov. 26, 2024

(54) METHOD AND APPARATUS FOR TRANSMITTING AND RECEIVING SIGNAL BY USING MULTIPLE ANTENNAS IN WIRELESS COMMUNICATION SYSTEM

(71) Applicant: LG ELECTRONICS INC., Seoul (KR)

(72) Inventors: Jong Ku Lee, Seoul (KR); Jongwoong Shin, Seoul (KR); Sunam Kim, Seoul (KR); Sungjin Kim, Seoul (KR); Sung Ryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/006,690

(22) PCT Filed: Jul. 29, 2020

(86) PCT No.: PCT/KR2020/010021
§ 371 (c)(1),
(2) Date: Jan. 24, 2023

(87) PCT Pub. No.: WO2022/025316
PCT Pub. Date: Feb. 3, 2022

(65) Prior Publication Data
US 2023/0269024 A1  Aug. 24, 2023

(51) Int. Cl.
*H04L 1/00* (2006.01)
*H04L 1/06* (2006.01)
*H04L 1/1812* (2023.01)

(52) U.S. Cl.
CPC .......... *H04L 1/0026* (2013.01); *H04L 1/0003* (2013.01); *H04L 1/0009* (2013.01); *H04L 1/06* (2013.01); *H04L 1/1812* (2013.01)

(58) Field of Classification Search
CPC ................ H04L 1/0026; H04L 1/0003; H04L 1/0009; H04L 1/06; H04L 1/1812; H04L 1/08;
(Continued)

(56) References Cited

U.S. PATENT DOCUMENTS

| | | | |
|---|---|---|---|
| 10,425,201 B2 * | 9/2019 | Kim | ............... H04L 1/0009 |
| 2006/0023624 A1 * | 2/2006 | Han | ............... H04W 52/346 |
| | | | 370/204 |

(Continued)

FOREIGN PATENT DOCUMENTS

CN    104868944    8/2015

OTHER PUBLICATIONS

PCT International Application No. PCT/KR2020/010021, International Search Report dated Apr. 27, 2021, 4 page.
(Continued)

*Primary Examiner* — James C Kerveros
(74) *Attorney, Agent, or Firm* — LEE, HONG, DEGERMAN, KANG & WAIMEY

(57) ABSTRACT

A method of operating a terminal and a base station in a wireless communication system and apparatus supporting them are disclosed. A method of operating a first apparatus in a wireless communication system comprises transmitting a pilot signal to a second apparatus, determining at least one coding rate and modulation order based on channel information generated based on the pilot signal, channel-coding a transport block according to the at least one coding rate and modulation order, and transmitting at least one modulation symbol generated based on a second part of the transport block to the second apparatus through a transmit antenna combination determined based on a first part of the channel-coded transport block.

20 Claims, 36 Drawing Sheets

(58) Field of Classification Search
CPC ....... H04L 1/00; H04L 1/1671; H04B 7/0413; H04B 7/06
USPC ........................................................ 714/750
See application file for complete search history.

(56) References Cited

U.S. PATENT DOCUMENTS

| | | | |
|---|---|---|---|
| 2012/0213111 A1* | 8/2012 | Shimezawa | H04L 1/0026 370/252 |
| 2019/0363761 A1 | 11/2019 | Ferrante et al. | |
| 2020/0145069 A1 | 5/2020 | Ferrante et al. | |
| 2023/0057169 A1* | 2/2023 | Li | H04L 5/0057 |
| 2024/0032041 A1* | 1/2024 | Dai | H04L 1/1861 |

OTHER PUBLICATIONS

Zheng et al., "Soft Demodulation Algorithms for Generalized Spatial Modulation Using Deterministic Sequential Monte Carlo," IEEE Transactions on Wireless Communications, vol. 16, Issue: 6, Jun. 2017, 17 pages.

Xiao et al., "Transmit Antenna Combination Optimization for Generalized Spatial Modulation Systems," IEEE Access, vol. 6, Jul. 2018, 19 pages.

* cited by examiner

METHOD AND APPARATUS FOR TRANSMITTING AND RECEIVING SIGNAL BY USING MULTIPLE ANTENNAS IN WIRELESS COMMUNICATION SYSTEM

CROSS-REFERENCE TO RELATED APPLICATION(S)

This application is the National Stage filing under 35 U.S.C. 371 of International Application No. PCT/KR2020/010021, filed on Jul. 29, 2020, the contents of which are all hereby incorporated by reference herein in its entirety.

TECHNICAL FIELD

The following description relates to a wireless communication system, and, more particularly, to a method and apparatus for transmitting and receiving signals using multiple antennas in a wireless communication system.

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure relates to a method and apparatus for more efficiently transmitting and receiving signals using multiple antennas in a wireless communication system.

The present disclosure relates to a method and apparatus for using a generalized spatial modulation (GSM) technique together with adaptive modulation and coding (AMC) in a wireless communication system.

The present disclosure relates to a method and apparatus for using a generalized spatial modulation (GSM) technique together with a hybrid automatic repeat and request (HARQ) technique in a wireless communication system.

The technical objects to be achieved in the present disclosure are not limited to the above-mentioned technical objects, and other technical objects that are not mentioned may be considered by those skilled in the art through the embodiments described below.

As an example of the present disclosure, a method of operating a first apparatus in a wireless communication system may comprise transmitting a pilot signal to a second apparatus, determining at least one coding rate and modulation order based on channel information generated based on the pilot signal, channel-coding a transport block according to the at least one coding rate and modulation order, and transmitting at least one modulation symbol generated based on a second part of the transport block to the second apparatus through a transmit antenna combination determined based on a first part of the channel-coded transport block. Here, the channel information may comprise first information related to first channel quality for a transmit antenna combination (TAC), second information related to second channel quality for modulation symbols and third information related to third channel quality for modulation symbols reflecting effects of burst error.

As an example of the present disclosure, a method of operating a second apparatus in a wireless communication system may comprise receiving a pilot signal from a first apparatus, generating channel information based on the pilot signal, and receiving a channel-coded transport block according to at least one coding rate and modulation order determined based on the channel information. The channel information may comprise first information related to first channel quality for a transmit antenna combination (TAC), second information related to second channel quality for modulation symbols and third information related to third channel quality for modulation symbols reflecting effects of burst error.

As an example of the present disclosure, a first apparatus in a wireless communication system comprises a transceiver and a processor coupled to the transceiver. The processor may transmit a pilot signal to a second apparatus, determine at least one coding rate and modulation order based on channel information generated based on the pilot signal, channel-code a transport block according to the at least one coding rate and modulation order, and transmit at least one modulation symbol generated based on a second part of the transport block to the second apparatus through a transmit antenna combination determined based on a first part of the channel-coded transport block. Here, the channel information may comprise first information related to first channel quality for a transmit antenna combination (TAC), second information related to second channel quality for modulation symbols and third information related to third channel quality for modulation symbols reflecting effects of burst error.

As an example of the present disclosure, a second apparatus in a wireless communication system comprises a transceiver and a processor coupled to the transceiver. The processor may receive a pilot signal from a first apparatus, generate channel information based on the pilot signal, and receive a channel-coded transport block according to at least one coding rate and modulation order determined based on the channel information. The channel information may comprise first information related to first channel quality for a transmit antenna combination (TAC), second information related to second channel quality for modulation symbols and third information related to third channel quality for modulation symbols reflecting effects of burst error.

The above-described aspects of the present disclosure are only a part of the preferred embodiments of the present disclosure, and various embodiments reflecting technical features of the present disclosure may be derived and understood by those skilled in the art on the basis of the detailed description of the present disclosure provided below.

The following effects may be produced by embodiments based on the present disclosure.

According to the present disclosure, errors may be reduced in use of a generalized spatial modulation (GSM) technique in a wireless communication system.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

DETAILED DESCRIPTION

Figure 1:
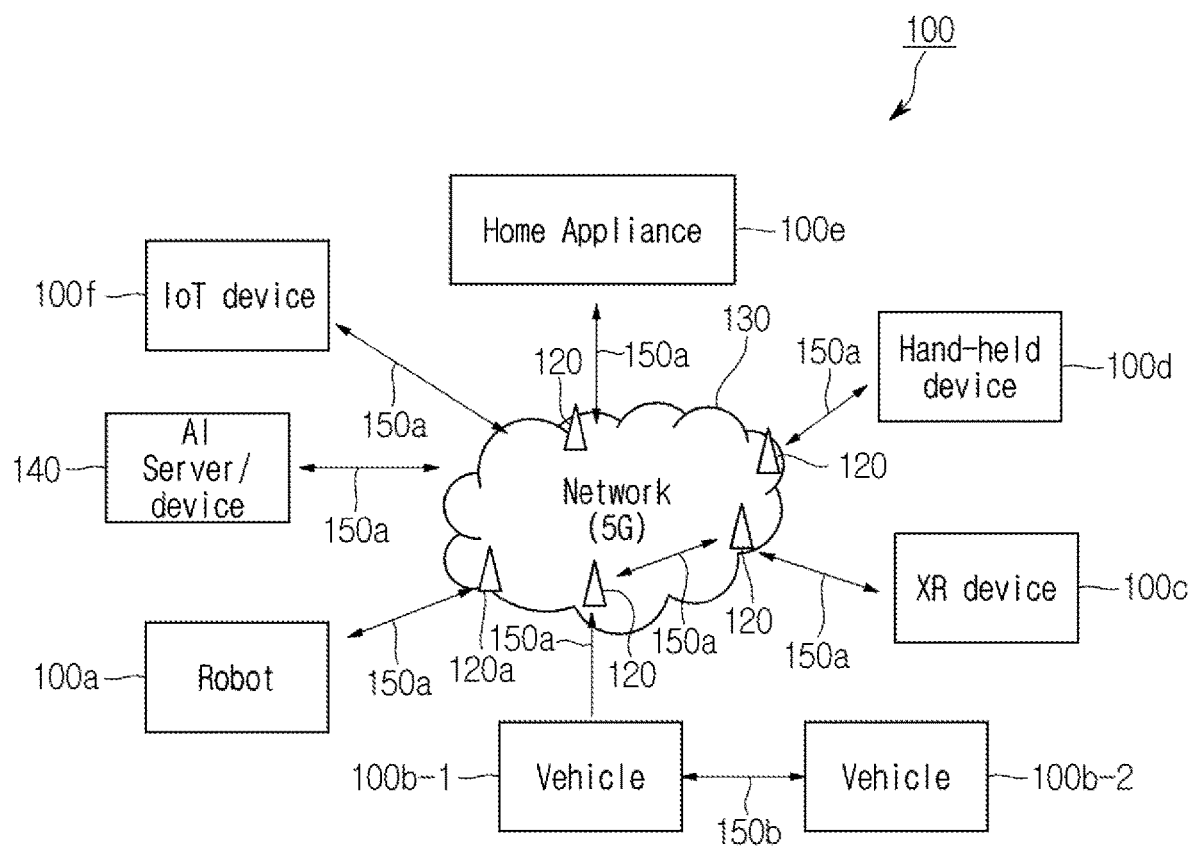
FIG. 1 is a view showing an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an UpLink (UL). Likewise, the mobile station may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include a unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Wireless Device Applicable to the Present Disclosure

Figure 2:
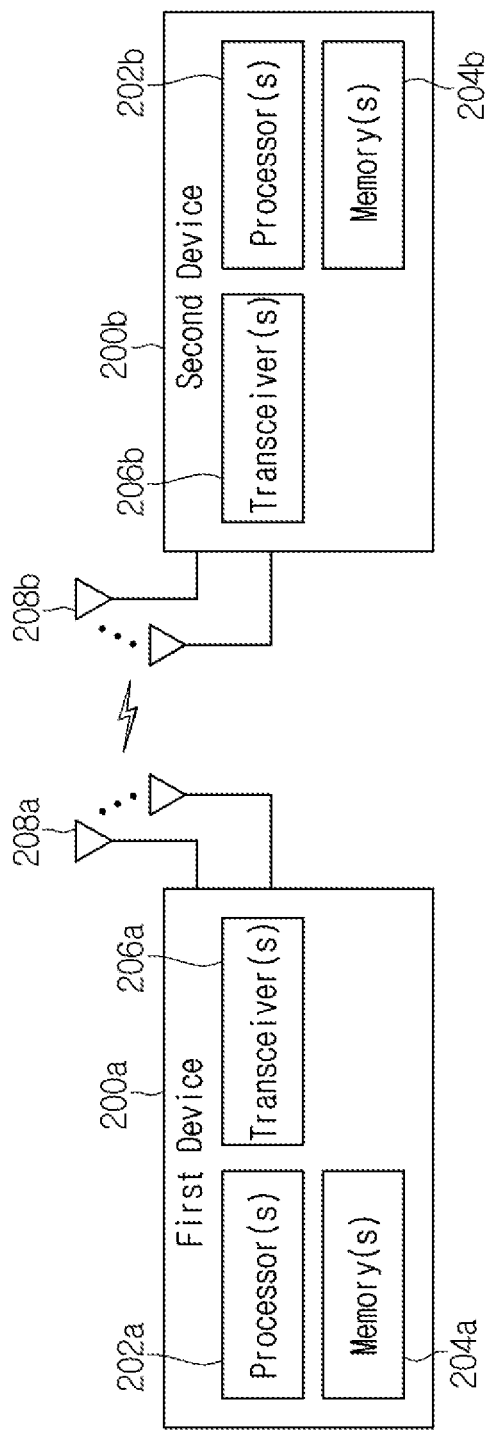
FIG. 2 is a view showing an example of a wireless apparatus applicable to the present disclosure.

FIG. 2 is a view showing an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be connected with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be connected with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be connected with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be connected with the processor 202b to transmit and/or receive radio signals through one or more antennas 208b. The transceiver 206b may include a transmitter and/or a receiver. The transceiver 206b may be used interchangeably with a radio frequency (RF) unit. In the present disclosure, the wireless device may refer to a communication modem/circuit/chip.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs) and/or one or more service data unit (SDU) according to the descriptions, functions, procedures, proposals, methods and/or operational flowcharts disclosed herein. One or more processors 202a and 202b may generate messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be connected with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be connected with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. For example, one or more transceivers 206a and 206b may be connected with one or more processors 202a and 202b to transmit/receive radio signals. For example, one or more processors 202a and 202b may perform control such that one or more transceivers 206a and 206b transmit user data, control information or radio signals to one or more other apparatuses. In addition, one or more processors 202a and 202b may perform control such that one or more transceivers 206a and 206b receive user data, control information or radio signals from one or more other apparatuses. In addition, one or more transceivers 206a and 206b may be connected with one or more antennas 208a and 208b, and one or more transceivers 206a and 206b may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Structure of Wireless Device Applicable to the Present Disclosure

Figure 3:
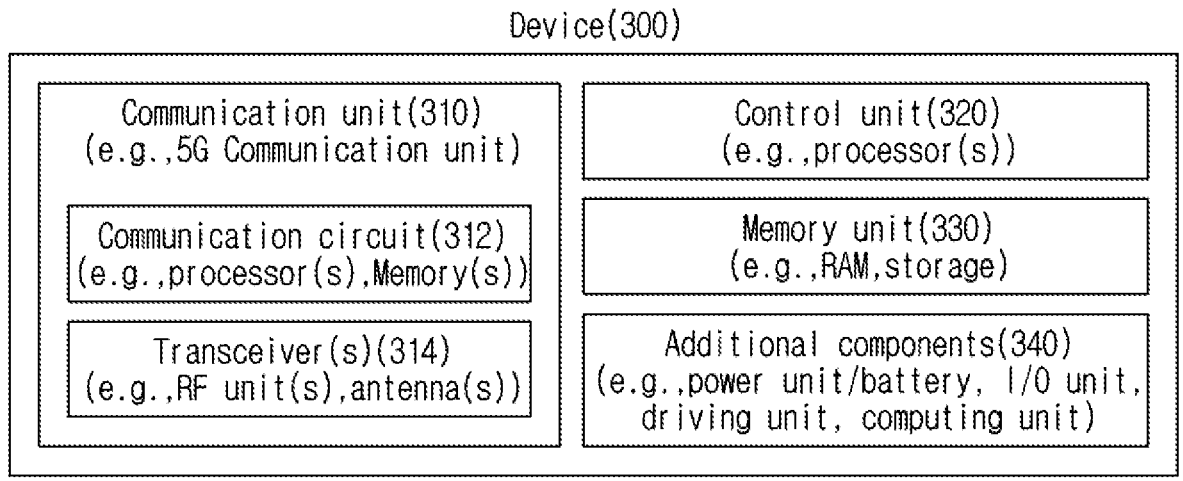
FIG. 3 is a view showing another example of a wireless device applicable to the present disclosure.

FIG. 3 is a view showing another example of a wireless device applicable to the present disclosure.

Referring to FIG. 3, a wireless device 300 may correspond to the wireless devices 200a and 200b of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202a and 202b and/or one or more memories 204a and 204b of FIG. 2. For example, the transceiver(s) 314 may include one or more transceivers 206a and 206b and/or one or more antennas 208a and 208b of FIG. 2. The control unit 320 may be electrically connected with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100a), the vehicles (FIGS. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be connected with each other through wired interfaces or at least some thereof may be wirelessly connected through the communication unit 310. For example, in the wireless device 300, the control unit 320 and the communication unit 310 may be connected by wire, and the control unit 320 and the first unit (e.g., 130 or 140) may be wirelessly connected through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof Hand-Held Device Applicable to the Present Disclosure FIG. 4 is a view showing an example of a hand-held device applicable to the present disclosure.

Figure 4:
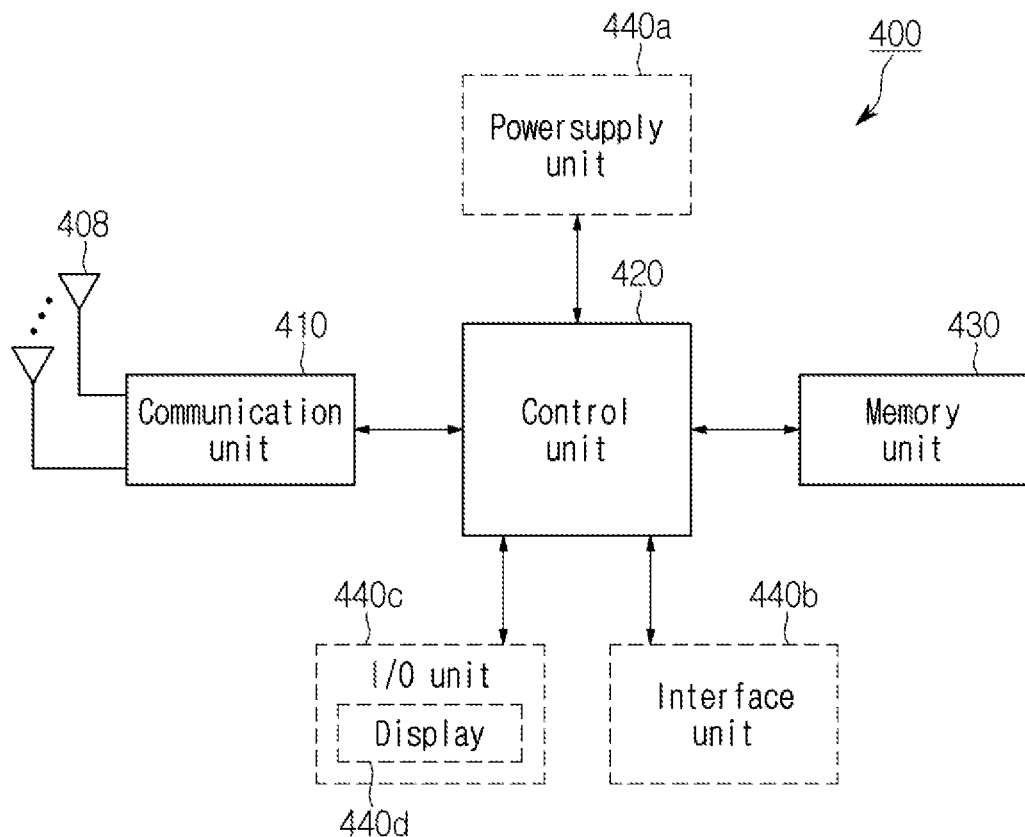
FIG. 4 is a view showing an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440a, an interface unit (interface) 440b, and an input/output unit 440c. An antenna unit (antenna) 408 may be part of the communication unit 410. The blocks 410 to 430/440a to 440c may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440a may supply power to the hand-held device 400 and include a wired/wireless charging circuit, a battery, etc. The interface unit 440b may support connection between the hand-held device 400 and another external device. The interface unit 440b may include various ports (e.g., an audio input/output port and a video input/output port) for connection with the external device. The input/output unit 440c may receive or output video information/signals, audio information/signals, data and/or information output from users. The input/output unit 440c may include a camera, a microphone, a user input unit, a display 440d, a speaker and/or a haptic module.

For example, in case of data communication, the input/output unit 440c may acquire information/signal output from users (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440c in various forms (e.g., text, voice, image, video and haptic).

Type of Wireless Device Applicable to the Present Disclosure

Figure 5:
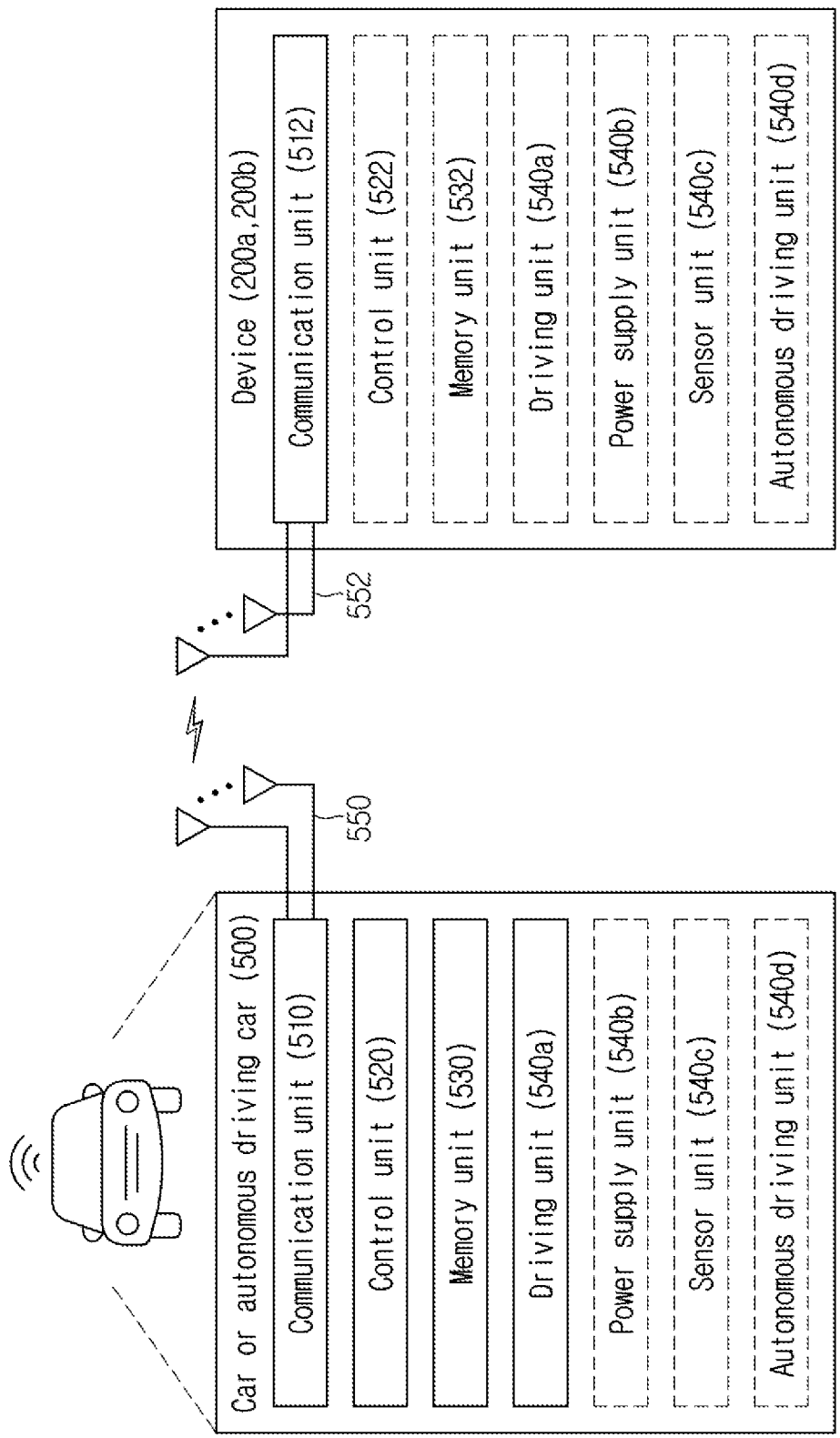
FIG. 5 is a view showing an example of a car or an autonomous driving car applicable to the present disclosure.

FIG. 5 is a view showing an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540a, a power supply unit (power supply) 540b, a sensor unit 540c, and an autonomous driving unit 540d. The antenna unit 550 may be configured as part of the communication unit 510. The blocks 510/530/540a to 540d correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU). The driving unit 540a may drive the car or autonomous driving car 500 on the ground. The driving unit 540a may include an engine, a motor, a power train, wheels, a brake, a steering device, etc. The power supply unit 540b may supply power to the car or autonomous driving car 500, and include a wired/wireless charging circuit, a battery, etc. The sensor unit 540c may obtain a vehicle state, surrounding environment information, user information, etc. The sensor unit 540c may include an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving sensor 540*d* may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 510 may receive map data, traffic information data, etc. from an external server. The autonomous driving unit 540*d* may generate an autonomous driving route and a driving plan based on the acquired data. The control unit 520 may control the driving unit 540*a* (e.g., speed/direction control) such that the car or autonomous driving car 500 moves along the autonomous driving route according to the driving plane. During autonomous driving, the communication unit 510 may aperiodically/periodically acquire latest traffic information data from an external server and acquire surrounding traffic information data from neighboring cars. In addition, during autonomous driving, the sensor unit 540*c* may acquire a vehicle state and surrounding environment information. The autonomous driving unit 540*d* may update the autonomous driving route and the driving plan based on newly acquired data/information. The communication unit 510 may transmit information such as a vehicle location, an autonomous driving route, a driving plan, etc. to the external server. The external server may predict traffic information data using AI technology or the like based on the information collected from the cars or autonomous driving cars and provide the predicted traffic information data to the cars or autonomous driving cars.

Figure 6:
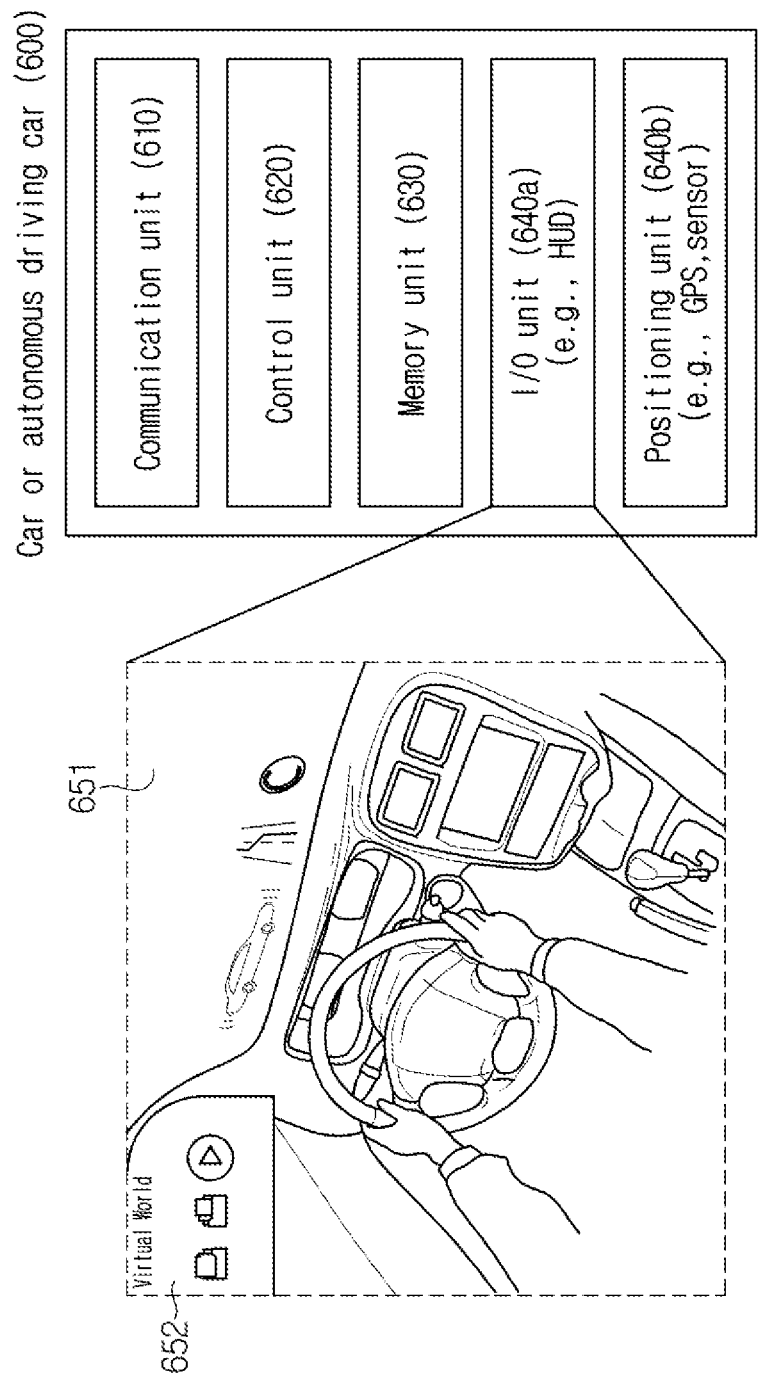
FIG. 6 is a view showing an example of a mobility applicable to the present disclosure.

FIG. 6 is a view showing an example of a mobility applicable to the present disclosure.

Referring to FIG. 6, the mobility applied to the present disclosure may be implemented as at least one of a transportation means, a train, an aerial vehicle or a ship. In addition, the mobility applied to the present disclosure may be implemented in the other forms and is not limited to the above-described embodiments.

At this time, referring to FIG. 6, the mobility 600 may include a communication unit (transceiver) 610, a control unit (controller) 620, a memory unit (memory) 630, an input/output unit 640*a* and a positioning unit 640*b*. Here, the blocks 610 to 630/640*a* to 640*b* may corresponding to the blocks 310 to 330/340 of FIG. 3.

The communication unit 610 may transmit and receive signals (e.g., data, control signals, etc.) to and from external devices such as another mobility or a base station. The control unit 620 may control the components of the mobility 600 to perform various operations. The memory unit 630 may store data/parameters/programs/code/instructions supporting the various functions of the mobility 600. The input/output unit 640*a* may output AR/VR objects based on information in the memory unit 630. The input/output unit 640*a* may include a HUD. The positioning unit 640*b* may acquire the position information of the mobility 600. The position information may include absolute position information of the mobility 600, position information in a driving line, acceleration information, position information of neighboring vehicles, etc. The positioning unit 640*b* may include a global positioning system (GPS) and various sensors.

For example, the communication unit 610 of the mobility 600 may receive map information, traffic information, etc. from an external server and store the map information, the traffic information, etc. in the memory unit 630. The positioning unit 640*b* may acquire mobility position information through the GPS and the various sensors and store the mobility position information in the memory unit 630. The control unit 620 may generate a virtual object based on the map information, the traffic information, the mobility position information, etc., and the input/output unit 640*a* may display the generated virtual object in a glass window (651 and 652). In addition, the control unit 620 may determine whether the mobility 600 is normally driven in the driving line based on the mobility position information. When the mobility 600 abnormally deviates from the driving line, the control unit 620 may display a warning on the glass window of the mobility through the input/output unit 640*a*. In addition, the control unit 620 may broadcast a warning message for driving abnormality to neighboring mobilities through the communication unit 610. Depending on situations, the control unit 620 may transmit the position information of the mobility and information on driving/mobility abnormality to a related institution through the communication unit 610.

Figure 7:
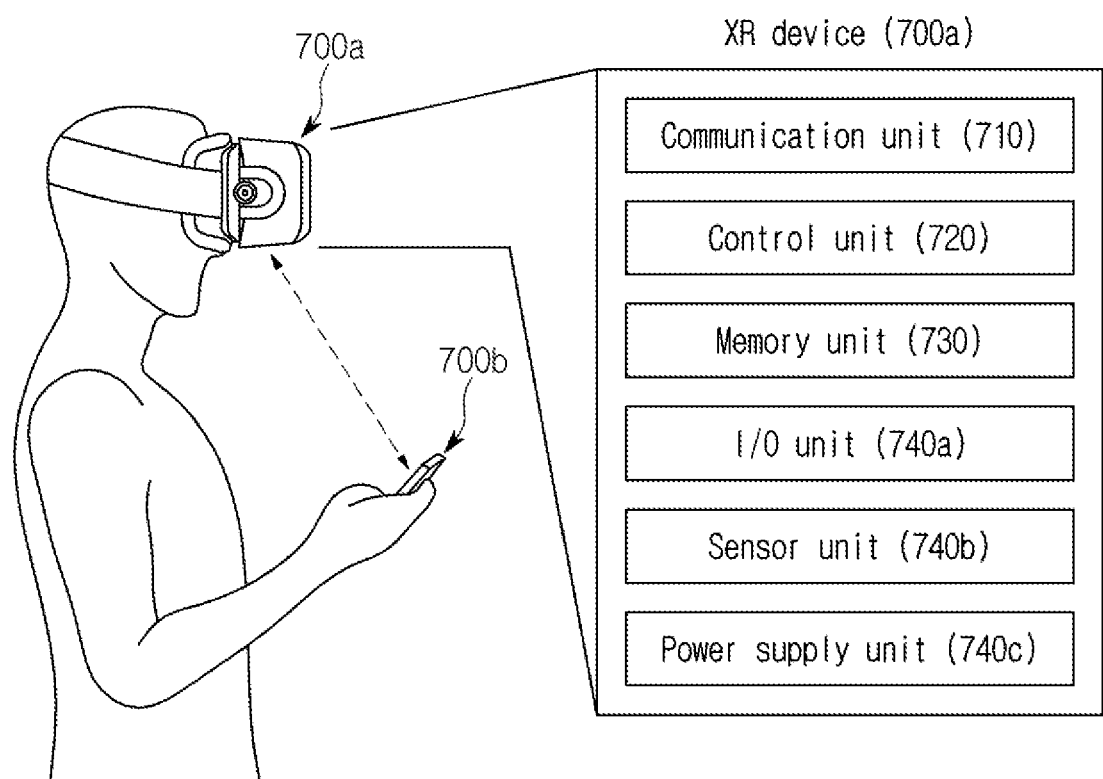
FIG. 7 is a view showing an example of an XR device applicable to the present disclosure.

FIG. 7 is a view showing an example of an XR device applicable to the present disclosure. The XR device may be implemented as a HMD, a head-up display (HUD) provided in a vehicle, a television, a smartphone, a computer, a wearable device, a home appliance, a digital signage, a vehicle, a robot, etc.

Referring to FIG. 7, the XR device 700*a* may include a communication unit (transceiver) 710, a control unit (controller) 720, a memory unit (memory) 730, an input/output unit 740*a*, a sensor unit 740*b* and a power supply unit (power supply) 740*c*. Here, the blocks 710 to 730/740*a* to 740*c* may correspond to the blocks 310 to 330/340 of FIG. 3, respectively.

The communication unit 710 may transmit and receive signals (e.g., media data, control signals, etc.) to and from external devices such as another wireless device, a handheld device or a media server. The media data may include video, image, sound, etc. The control unit 720 may control the components of the XR device 700*a* to perform various operations. For example, the control unit 720 may be configured to control and/or perform procedures such as video/image acquisition, (video/image) encoding, metadata generation and processing. The memory unit 730 may store data/parameters/programs/code/instructions necessary to drive the XR device 700*a* or generate an XR object.

The input/output unit 740*a* may acquire control information, data, etc. from the outside and output the generated XR object. The input/output unit 740*a* may include a camera, a microphone, a user input unit, a display, a speaker and/or a haptic module. The sensor unit 740*b* may obtain an XR device state, surrounding environment information, user information, etc. The sensor unit 740*b* may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar. The power supply unit 740*c* may supply power to the XR device 700*a* and include a wired/wireless charging circuit, a battery, etc.

For example, the memory unit 730 of the XR device 700*a* may include information (e.g., data, etc.) necessary to generate an XR object (e.g., AR/VR/MR object). The input/output unit 740*a* may acquire an instruction for manipulating the XR device 700a from a user, and the control unit 720 may drive the XR device 700a according to the driving instruction of the user. For example, when the user wants to watch a movie, news, etc. through the XR device 700a, the control unit 720 may transmit content request information to another device (e.g., a hand-held device 700b) or a media server through the communication unit 730. The communication unit 730 may download/stream content such as a movie or news from another device (e.g., the hand-held device 700b) or the media server to the memory unit 730. The control unit 720 may control and/or perform procedures such as video/image acquisition, (video/image) encoding, metadata generation/processing, etc. with respect to content, and generate/output an XR object based on information on a surrounding space or a real object acquired through the input/output unit 740a or the sensor unit 740b.

In addition, the XR device 700a may be wirelessly connected with the hand-held device 700b through the communication unit 710, and operation of the XR device 700a may be controlled by the hand-held device 700b. For example, the hand-held device 700b may operate as a controller for the XR device 700a. To this end, the XR device 700a may acquire three-dimensional position information of the hand-held device 700b and then generate and output an XR object corresponding to the hand-held device 700b.

Figure 8:
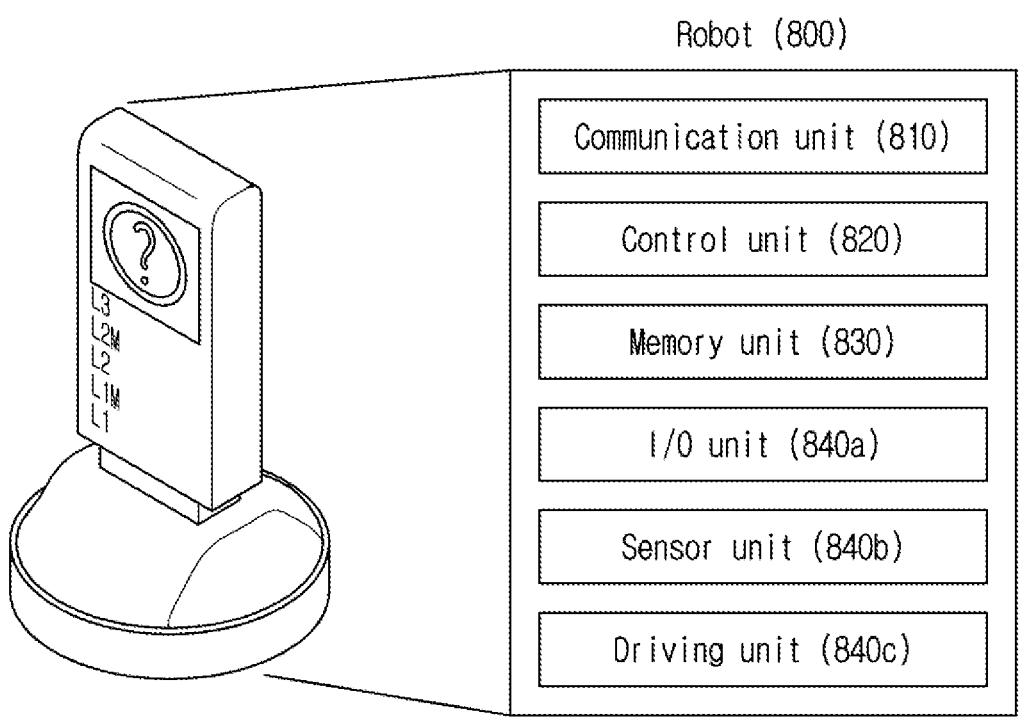
FIG. 8 is a view showing an example of a robot applicable to the present disclosure.

FIG. 8 is a view showing an example of a robot applicable to the present disclosure. For example, the robot may be classified into industrial, medical, household, military, etc. according to the purpose or field of use. At this time, referring to FIG. 8, the robot 800 may include a communication unit (transceiver) 810, a control unit (controller) 820, a memory unit (memory) 830, an input/output unit 840a, sensor unit 840b and a driving unit 840c. Here, blocks 810 to 830/840a to 840c may correspond to the blocks 310 to 330/340 of FIG. 3, respectively.

The communication unit 810 may transmit and receive signals (e.g., driving information, control signals, etc.) to and from external devices such as another wireless device, another robot or a control server. The control unit 820 may control the components of the robot 800 to perform various operations. The memory unit 830 may store data/parameters/programs/code/instructions supporting various functions of the robot 800. The input/output unit 840a may acquire information from the outside of the robot 800 and output information to the outside of the robot 800. The input/output unit 840a may include a camera, a microphone, a user input unit, a display, a speaker and/or a haptic module.

The sensor unit 840b may obtain internal information, surrounding environment information, user information, etc. of the robot 800. The sensor unit 840b may include a proximity sensor, an illumination sensor, an acceleration sensor, a magnetic sensor, a gyro sensor, an inertia sensor, an infrared (IR) sensor, a finger scan sensor, an ultrasonic sensor, an optical sensor, a microphone and/or a radar.

The driving unit 840c may perform various physical operations such as movement of robot joints. In addition, the driving unit 840c may cause the robot 800 to run on the ground or fly in the air. The driving unit 840c may include an actuator, a motor, wheels, a brake, a propeller, etc.

Figure 9:
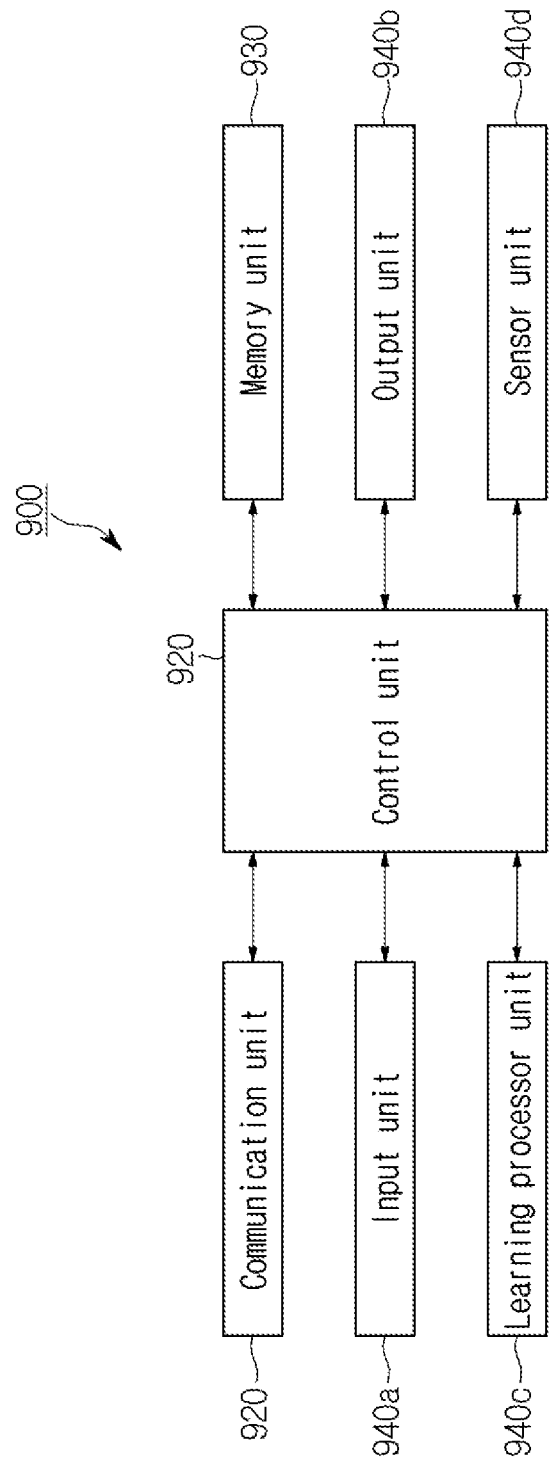
FIG. 9 is a view showing an example of artificial intelligence (AI) device applicable to the present disclosure.

FIG. 9 is a view showing an example of artificial intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a set-top box (STB), a radio, a washing machine, a refrigerator, a digital signage, a robot, a vehicle, or the like.

Referring to FIG. 9, the AI device 900 may include a communication unit (transceiver) 910, a control unit (controller) 920, a memory unit (memory) 930, an input/output unit 940a/940b, a leaning processor unit (learning processor) 940c and a sensor unit 940d. The blocks 910 to 930/940a to 940d may correspond to the blocks 310 to 330/340 of FIG. 3, respectively.

The communication unit 910 may transmit and receive wired/wireless signals (e.g., sensor information, user input, learning models, control signals, etc.) to and from external devices such as another AI device (e.g., FIG. 1, 100x, 120 or 140) or the AI server (FIG. 1, 140) using wired/wireless communication technology. To this end, the communication unit 910 may transmit information in the memory unit 930 to an external device or transfer a signal received from the external device to the memory unit 930.

The control unit 920 may determine at least one executable operation of the AI device 900 based on information determined or generated using a data analysis algorithm or a machine learning algorithm. In addition, the control unit 920 may control the components of the AI device 900 to perform the determined operation. For example, the control unit 920 may request, search for, receive or utilize the data of the learning processor unit 940c or the memory unit 930, and control the components of the AI device 900 to perform predicted operation or operation, which is determined to be desirable, of at least one executable operation. In addition, the control unit 920 may collect history information including operation of the AI device 900 or user's feedback on the operation and store the history information in the memory unit 930 or the learning processor unit 940c or transmit the history information to the AI server (FIG. 1, 140). The collected history information may be used to update a learning model.

The memory unit 930 may store data supporting various functions of the AI device 900. For example, the memory unit 930 may store data obtained from the input unit 940a, data obtained from the communication unit 910, output data of the learning processor unit 940c, and data obtained from the sensing unit 940. In addition, the memory unit 930 may store control information and/or software code necessary to operate/execute the control unit 920.

The input unit 940a may acquire various types of data from the outside of the AI device 900. For example, the input unit 940a may acquire learning data for model learning, input data, to which the learning model will be applied, etc. The input unit 940a may include a camera, a microphone and/or a user input unit. The output unit 940b may generate video, audio or tactile output. The output unit 940b may include a display, a speaker and/or a haptic module. The sensing unit 940 may obtain at least one of internal information of the AI device 900, the surrounding environment information of the AI device 900 and user information using various sensors. The sensing unit 940 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 940c may train a model composed of an artificial neural network using training data. The learning processor unit 940c may perform AI processing along with the learning processor unit of the AI server (FIG. 1, 140). The learning processor unit 940c may process information received from an external device through the communication unit 910 and/or information stored in the memory unit 930. In addition, the output value of the learning processor unit 940c may be transmitted to the external device through the communication unit 910 and/or stored in the memory unit 930.

Physical Channels and General Signal Transmission

In a radio access system, a UE receives information from a base station on a DL and transmits information to the base station on a UL. The information transmitted and received between the UE and the base station includes general data information and a variety of control information. There are many physical channels according to the types/usages of information transmitted and received between the base station and the UE.

Figure 10:
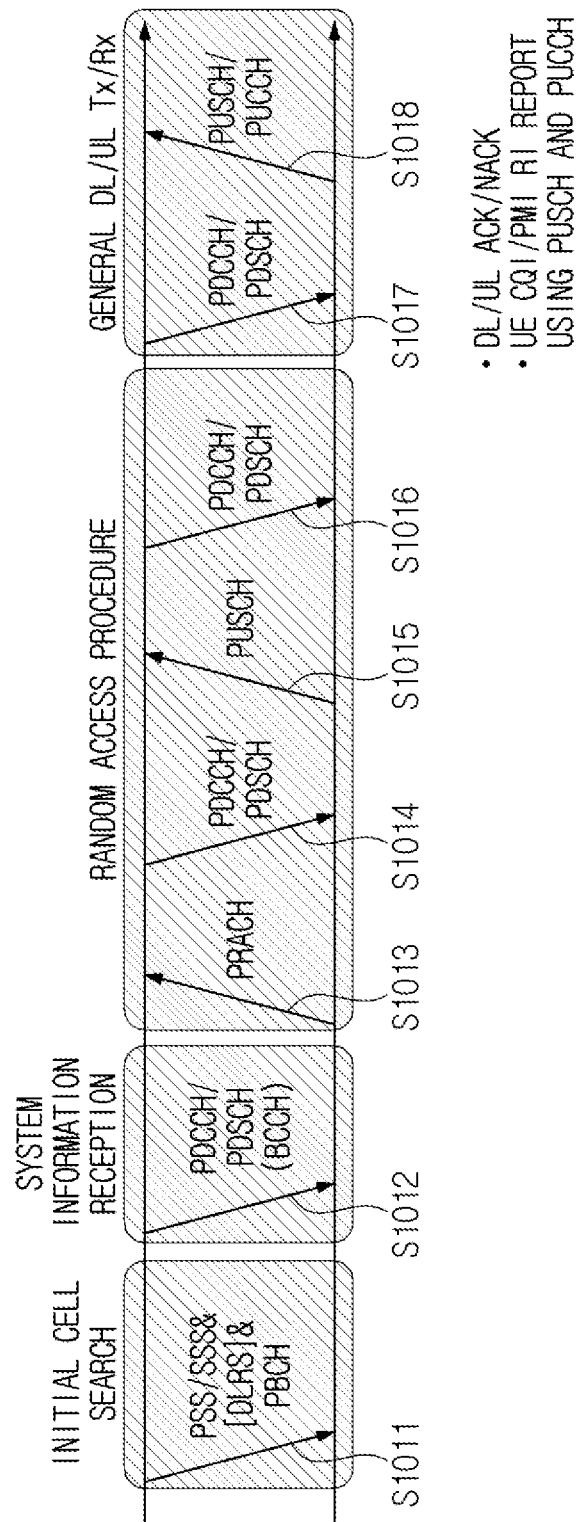
FIG. 10 is a view showing physical channels applicable to the present disclosure and a signal transmission method using the same.

FIG. 10 is a view showing physical channels applicable to the present disclosure and a signal transmission method using the same.

The UE which is turned on again in a state of being turned off or has newly entered a cell performs initial cell search operation in step S1011 such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a physical broadcast channel (PBCH) signal from the base station and acquire intra-cell broadcast information. Meanwhile, the UE may receive a downlink reference signal (DL RS) in an initial cell search step and check a downlink channel state. The UE which has completed initial cell search may receive a physical downlink control channel (PDCCH) and a physical downlink control channel (PDSCH) according to physical downlink control channel information in step S1012, thereby acquiring more detailed system information.

Thereafter, the UE may perform a random access procedure such as steps S1013 to S1016 in order to complete access to the base station. To this end, the UE may transmit a preamble through a physical random access channel (PRACH) (S1013) and receive a random access response (RAR) to the preamble through a physical downlink control channel and a physical downlink shared channel corresponding thereto (S1014). The UE may transmit a physical uplink shared channel (PUSCH) using scheduling information in the RAR (S1015) and perform a contention resolution procedure such as reception of a physical downlink control channel signal and a physical downlink shared channel signal corresponding thereto (S1016).

The UE, which has performed the above-described procedures, may perform reception of a physical downlink control channel signal and/or a physical downlink shared channel signal (S1017) and transmission of a physical uplink shared channel (PUSCH) signal and/or a physical uplink control channel (PUCCH) signal (S1018) as general uplink/downlink signal transmission procedures.

The control information transmitted from the UE to the base station is collectively referred to as uplink control information (UCI). The UCI includes hybrid automatic repeat and request acknowledgement/negative-ACK (HARQ-ACK/NACK), scheduling request (SR), channel quality indication (CQI), precoding matrix indication (PMI), rank indication (RI), beam indication (BI) information, etc. At this time, the UCI is generally periodically transmitted through a PUCCH, but may be transmitted through a PUSCH in some embodiments (e.g., when control information and traffic data are simultaneously transmitted). In addition, the UE may aperiodically transmit UCI through a PUSCH according to a request/instruction of a network.

Figure 11:
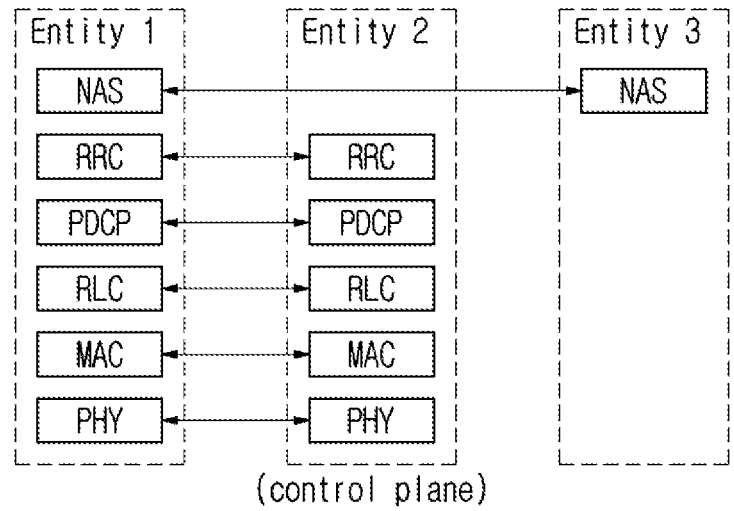
FIG. 11 is a view showing the structure of a control plane and a user plane of a radio interface protocol applicable to the present disclosure.
Figure 11:
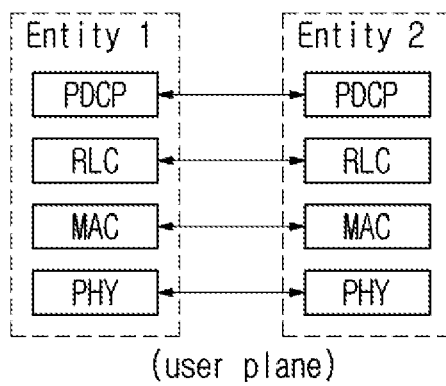

FIG. 11 is a view showing the structure of a control plane and a user plane of a radio interface protocol applicable to the present disclosure.

Referring to FIG. 11, Entity 1 may be a user equipment (UE). At this time, the UE may be at least one of a wireless device, a hand-held device, a vehicle, a mobility, an XR device, a robot or an AI device, to which the present disclosure is applicable in FIGS. 1 to 9. In addition, the UE refers to a device, to which the present disclosure is applicable, and is not limited to a specific apparatus or device.

Entity 2 may be a base station. At this time, the base station may be at least one of an eNB, a gNB or an ng-eNB. In addition, the base station may refer to a device for transmitting a downlink signal to a UE and is not limited to a specific apparatus or device. That is, the base station may be implemented in various forms or types and is not limited to a specific form.

Entity 3 may be a device for performing a network apparatus or a network function. At this time, the network apparatus may be a core network node (e.g., mobility management entity (MME) for managing mobility, an access and mobility management function (AMF), etc. In addition, the network function may mean a function implemented in order to perform a network function. Entity 3 may be a device, to which a function is applied. That is, Entity 3 may refer to a function or device for performing a network function and is not limited to a specific device.

A control plane refers to a path used for transmission of control messages, which are used by the UE and the network to manage a call. A user plane refers to a path in which data generated in an application layer, e.g. voice data or Internet packet data, is transmitted. At this time, a physical layer which is a first layer provides an information transfer service to a higher layer using a physical channel. The physical layer is connected to a media access control (MAC) layer of a higher layer via a transmission channel. At this time, data is transmitted between the MAC layer and the physical layer via the transmission channel. Data is also transmitted between a physical layer of a transmitter and a physical layer of a receiver via a physical channel. The physical channel uses time and frequency as radio resources.

The MAC layer which is a second layer provides a service to a radio link control (RLC) layer of a higher layer via a logical channel. The RLC layer of the second layer supports reliable data transmission. The function of the RLC layer may be implemented by a functional block within the MAC layer. A packet data convergence protocol (PDCP) layer which is the second layer performs a header compression function to reduce unnecessary control information for efficient transmission of an Internet protocol (IP) packet such as an IPv4 or IPv6 packet in a radio interface having relatively narrow bandwidth. A radio resource control (RRC) layer located at the bottommost portion of a third layer is defined only in the control plane. The RRC layer serves to control logical channels, transmission channels, and physical channels in relation to configuration, re-configuration, and release of radio bearers. A radio bearer (RB) refers to a service provided by the second layer to transmit data between the UE and the network. To this end, the RRC layer of the UE and the RRC layer of the network exchange RRC messages. A non-access stratum (NAS) layer located at a higher level of the RRC layer performs functions such as session management and mobility management. One cell configuring a base station may be set to one of various bandwidths to provide a downlink or uplink transmission service to several UEs. Different cells may be set to provide different bandwidths. Downlink transmission channels for transmitting data from a network to a UE may include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at a higher level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 12:
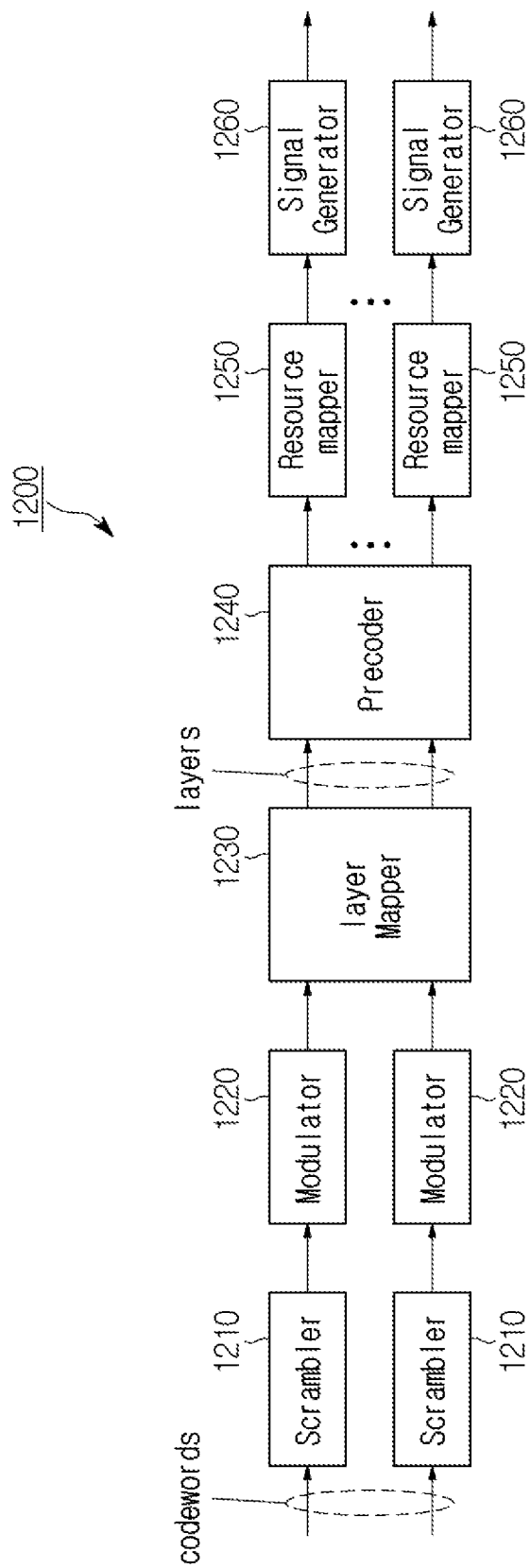
FIG. 12 is a view showing a method of processing a transmitted signal applicable to the present disclosure.

FIG. 12 is a view showing a method of processing a transmitted signal applicable to the present disclosure. For example, the transmitted signal may be processed by a signal processing circuit. At this time, a signal processing circuit 1200 may include a scrambler 1210, a modulator 1220, a layer mapper 1230, a precoder 1240, a resource mapper 1250, and a signal generator 1260. At this time, for example, the operation/function of FIG. 12 may be performed by the processors 202a and 202b and/or the transceiver 206a and 206b of FIG. 2. In addition, for example, the hardware element of FIG. 12 may be implemented in the processors 202a and 202b of FIG. 2 and/or the transceivers 206a and 206b of FIG. 2. For example, blocks 1010 to 1060 may be implemented in the processors 202a and 202b of FIG. 2. In addition, blocks 1210 to 1250 may be implemented in the processors 202a and 202b of FIG. 2 and a block 1260 may be implemented in the transceivers 206a and 206b of FIG. 2, without being limited to the above-described embodiments.

A codeword may be converted into a radio signal through the signal processing circuit 1200 of FIG. 12. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 10. Specifically, the codeword may be converted into a bit sequence scrambled by the scrambler 1210. The scramble sequence used for scramble is generated based in an initial value and the initial value may include ID information of a wireless device, etc. The scrambled bit sequence may be modulated into a modulated symbol sequence by the modulator 1220. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 1230. Modulation symbols of each transport layer may be mapped to corresponding antenna port(s) by the precoder 1240 (precoding). The output z of the precoder 1240 may be obtained by multiplying the output y of the layer mapper 1230 by an N*M precoding matrix W. Here, N may be the number of antenna ports and M may be the number of transport layers. Here, the precoder 1240 may perform precoding after transform precoding (e.g., discrete Fourier transform (DFT)) for complex modulation symbols. In addition, the precoder 1240 may perform precoding without performing transform precoding.

The resource mapper 1250 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 1260 may generate a radio signal from the mapped modulation symbols, and the generated radio signal may be transmitted to another device through each antenna. To this end, the signal generator 1260 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 1210 to 1260 of FIG. 12. For example, the wireless device (e.g., 200a or 200b of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

Figure 13:
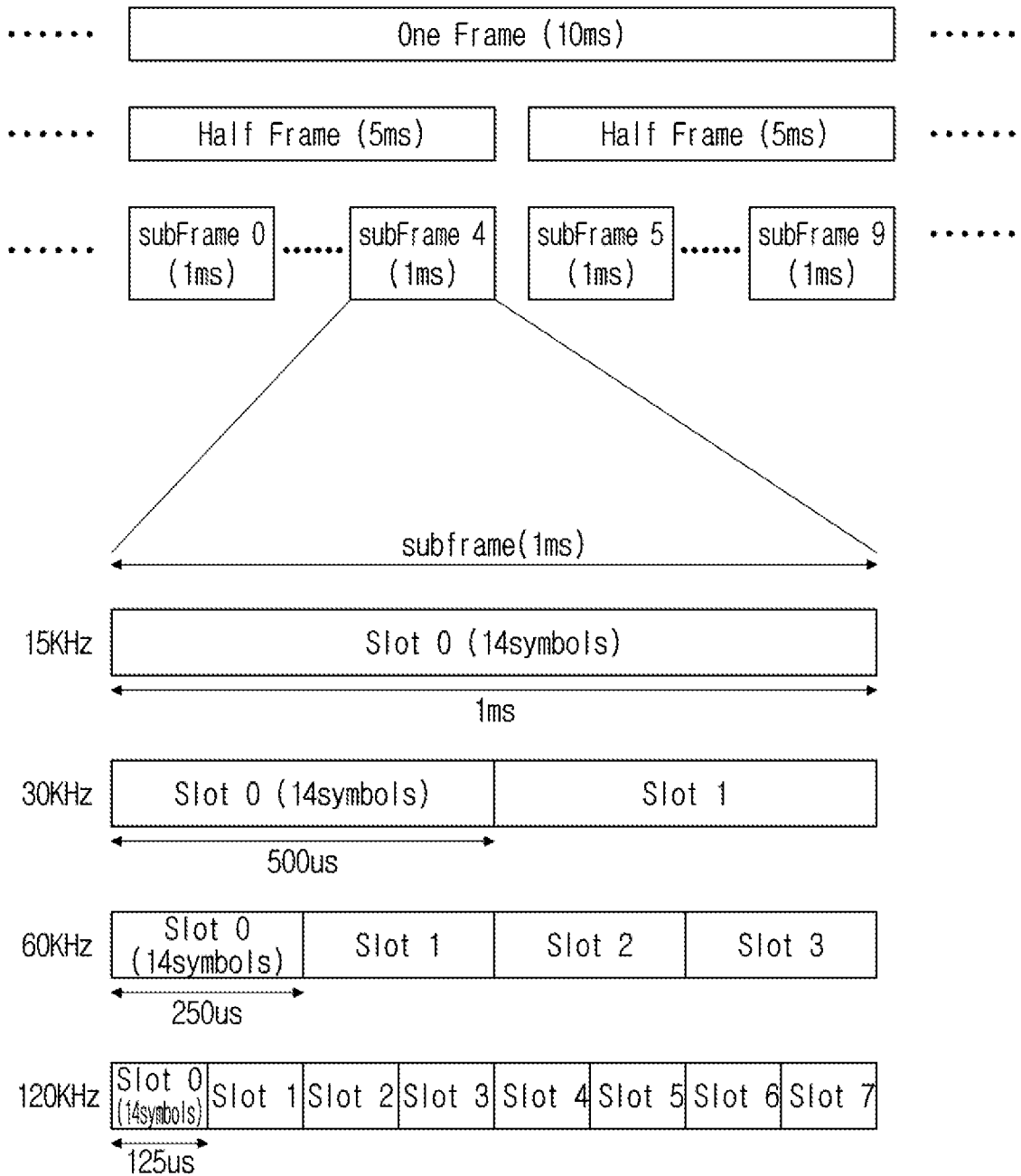
FIG. 13 is a view showing the structure of a radio frame applicable to the present disclosure.

FIG. 13 is a view showing the structure of a radio frame applicable to the present disclosure.

UL and DL transmission based on an NR system may be based on the frame shown in FIG. 13. At this time, one radio frame has a length of 10 ms and may be defined as two 5-ms half-frames (HFs). One half-frame may be defined as five 1-ms subframes (SFs). One subframe may be divided into one or more slots and the number of slots in the subframe may depend on subscriber spacing (SCS). At this time, each slot may include 12 or 14 OFDM(A) symbols according to cyclic prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot according to SCS, the number of slots per frame and the number of slots per subframe when normal CP is used, and Table 2 shows the number of symbols per slot according to SCS, the number of slots per frame and the number of slots per subframe when extended CP is used.

TABLE 1

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| μ | $N^{slot}_{symb}$ | $N^{frame,\mu}_{slot}$ | $N^{subframe,\mu}_{slot}$ |
|---|---|---|---|
| 2 | 12 | 40 | 4 |

In Tables 1 and 2 above, $N^{slot}_{symb}$ may indicate the number of symbols in a slot, $N^{frame,\mu}_{slot}$ may indicate the number of slots in a frame, and $N^{subframe,\mu}_{slot}$ may indicate the number of slots in a subframe.

In addition, in a system, to which the present disclosure is applicable, OFDM(A) numerology (e.g., SCS, CP length, etc.) may be differently set among a plurality of cells merged to one UE. Accordingly, an (absolute time) period of a time resource (e.g., an SF, a slot or a TTI) (for convenience, collectively referred to as a time unit (TU)) composed of the same number of symbols may be differently set between merged cells.

NR may support a plurality of numerologies (or subscriber spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 kHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In addition, for example, in a communication system, to which the present disclosure is applicable, the above-described numerology may be differently set. For example, a terahertz wave (THz) band may be used as a frequency band higher than FR2. In the THz band, the SCS may be set greater than that of the NR system, and the number of slots may be differently set, without being limited to the above-described embodiments. The THz band will be described below.

Figure 14:
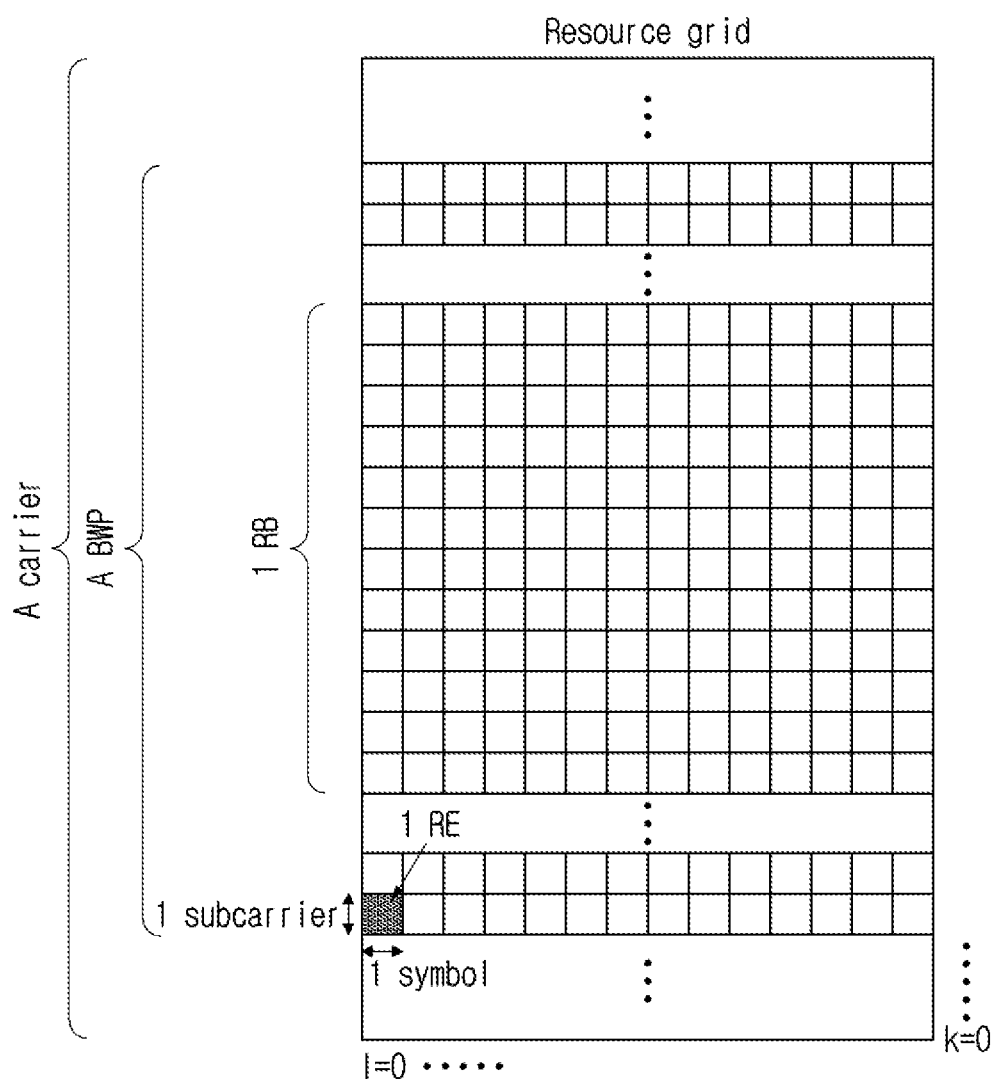
FIG. 14 is a view showing a slot structure applicable to the present disclosure.

FIG. 14 is a view showing a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A resource block (RB) may be defined as a plurality (e.g., 12) of consecutive subcarriers in the frequency domain.

In addition, a bandwidth part (BWP) is defined as a plurality of consecutive (P)RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a resource element (RE) and one complex symbol may be mapped.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 4

| Per device peak data rate | 1 Tbps |
| E2E latency | 1 ms |
| Maximum spectral efficiency | 100 bps/Hz |
| Mobility support | up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 15:
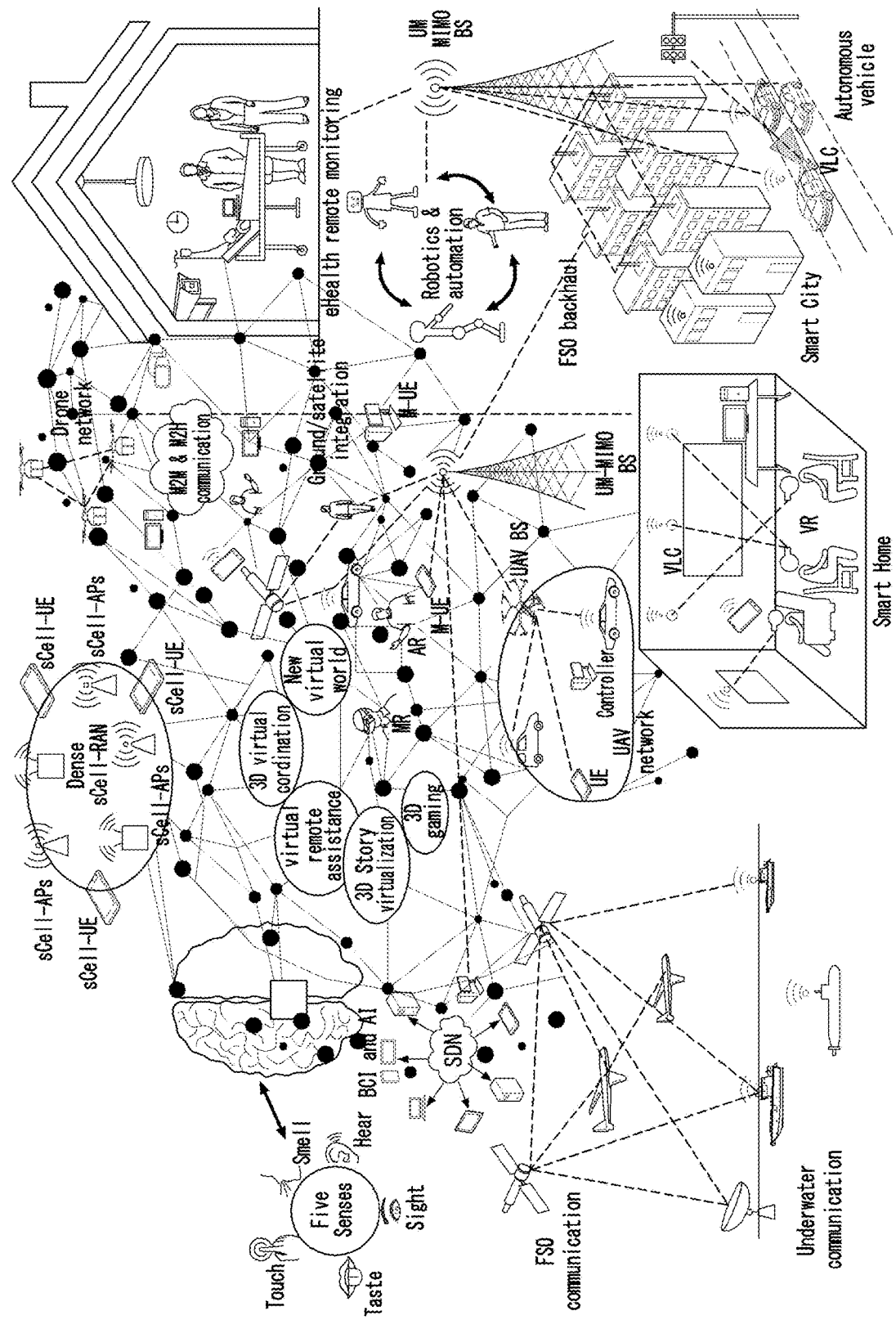
FIG. 15 is a view showing an example of a communication structure providable in a 6G system applicable to the present disclosure.

FIG. 15 is a view showing an example of a communication structure providable in a 6G system applicable to the present disclosure.

Referring to FIG. 15, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Core Implementation Technology of 6G System
Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

Terahertz (THz) Communication

THz communication is applicable to the 6G system. For example, a data rate may increase by increasing bandwidth. This may be performed by using sub-TH communication with wide bandwidth and applying advanced massive MIMO technology.

Figure 16:
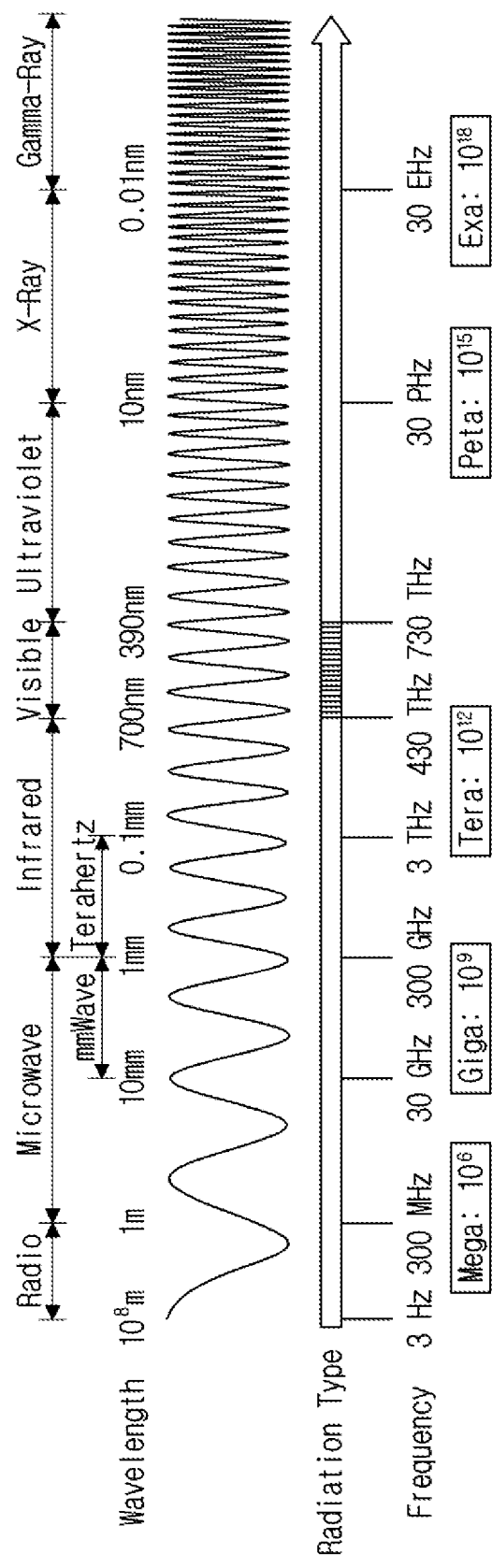
FIG. 16 is a view showing an electromagnetic spectrum applicable to the present disclosure.

FIG. 16 is a view showing an electromagnetic spectrum applicable to the present disclosure. For example, referring to FIG. 16, THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Bit Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

THz Wireless Communication

Figure 17:
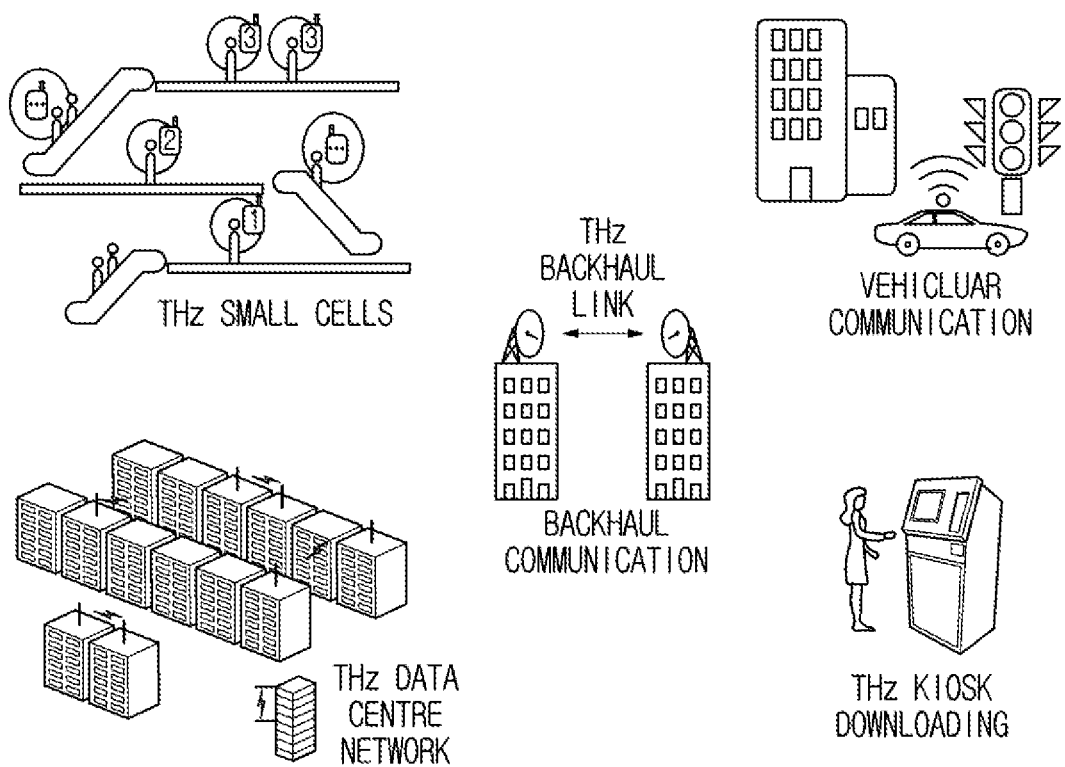
FIG. 17 is a view showing a THz communication method applicable to the present disclosure.

FIG. 17 is a view showing a THz communication method applicable to the present disclosure.

Referring to FIG. 17, THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Specifically, referring to FIG. 17, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading. Table 5 below shows an example of technology which may be used in the THz wave.

TABLE 5

Transceivers Device    Available immature: UTC-PD, RTD and SBD
Modulation and coding  Low order modulation techniques (OOK, QPSK), TABLE 5-continued

| | |
|---|---|
| Antenna | LDPC, Reed Soloman, Hamming, Polar, Turbo Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Fee space loss | High |
| Coverage | Low |
| Radio Measurements | 300 GHz inddor |
| Device size | Few micrometers |

Figure 18:
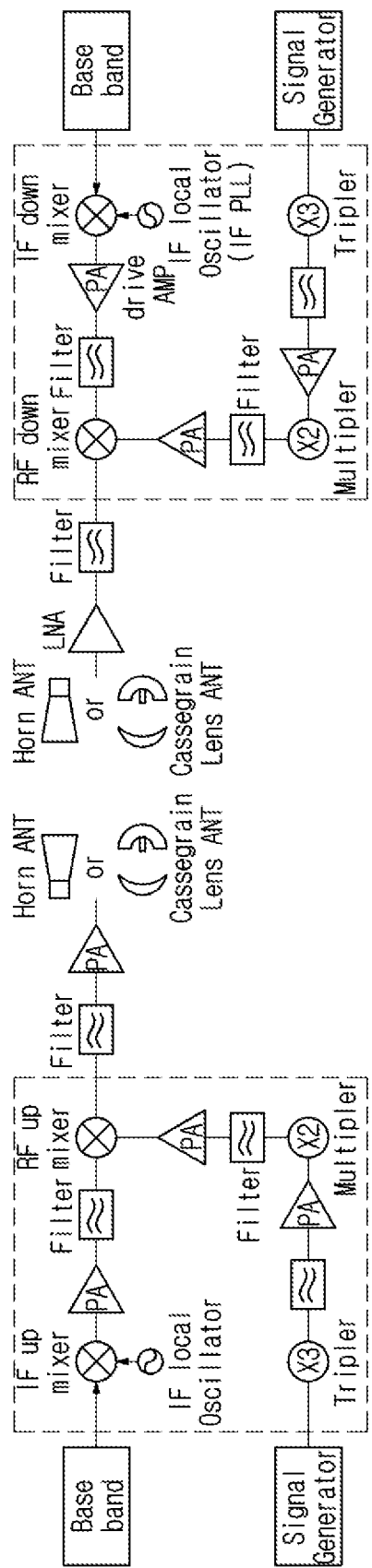
FIG. 18 is a view showing a THz wireless communication transceiver applicable to the present disclosure.

FIG. 18 is a view showing a THz wireless communication transceiver applicable to the present disclosure.

Referring to FIG. 18, THz wireless communication may be classified based on the method of generating and receiving THz. The THz generation method may be classified as an optical device or electronic device based technology.

At this time, the method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 18, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 18. In FIG. 18, IF represents an intermediate frequency, a tripler and a multiplier represents a multiplier, PA represents a power amplifier, and LNA represents a low noise amplifier, and PLL represents a phase-locked loop.

Figure 19:
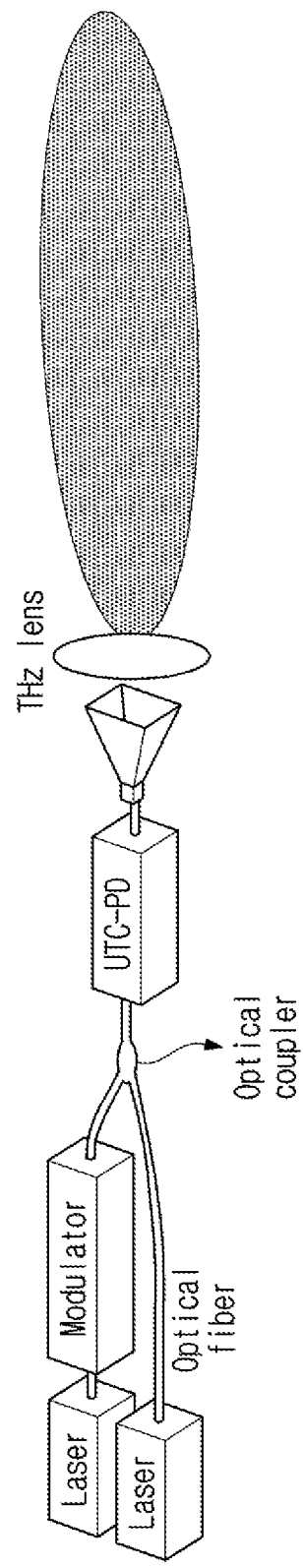
FIG. 19 is a view showing a THz signal generation method applicable to the present disclosure.
Figure 20:
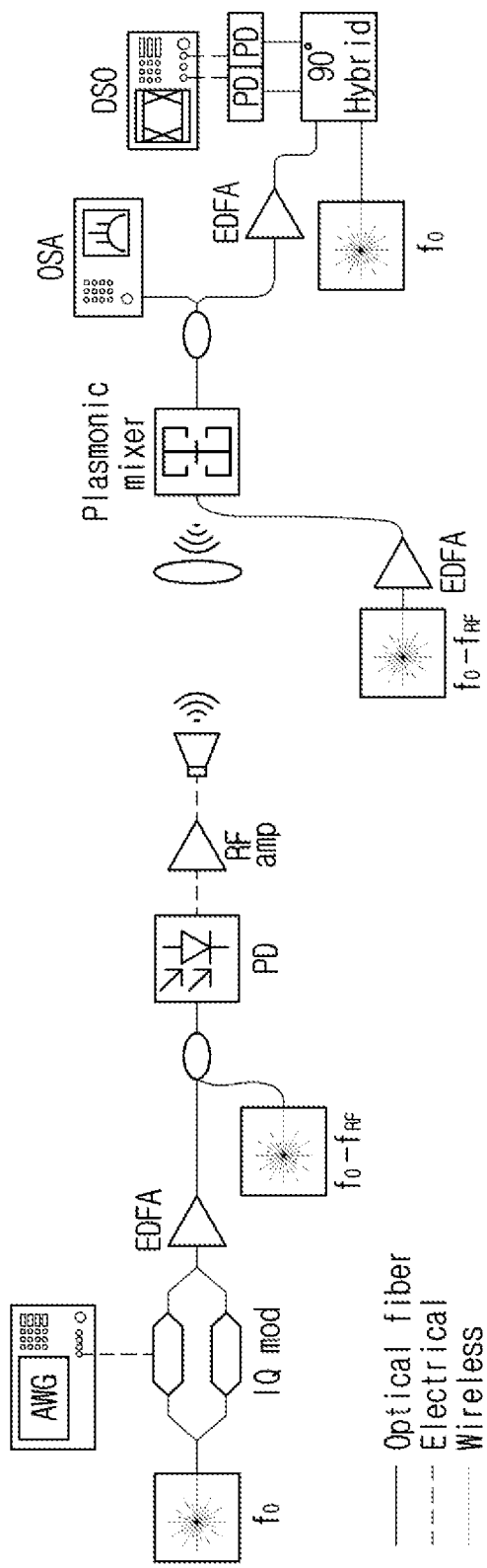
FIG. 20 is a view showing a wireless communication transceiver applicable to the present disclosure.

FIG. 19 is a view showing a THz signal generation method applicable to the present disclosure. FIG. 20 is a view showing a wireless communication transceiver applicable to the present disclosure.

Referring to FIGS. 19 and 20, the optical device-based THz wireless communication technology means a method of generating and modulating a THz signal using an optical device. The optical device-based THz signal generation technology refers to a technology that generates an ultra-high-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 19, a laser diode, a broadband optical modulator, and an ultrahigh-speed photodetector are required. In the case of FIG. 19, the light signals of two lasers having different wavelengths are combined to generate a THz signal corresponding to a wavelength difference between the lasers. In FIG. 19, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 20, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 21:
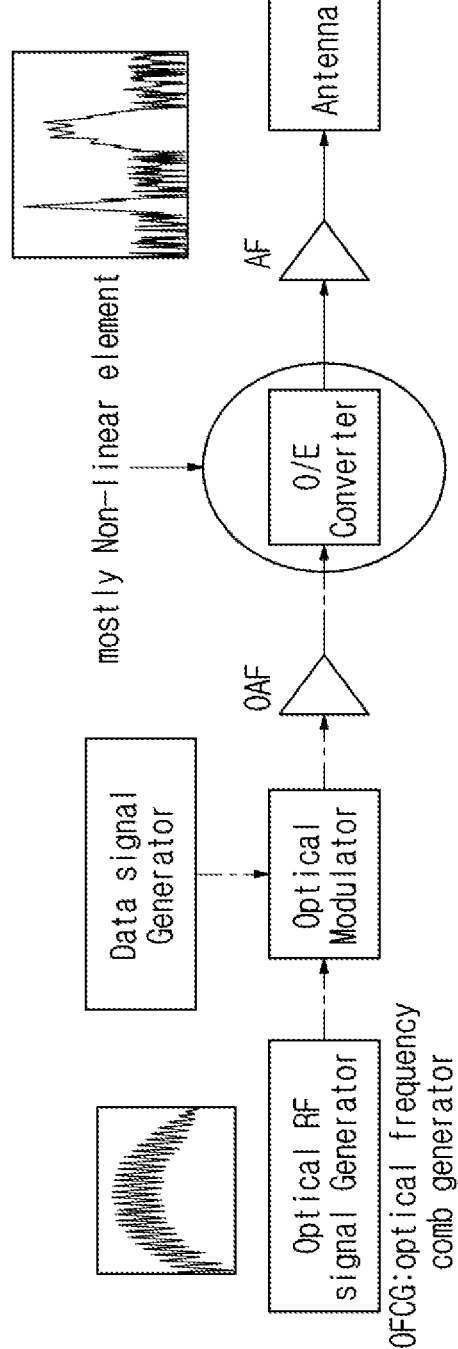
FIG. 21 is a view showing a transmitter structure applicable to the present disclosure.
Figure 22:
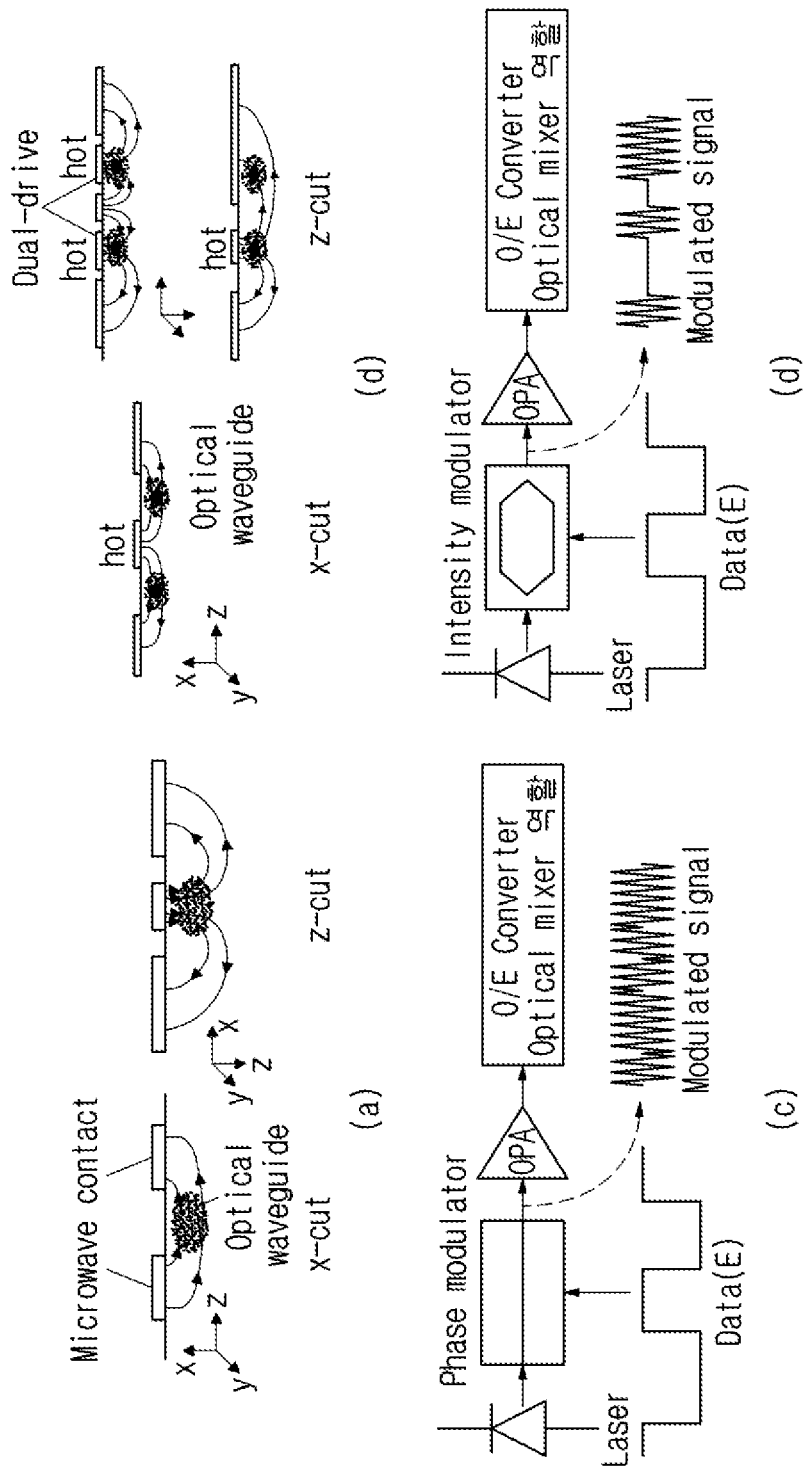
FIG. 22 is a view showing a modulator structure applicable to the present disclosure.

FIG. 21 is a view showing a transmitter structure applicable to the present disclosure. FIG. 22 is a view showing a modulator structure applicable to the present disclosure.

Referring to FIGS. 21 and 22, generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

Specific Embodiments of the Present Disclosure

The present disclosure relates to a method and apparatus for reducing errors occurring when a generalized spatial modulation (GSM) technique is used in a wireless communication system. Specifically, the present disclosure describes technologies for improving burst errors that may occur when using the GSM technique.

Since wireless communication systems began to provide various types of communication services as well as voice calls and high-performance smartphones appeared, data transmission through wireless communication systems has rapidly increased. This trend is expected to continue in the future. Various wireless communication technologies have been developed to support high data rates under limited resources such as bandwidth and transmit power. Representative examples include high-dimensional modulation techniques such as 256-QAM, MIMO technology using multiple transmit/receive antennas, and OFDM technology maximally utilizing diversity in frequency and time domains. Despite such advances in wireless transmission technology, existing systems were expected to be difficult to cope with rapidly increasing data transmission rates. Accordingly, 5G NR greatly improved communication bandwidth and data transmission rate proportional thereto by using mmWave band. Furthermore, future 6G will greatly increase communication bandwidth by using for wireless communication up to a THz band of 0.1 THz or higher.

On the other hand, since an increase in data transmission rate results in an increase in power consumption, energy efficiency has emerged as an important issue for wireless communication systems. As wireless communication terminals are expected to be developed in various forms such as low-power IoT terminals from smartphones, energy efficiency is expected to become more and more important. The THz band has the advantage of increasing the data transmission rate with wide bandwidth, but there are many problems to be solved to increase energy efficiency as well.

In general, as the frequency band increases, propagation loss occurring in free space increases. This means that propagation loss increases according to the distance toward the mmWave and THz bands. In particular, in the case of the THz band, since straightness of radio waves is high, loss due to obstacles is high. In addition, since absorption loss by water molecules in the air or the like occurs depending on the frequency, propagation loss in the THz band is further increased. Based on the same transmit power, large propagation loss causes a smaller cell radius. Massive MIMO technology is attracting attention as an important technology that can solve the propagation loss problem. Since the wavelength becomes shorter as the frequency increases, it becomes easier to integrate massive antennas in a small area. Accordingly, the massive MIMO technology is attracting attention as a technology capable of overcoming large propagation loss by increasing antenna gain using a large number of antennas.

An increase in communication bandwidth results in an increase in a receiver's sampling rate. Each analog sample is converted into a digital signal through an analog-to-digital converter (ADC). In general, power consumption of the ADC linearly increases in proportion to the sampling rate. When the sampling rate is increased according to the increase in bandwidth, power consumption also increases accordingly. In order to reduce the increase in power consumption, the use of a low-resolution ADC is being studied as one of the solutions. Since the power consumption of the ADC increases exponentially according to the number of bits, power consumption can be reduced by reducing the number of bits. However, since there is a problem that the resolution of the signal is lowered, it is difficult to use a high-order QAM modulation technique. That is, there is a problem that it is difficult to increase data throughput and spectral efficiency.

GSM technology is one of wireless transmission technologies capable of increasing spectral efficiency without using high-order QAM modulation in a MIMO system. GSM allows signals to be transmitted through some of the total transmit antennas. Part of the data is represented by which of the possible transmit antenna combinations (TACs) are used, and the rest of the data is represented by modulation symbols transmitted through the selected antenna. For example, when a signal is transmitted through 2 of 4 antennas, a total of 6 antenna combinations are possible. If 2-bit information are expressed using 4 antenna combinations and 4 bits are expressed using 2 QPSK modulation symbols transmitted through the selected 2 antennas, a total of 6 bits of data may be transmitted during one time unit. Here, modulation symbols transmitted through a selected transmit antenna combination during one time unit may be understood as one transmission symbol. That is, one transmission symbol is composed of a transmit antenna combination and modulation symbols, and the transmission symbol is referred to as a 'GSM symbol'. The number of bits that may be transmitted through one GSM symbol may be expressed as in [Equation 1] below.

$$L_{GSM} = \left\lfloor \log_2 \binom{N_t}{N_a} \right\rfloor + N_a \log_2 M \qquad \text{[Equation 1]}$$

In [Equation 1], LGSM denotes the number of bits which may be transmitted through one GSM symbol, $N_t$ denotes the total number of transmit antennas, $N_a$ denotes the number of activated transmit antennas, and M denotes a modulation order.

In a GSM system, information carried in the spatial domain by the TAC and information transmitted through modulation symbols transmitted through an activated antenna may be seen as experiencing different channel characteristics. Information carried through modulation symbols is relatively more affected by phase noise of each antenna and interference between antennas. Since information carried by the TAC is carried through a combination of multiple antennas, it is relatively less sensitive to phase noise or interference between antennas, and gain may be obtained due to spatial diversity. Due to these characteristics, a GSM system may have better performance than a spatial multiplexing MIMO system in a THz band with high phase noise.

In wireless communication, in particular, in a mobile communication system, various adaptation technologies may be used to cope with a change in a radio wave environment due to movement of a terminal or the like. For example, power control may be used to adjust transmit power according to the magnitude of path loss according to the distance between the base station and the terminal.

Adaptive modulation and coding (AMC) is a technology for selecting an appropriate modulation and coding scheme (MCS) according to radio link quality. When a terminal measures a signal to interference plus noise ratio (SINR) and reports a channel quality indicator (CQI) to a base station, the base station selects and applies a modulation order appropriate for a channel condition and coding method, a coding rate, etc. By selecting an MCS appropriate for channel quality, it becomes possible to increase a data transmission amount while efficiently lowering an error rate.

However, even if AMC is applied, it is difficult to expect that transmission always succeeds with only one transmission. In other words, even if AMC is applied, there is still a possibility of error. If the error rate is to be reduced to a very low level, there is a limitation that the amount of used resources increases significantly. To improve this problem, a hybrid automatic repeat request (HARQ) technique may be used together with AMC.

HARQ is a combination of forward error correction (FEC) and automatic repeat request (ARQ). A transmitter transmits data encoded with a forward error correction code. A receiver checks whether there is an error in a data transport block (TB) by decoding the received signal, and requests retransmission from the transmitter when an error is detected. The transmitter retransmits the data encoded with the forward error correction code, and the receiver combines the previously received signal and the newly received signal and then decodes them. Accordingly, coding gain is increased and an error probability is lowered. When data is retransmitted, one of a chase combining (CC) scheme of transmitting encoded data identical to previously transmitted data and an incremental redundancy (IR) scheme of transmitting encoded data including new parity bits may be used. The IR scheme is somewhat more complicated than the CC scheme, but has superior performance. As the transmission rate of the communication system increases, a technology for segmenting one large transport block into several code blocks (CBs) is sometimes used. The transmitter attaches cyclic redundancy check (CRC) to each code block as well as the entire transport block, and the receiver checks the CRC for each code block to request retransmission of a code block group (CBG) including a code block or multiple code blocks in which errors has occurred, thereby saving radio resources and improving transmission efficiency.

Figure 23:
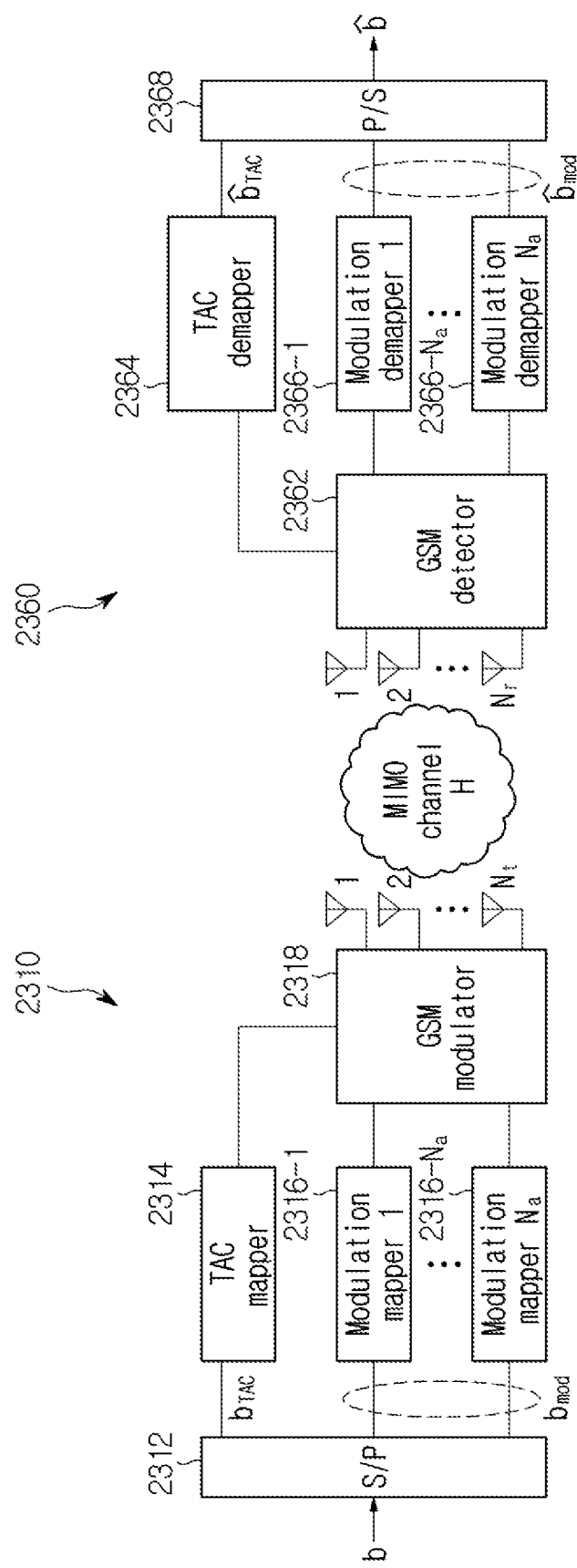
FIG. 23 is a diagram showing structures of a transmitter and a receiver using a generalized spatial modulation (GSM) technique applicable to the present disclosure.

FIG. 23 is a diagram showing structures of a transmitter and a receiver using a GSM technique applicable to the present disclosure. FIG. 23 illustrates the structure of a transmitter 2310 and a receiver 2360.

Referring to FIG. 23, the transmitter 2310 includes a serial-to-parallel converter 2312, a TAC mapper 2314, a plurality of modulation mappers 2316-1 to 2316-$N_a$, and a GSM modulator 2318. The serial-to-parallel converter 2312 parallelizes input transmission bits b. $b_{TAC}$, which is a part of the parallelized b, is provided to the TAC mapper 2314, and the rest $b_{mod}$ is provided to the plurality of modulation mappers 2316-1 to 2316-$N_a$. The TAC mapper 2314 determines an antenna combination to be used to transmit modulation symbols according to the value of $b_{TAC}$, and provides the GSM modulator 2318 with the result of determination. The plurality of modulation mappers 2316-1 to 2316-$N_a$ generates modulation symbols from $b_{mod}$ according to a constellation. The GSM modulator 2318 forms a GSM symbol so that the modulation symbols output from the plurality of modulation mappers 2316-1 to 2316-$N_a$ are transmitted through at least one transmit antenna determined by the TAC mapper 2314. That is, the GSM modulator 2318 maps the modulation symbols to the selected transmit antenna combination. The modulation symbols mapped to the antennas are transmitted through $N_a$ antennas determined by the TAC mapper 2314 among the $N_t$ transmit antennas after processing such as analog conversion, RF conversion, and amplification, and are received through the MIMO channel by the receiver 2360.

Referring to FIG. 23, the receiver 2360 includes a GSM detector 2362, a TAC demapper 2364, a plurality of modulation demappers 2366-1 to 2366-$N_a$, and a parallel-to-serial converter 2368. The GSM detector 2362 detects GSM symbols received through $N_r$ antennas. That is, the GSM detector 2362 identifies at least one antenna used by the transmitter 2310 to transmit modulation symbols, and detects the modulation symbols. To this end, the GSM detector 2362 may estimate a MIMO channel. The GSM detector 2362 may detect a GSM symbol based on the estimated MIMO channel. Additionally, the GSM detector 2362 may perform an equalization operation based on the estimated MIMO channel. The TAC demapper 2364 outputs bits $\hat{b}_{TAC}$ corresponding to the transmit antenna combination detected by the GSM detector 2362. The plurality of modulation demappers 2366-1 to 2366-$N_a$ outputs bits $\hat{b}_{mod}$ corresponding to the modulation symbols detected by the GSM detector 2362 according to the constellation. The parallel-to-serial converter 2368 serializes the input and $\hat{b}_{TAC}$ and $\hat{b}_{mod}$ outputs an estimate $\hat{b}$ of transmission bits.

Although not shown in FIG. 23, the transmitter 2310 may perform channel coding and the receiver 2360 may perform channel decoding. Channel coding may be performed anywhere in front stage of the TAC mapper 2314 and the plurality of modulation mappers 2316-1 to 2316-$N_a$, and channel decoding may be performed anywhere in the rear stage of the TAC demapper 2364 and the plurality of modulation demappers 2366-$N_a$. For example, channel coding may be performed on bits input to the serial-to-parallel converter 2312 or bits output from the serial-to-parallel converter 2312. Also, channel decoding may be performed on bits input to the parallel-to-serial converter 2368 or bits output from the parallel-to-serial converter 2368.

The transmitter and receiver illustrated in FIG. 23 may be understood as any one of 'terminal and base station', 'base station and terminal', 'base station and base station', and 'terminal and terminal'. For example, in the case of downlink communication, a transmitter is included in a base station and a receiver is included in a terminal. As another example, in the case of uplink communication, a transmitter is included in a terminal and a receiver is included in a base station. As another example, in case of terminal-to-terminal communication, a transmitter is included in a first terminal and a receiver is included in a second terminal. As another example, in the case of wireless backhaul communication, a transmitter is included in a first base station and a receiver is included in a second base station. That is, the transmitter and receiver illustrated in FIG. 23 or the transmitter and receiver described below may be included in various devices.

MIMO transmission based on GSM technology is possible using the transmitter and the receiver having structures shown in FIG. 23. The GSM system expresses data through modulation symbols transmitted through a TAC and active antennas for every symbol. For example, if a total of 4 transmit antennas are used and data is transmitted through 2 antennas per symbol, one of 6 TACs may be selected per symbol. Among them, if four TACs are designated as selectable candidates and information bits are mapped per TAC, 2-bit information may be transmitted through the TAC. Additionally, when a QPSK symbol is transmitted through each of the two antennas, a total of 6 bits may be transmitted. An example of information expressed by TACs composed of two of four antennas is shown in Table 6 below.

TABLE 6

| Transmit antenna combination | Information bits |
|---|---|
| (1, 2) | 00 |
| (1, 3) | N/A |

TABLE 6-continued

| Transmit antenna combination | Information bits |
|---|---|
| (1, 4) | 01 |
| (2, 3) | 10 |
| (2, 4) | 11 |
| (3, 4) | N/A |

The GSM system transmits data through modulation symbols transmitted through the TAC and each active antenna for every GSM symbol. The receiver may recover data through demodulation of the modulation symbols detected in each active antenna and TAC detection. Maximum likelihood (ML) detection compares the received signal with candidates of combinations of all transmittable TACs and modulation symbols in which the channel effect is reflected, and determines the most probable combination of TAC and modulation symbols. Thus, ML detection may provide optimal performance. However, since the complexity of ML detection increases exponentially as the number of transmit/receive antennas increases, implementation of ML detection in a massive MIMO system requires large cost. As a method of reducing complexity, a GSM detection algorithm that first detects a TAC and demodulates an active antenna signal of the detected TAC may be used.

Since the TAC detection algorithm and the demodulation algorithm of modulation symbols are different, it is highly likely that error rates of data carried by the TAC and data transmitted by the modulation symbols appear with different probabilities. In addition, it is difficult to assume that various channel characteristics appear with the same error probability in data carried by the TAC and data carried by the modulation symbols. Therefore, applying, to the GSM system, the existing AMC technology in which the transmitter determines channel quality by measuring the SINR of a pilot signal transmitted in a state of being mixed with data and selects a MCS based on the channel quality without change has the following problems.

First, channel qualities experienced by data carried by the TAC and data carried by the modulation symbols may be different from each other. Furthermore, a difference in channel quality may not be constant according to temporal and spatial environments. Second, the SINR of the modulation symbol and the actual error rate may not coincide due to a burst error due to a TAC detection error. Third, in selecting a MCS based on the measured channel quality, the TAC cannot select a modulation method and order.

There is a need for an AMC structure and method capable of maximizing a data transmission rate while efficiently solving the aforementioned problems in a GSM system. In addition, HARQ, which allows a certain level of transport block error in initial transmission and recovers through retransmission, is affected by the structure of AMC. Therefore, a HARQ structure suitable for a new AMC structure is also required.

Figure 24:
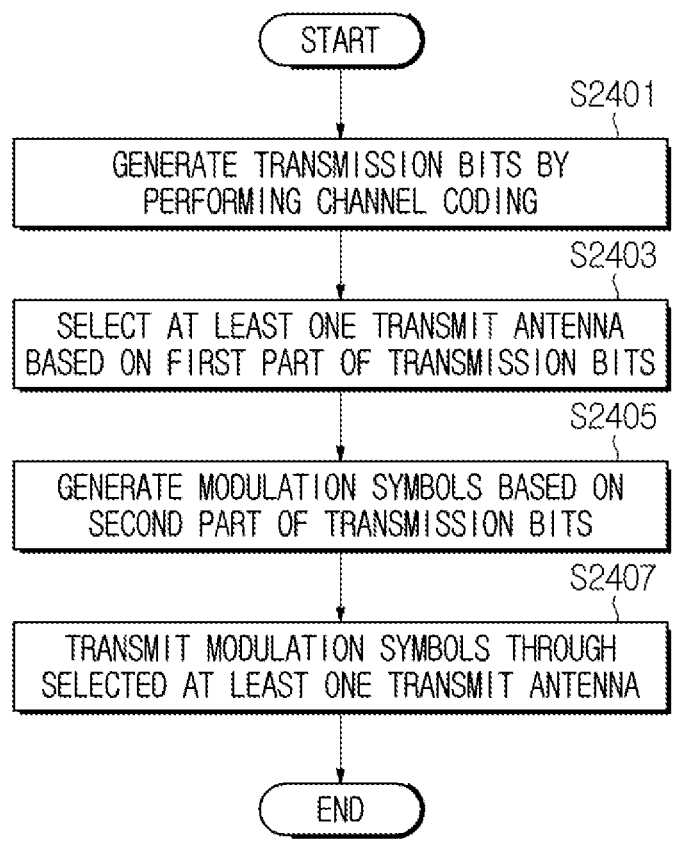
FIG. 24 is a diagram illustrating an embodiment of a procedure for transmitting a signal in an apparatus applicable to the present disclosure.

FIG. 24 is a diagram illustrating an embodiment of a procedure for transmitting a signal in a device applicable to the present disclosure. FIG. 24 illustrates a method of operating a device including a transmitter (e.g., the transmitter 2310 of FIG. 23). In the following description, the operating subject of FIG. 24 is referred to as an 'device', but may be referred to as a transmission end, a transmission device, a transmitter, or other terms having equivalent technical meaning.

Referring to FIG. 24, in step S2401, the device generates transmission bits by performing channel coding. The device determines encoded bits from information bits and may use at least one encoder. According to an embodiment, channel coding may be performed separately on transmission bits to be carried by the TAC and transmission bits to be carried by the modulation symbols. According to another embodiment, channel coding may be performed without distinction between transmission bits to be carried by the TAC and transmission bits to be carried by the modulation symbols. In this case, a coding rate (CR) of channel coding may be selected based on channel quality measured using a pilot signal and transmitted through signaling between a transmitter and a receiver. Here, the pilot signal may be referred to as a 'reference signal' or another term having an equivalent technical meaning.

In step S2403, the device selects at least one transmit antenna based on a first part of transmission bits. In other words, the device selects a TAC corresponding to the value of the first part. The first part includes at least one bit present at a position indicated by a configuration related to GSM in a bit block segmented in units of GSM symbols.

In step S2405, the device generates modulation symbols based on a second part of the transmission bits. In other words, the device generates modulation symbols corresponding to the value of the second part based on the constellation according to the set modulation method and modulation order. The number of modulation symbols may be equal to the number of antennas included in the selected TAC. In this case, a modulation method and a modulation order may be selected based on channel quality measured using the pilot signal and transmitted through signaling between the transmitter and the receiver.

In step S2407, the device transmits modulation symbols through the selected at least one transmit antenna. That is, the device transmits modulation symbols generated based on the second part through at least one transmit antenna included in the TAC corresponding to the value of the first part.

Figure 25:
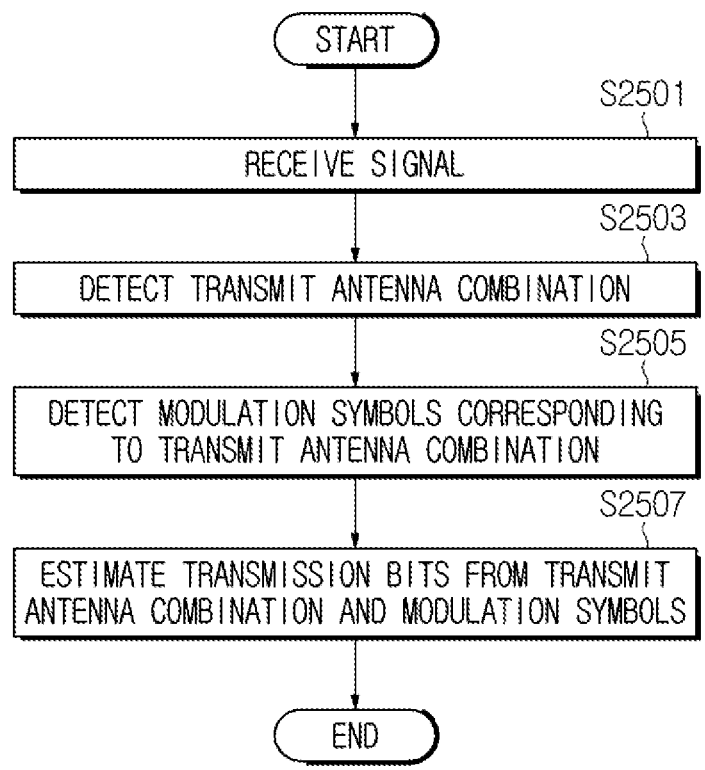
FIG. 25 is a diagram illustrating an embodiment of a procedure for receiving a signal in an apparatus applicable to the present disclosure.

FIG. 25 is a diagram illustrating an embodiment of a procedure for receiving a signal in a device applicable to the present disclosure. FIG. 25 illustrates a method of operating a device including a receiver (e.g., the receiver 2360 of FIG. 23). In the following description, the operating subject of FIG. 25 is referred to as an 'device', but may be referred to as a reception end, a reception device, a receiver, or other terms having equivalent technical meaning.

Referring to FIG. 25, in step S2501, the device receives a signal. The device receives a signal transmitted through at least one of a plurality of transmit antennas from a counterpart device. In this case, the device may generate the received signal on the premise that signals are transmitted through all transmit antennas available in the counterpart device. The received signal is a vector or matrix of signals, and may include signals for each transmit antenna of the counterpart device. In this case, at least one signal corresponding to some antennas may include only noise.

In step S2503, the device detects a transmit antenna combination. The device may detect the transmit antenna combination based on the received signal. Among the signals for each antenna included in the received signal, a signal corresponding to an antenna that did not transmit the signal in the counterpart device may have a lower energy value than a signal corresponding to an antenna that transmitted a signal. Accordingly, the device may identify at least one antenna that transmitted a signal, that is, a transmit antenna combination, based on the energy level of signals for each transmit antenna included in the received signal. Alternatively, the device may identify a transmit antenna combination based on a maximum likelihood (ML) method. That is, the device may select a received signal candidate most similar to the generated received signal among received signal candidates corresponding to all possible transmit antenna combinations, and determine the transmit antenna combination corresponding to the selected candidate as the used transmit antenna combination.

In step S2505, the device detects modulation symbols corresponding to the detected transmit antenna combination. The device estimates modulation symbols transmitted by at least one antenna belonging to a transmit antenna combination. To this end, the device may remove interference between channels for each antenna and estimate modulation symbols. That is, the device may detect a modulation symbol corresponding to at least one antenna belonging to the transmit antenna combination from the received signal by performing a MIMO detection operation. To this end, the device requires information on a modulation method and a modulation order. A modulation method and a modulation order of a modulation symbol may be selected based on channel quality measured using a pilot signal and transmitted through signaling between a transmitter and a receiver prior to this procedure.

In step S2507, the device estimates transmission bits from the transmit antenna combination and modulation symbols. The device may estimate a first part of transmission bits from the transmit antenna combination and estimate a second part of transmission bits by demodulating the detected modulation symbols.

Although not shown in FIG. 25, the device may perform channel decoding on bits including the first part and the second part. According to an embodiment, channel decoding may be separately performed on the first part estimated from the TAC and the second part estimated from the modulation symbols. According to another embodiment, channel decoding may be performed without distinction between the first part and the second part. To this end, the device requires information on a coding rate. A coding rate of channel decoding may be selected based on channel quality measured using a pilot signal and signaled between the device and the counterpart device prior to this procedure. For example, information on the coding rate may be signaled along with scheduling information of the signal received in step S2501.

As described with reference to FIGS. 24 and 25, the transmitter and the receiver may perform channel coding/decoding and modulation/demodulation according to a coding rate and a modulation order determined based on channel quality. To this end, the transmitter may transmit a pilot signal for measuring channel quality, and the receiver may measure channel quality based on the pilot signal. Structures of a transmitter and a receiver for using channel quality information will be described with reference to FIGS. 26A and 26B.

Figure 26A:
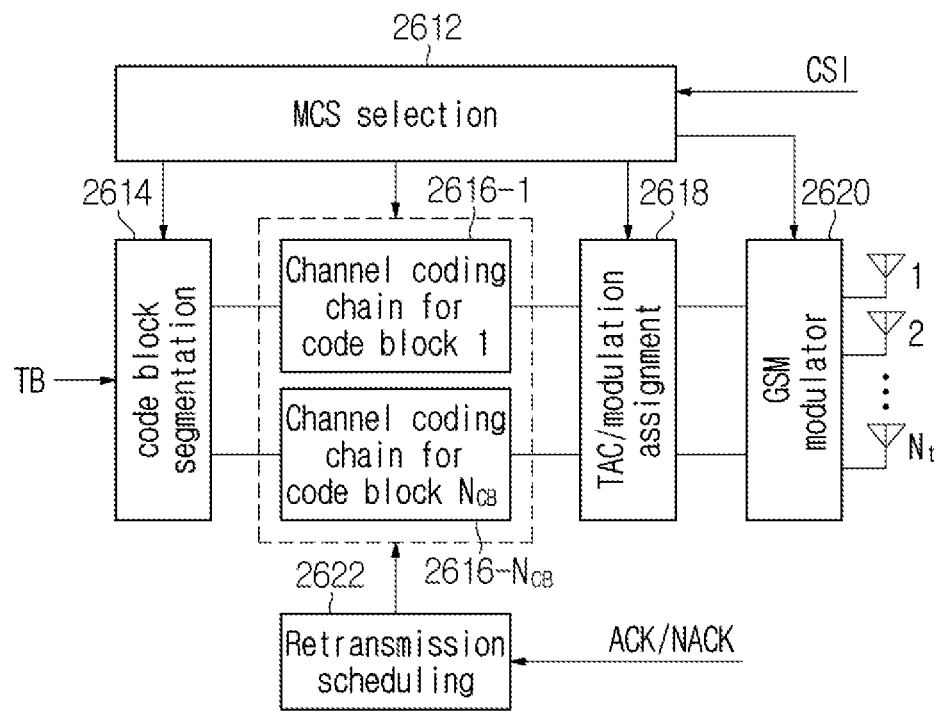
FIG. 26A is a diagram illustrating a structure for using channel quality of a transmitter using a GSM technique applicable to the present disclosure.

FIG. 26A is a diagram illustrating a structure for using channel quality of a transmitter using a GSM technique applicable to the present disclosure.

Referring to FIG. 26A, the transmitter includes an MCS selection unit 2612, a code block segmentation unit 2614, and a plurality of channel coding chains 2616-1 to 2616-$N_{CB}$, a TAC/modulation assignment unit 2618, and a GSM transmitter 2620.

The MCS selection unit 2612 determines an MCS level, that is, a coding rate and a modulation order, based on channel state information (CSI) fed back from the receiver. The determined coding rate and modulation order are provided to other blocks that perform operations related to channel coding and encoding. Here, CSI may include channel quality information. For example, the channel quality information may include at least one of a first CQI related to TAC, a second CQI related to modulation symbols, and a third CQI considering burst error. Here, the third CQI may be replaced with an offset value relative to the first CQI or the second CQI. Alternatively, the third CQI may be replaced with another type of value for determining the third CQI.

The code block segmentation unit 2614 segments an input transport block (TB) into code blocks. The code block segmentation unit 2614 may segment the transport block based on channel quality information provided from the MCS selection unit 2612. For example, the code block segmentation unit 2614 determines the size of a data block (e.g., transport block) to be transmitted based on the CQI every transmit time interval (TTI), and obtains data of the determined size from a higher layer. Depending on the size of the transport block, the entire transport block may become one code block or may be segmented into two or more code blocks.

The plurality of channel coding chains 2616-1 to 2616-$N_{CB}$ performs channel coding on $N_{CB}$ code blocks. Here, $N_{CB}$ is an integer greater than or equal to 1. The plurality of channel coding chains 2616-1 to 2616-$N_{CB}$ shown in FIG. 26A may be understood as $N_{CB}$ physical circuits or $N_{CB}$ sequential or parallel channel coding operations by at least one circuit. When only one code block is derived from one transport block, the plurality of channel coding chains 2616-1 to 2616-$N_{CB}$ may be replaced with one channel coding chain.

The TAC/modulation assignment unit 2618 segments into block units corresponding to GSM symbols, and segments the bits of each block into a first part carried by the TAC and a second part carried by the modulation symbols. The $b_{TAC}$ including the first part and the $b_{MOD}$ including the second part are provided to the GSM transmitter 2620 in a distinguishable format.

The GSM transmitter 2620 generates a GSM symbol using the input first and second parts. An antenna combination to be used to transmit modulation symbols is determined based on the value of the first part, and modulation symbols are generated according to a constellation based on the value of the second part. At this time, the GSM transmitter 2620 may generate modulation symbols according to the modulation order indicated by the MCS selection unit 2612. Modulation symbols are transmitted through $N_a$ antennas determined based on the first part among $N_t$ transmit antennas after processing such as analog conversion, RF conversion, and amplification.

A retransmission scheduling unit 2622 schedules retransmission of data based on ACK/NACK information fed back from the receiver. The retransmitted data may include at least one code block. The retransmission scheduling result is transmitted to the plurality of channel coding chains 2616-1 to 2616-$N_{CB}$, and the plurality of channel coding chains 2616-1 to 2616-$N_{CB}$ outputs code blocks to be retransmitted according to the scheduling result.

Figure 26B:
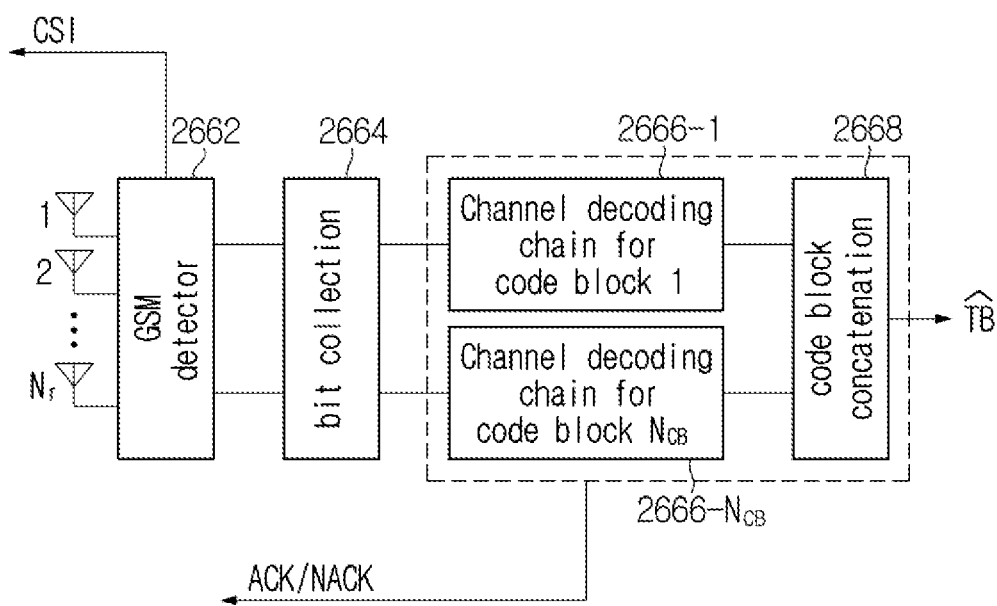
FIG. 26B is a diagram illustrating a structure for feeding back channel quality of a receiver using a GSM technique applicable to the present disclosure.

FIG. 26B is a diagram illustrating a structure for feeding back channel quality of a receiver using a GSM technique applicable to the present disclosure.

Referring to FIG. 26B, the receiver includes a GSM detector 2662, a bit collection unit 2664, a plurality of channel decoding chains 2666-1 to 2666-$N_{CB}$, and a code block concatenation unit 2668.

The GSM detector 2662 detects GSM symbols received through $N_r$ antennas. That is, the GSM detector 2662 identifies at least one antenna used by the transmitter to transmit modulation symbols and detects modulation symbols. The GSM detector 2662 estimates transmission bits from the TAC containing the identified at least one antenna and modulation symbols. The estimation result of the transmission bits may be a hard decision bit or include a log-likelihood ratio (LLR) or other type of soft decision value.

The bit collection unit 2664 collects estimated bit values and outputs the collected bit values in units of code blocks. In other words, the bit collection unit 2664 buffers the estimated bit values to form a channel-decodable bit block.

The plurality of channel decoding chains 2666-1 through 2666-$N_{CB}$ performs channel decoding on $N_{CB}$ code blocks. Also, each of the plurality of channel decoding chains 2666-1 to 2666-$N_{CB}$ may perform CRC check on the decoded code blocks. Here, $N_{CB}$ is an integer greater than or equal to 1. The plurality of channel decoding chains 2666-1 to 2666-$N_{CB}$ shown in FIG. 26B may be understood as $N_{CB}$ physical circuits or $N_{CB}$ sequential or parallel channel decoding operations by at least one circuit. When only one code block is derived from one transport block, the plurality of channel decoding chains 2666-1 to 2666-$N_{CB}$ may be replaced with one channel decoding chain.

The code block concatenation unit 2668 reconstructs the transport block by concatenating the decoded code blocks. The code block concatenation unit 2668 may perform CRC check on the transport block. By the CRC check results of the plurality of channel decoding chains 2666-1 to 2666-$N_{CB}$ and the code block concatenation unit 2668, successful reception of each code block and successful reception of the transport block may be determined. Successful reception of the code block or transport block may be fed back to the transmitter through ACK/NACK information.

ACK/NACK information includes one of ACK indicating successful reception of all code blocks or NACK indicating reception failure of code blocks or transport blocks. A target indicated by NACK may be at least one code block, at least one code block group, or a transport block. For example, the ACK/NACK information may include a bitmap including bits corresponding to all code blocks or all code block groups. In this case, each bit included in the bitmap is set to a value indicating whether each code block or code block group has been successfully received. As another example, the ACK/NACK information may include an index of a code block or code block group that has failed to be received.

According to the structures of the transmitter and receiver described with reference to FIGS. 26A and 26B, the transport block may be segmented into a plurality of code blocks or transmitted as one code block according to the size of the transport block. Although not shown in FIGS. 26A and 26B, whether it is segmented into code blocks may be shared between the transmitter and the receiver through signaling (e.g., L1 signaling). For example, in the case of downlink in a cellular network, a base station including a transmitter may notify a terminal including a receiver of whether to transmit code block segmentation through signaling. In the case of uplink, a base station including a receiver instructs a terminal including a transmitter to transmit code block segmentation through signaling, and the terminal may transmit data according to signaling.

According to the structures of the transmitter and receiver described with reference to FIGS. 26A and 26B, CSI, that is, channel information, may be fed back. However, depending on circumstances, for example, when the receiver controls operation of the transmitter, feedback of channel information may be omitted. Here, a plurality of channel quality values may be included in the channel information. The reason why a plurality of channel quality values is included is as follows.

The influence of channels on data carried by the TAC and data carried by the modulation symbols are different. Also, the TAC detection and modulation symbol demodulation algorithms may not be the same. Furthermore, since the influence of the channel may change depending on the temporal and spatial environment, it may be effective to separately generate CQI for the TAC and the modulation symbols. In this case, the transmitter may select an MCS level for data carried by the TAC and an MCS level for data carried by the modulation symbols based on each CQI, or select an MCS level based on a CQI obtained by combining two CQIs. Therefore, compared to the case of using one CQI, using a plurality of CQIs is advantageous in terms of flexibility and optimization. For convenience of description below, the CQI for the TAC is referred to as '$CQI_{TAC}$' and the CQI for the modulation symbols is referred to as '$CQI_{MOD}$'.

$CQI_{MOD}$ may be determined by measuring the SINR of the received pilot signal assuming that there is no TAC detection error. However, since non-occurrence of TAC detection errors cannot be guaranteed, it is preferable that TAC detection errors are taken into account. If a burst error occurs due to a TAC detection error, the symbol error and bit error of the modulation symbol may become larger than predicted by the SINR of the pilot signal. If the TAC detection error is large and the modulation order increases, the burst error also increases. Therefore, the transmitter needs to select the MCS considering the TAC detection error. Since the TAC detection error, resulting burst error of modulation symbols, and overall GSM receiver performance (e.g., BLER, etc.) may vary depending on the reception algorithm, when the receiver calculates a CQI adjustment value due to the burst error, it is possible to provide a more accurate result. The receiver may calculate a TAC detection error probability from $CQI_{TAC}$, and calculate a burst error probability of modulation symbols from the calculated error probability. The CQI subjected to burst error adjustment (BEA) in $CQI_{MOD}$ may be expressed as [Equation 2] below.

$$CQI_{MOD,BEA} = CQI_{MOD} - CQI_{BEA\text{-}Offset} \qquad \text{[Equation 2]}$$

In [Equation 2], $CQI_{MOD,BEA}$ denotes CQI subjected to BEA in $CQI_{MOD}$, $CQI_{MOD}$ denotes CQI for modulation symbols assuming that there is no burst error, and $CQI_{BEA\text{-}offset}$ denotes an adjustment offset (>0). $CQI_{BEA\text{-}offset}$ may change according to channel conditions such as noise and interference signal strength and target BLER.

When transmitting CQI information from the receiver to the transmitter, the receiver may transmit $CQI_{TAC}$, $CQI_{MOD}$ and $CQI_{BEA\text{-}offset}$. When $CQI_{BEA\text{-}offset}$ is 0, the receiver may set $CQI_{BEA\text{-}Offset}$ to 0 in feedback information. Alternatively, when $CQI_{BEA\text{-}offset}$ is 0, the receiver may transmit only $CQI_{TAC}$ and $CQI_{MOD}$ except for $CQI_{BEA\text{-}offset}$. In this case, the transmitter interprets absence of $CQI_{BEA\text{-}Offset}$ as $CQI_{BEA\text{-}offset}$ being 0. If a plurality of CQI values is transmitted using the same time and frequency resources, when $CQI_{BEA\text{-}offset}$ is transmitted, the coding rate is higher than when $CQI_{BEA\text{-}Offset}$ is not transmitted. To compensate for the increased coding rate, the receiver may increase transmit power.

When the number and type of CQI values included in fed-back channel information are variable, a method of determining the number of CQI values in a device receiving channel information is required. The number of CQI values included in the channel information may be determined by blind detection or an indication.

According to an embodiment, blind detection based on a difference in coding rates may be used. The transmitter may perform decoding on both code rates (e.g., when $CQI_{BEA\text{-}Offset}$ is included and when it is not included), and find out transmitted CQI information according to decoding successful for reconstruction. That is, the receiver transmitting the channel information may maintain the transmission quality and the transmitter may perform blind detection by differentiating the coding rate, transmit power, etc. between the case where $CQI_{BEA\text{-}Offset}$ is transmitted and the case where $CQI_{BEA\text{-}offset}$ is not transmitted.

According to another embodiment, an explicit or implicit indication may be used. The receiver may add an indication indicating items included in the channel information. The transmitter may determine whether only $CQI_{TAC}$ and $CQI_{MOD}$ have been transmitted or whether all of $CQI_{TAC}$, $CQI_{MOD}$ and $CQI_{BEA\text{-}offset}$ have been transmitted through the indication.

According to the structures of the transmitter and receiver described with reference to FIGS. 26A and 26B, ACK/NACK may be fed back. However, depending on circumstances, for example, when the receiver controls operation of the transmitter, ACK/NACK feedback may be omitted. For example, in the case of downlink of a cellular network, the terminal transmits ACK/NACK information to the base station. As another example, in the case of uplink, since a base station performing scheduling of radio resources includes a receiver, a code block to be retransmitted to the terminal may be indicated through signaling (e.g., L1 signaling) without the need to transmit ACK/NACK to the terminal. Accordingly, the transmitter may retransmit a transport block, code block, or code block group, in which error occurs, according to ACK/NACK or scheduling information.

Similarly, in the case of downlink of a cellular network, the terminal may transmit, to the base station, all of $CQI_{TAC}$, $CQI_{MOD}$, and $CQI_{BEA\text{-}offset}$ or transmit only $CQI_{TAC}$ and $CQI_{MOD}$. On the other hand, in the case of uplink of a cellular network, since a terminal includes a transmitter and a base station includes a receiver, the base station obtains CQI information using a pilot signal transmitted by the terminal. Even if the terminal is a transmitter, all information necessary for transmission is generally provided from the base station to the terminal. In this case, since the terminal may not require CQI information, a separate CQI feedback operation may not be performed. The case of downlink will be described in more detail with reference to FIG. 27 and the case of uplink will be described in more detail with reference to FIG. 28.

Figure 27:
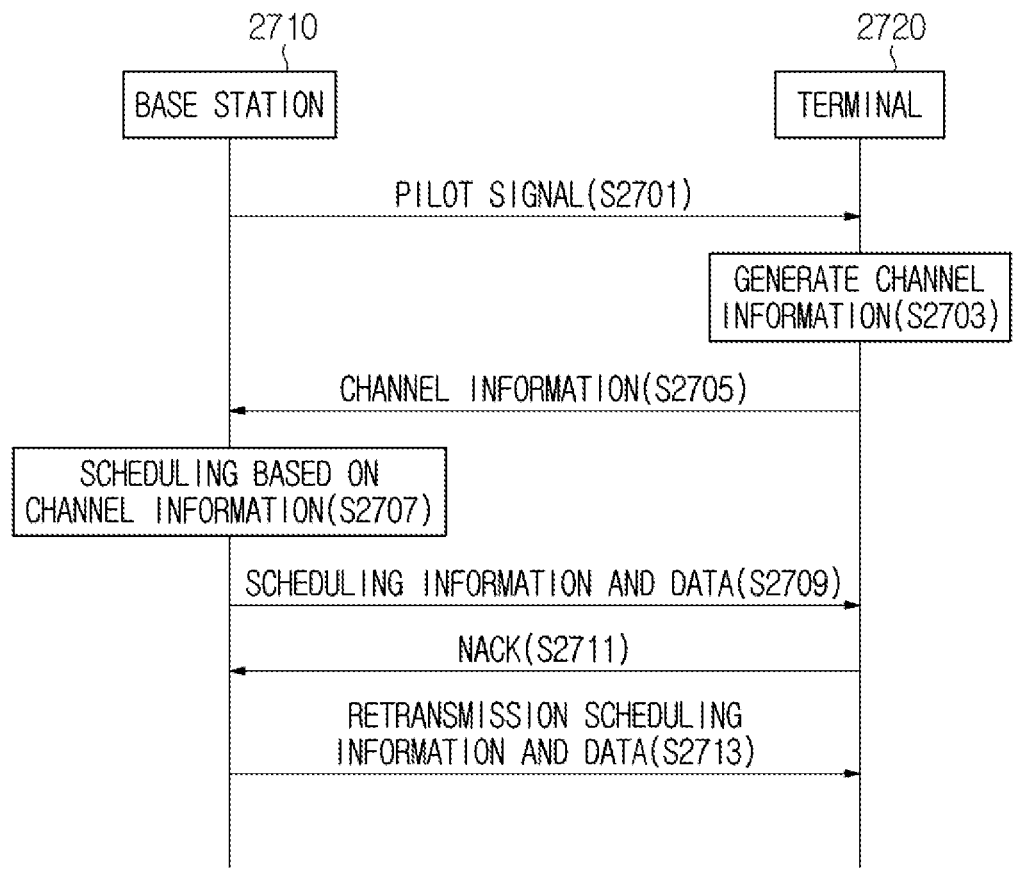
FIG. 27 is a diagram illustrating an embodiment of a procedure for downlink communication in a base station and a terminal applicable to the present disclosure.

FIG. 27 is a diagram illustrating an embodiment of a procedure for downlink communication in a base station and a terminal applicable to the present disclosure. FIG. 27 illustrates signal exchange between a base station 2710 and a terminal 2720. In FIG. 27, the base station 2710 includes the transmitter of FIG. 26A and the terminal 2720 includes the receiver of FIG. 26B.

Referring to FIG. 27, in step S2701, the base station 2710 transmits a pilot signal to the terminal 2720. The pilot signal may be repeatedly transmitted at least as many times as the number of candidate TACs, and the TAC used in each repetition may be different. For example, the base station 2710 may periodically transmit a pilot signal composed of the promised TAC and modulation signals. Although not shown in FIG. 27, prior to transmission of a pilot signal, the base station 2710 may transmit configuration information for channel measurement to the terminal. For example, the configuration information includes at least one of information related to a sequence constituting a pilot signal, information related to a resource for a pilot signal, information related to content of a report of channel information, or information related to a resource for a report of channel information.

In step S2703, the terminal 2720 generates channel information. That is, the terminal 2720 estimates the channel using the pilot signal and generates channel information representing the result of estimation. The channel information may include at least one of a first CQI related to the TAC, a second CQI related to the modulation symbols, a third CQI considering burst error, and an offset of the third CQI relative to the first CQI or the second CQI. The first CQI and the second CQI may be obtained from a pilot signal transmitted from the base station 2710.

In step S2705, the terminal 2720 transmits channel information to the base station 2710. In this case, a coding rate and transmit power applied to data including channel information may vary according to the number of CQI values included in the channel information. According to an embodiment, the channel information may further include an indication indicating an item included in the channel information. The base station 2710 may determine the number of CQI values included in channel information using an indication or through blind detection and obtain CQI values.

In step S2707, the base station 2710 performs scheduling based on channel information. For example, the base station 2710 may determine a MCS level applied to data and determine a code block assignment method.

In step S2709, the base station 2710 transmits scheduling information and data to the terminal 2720. The scheduling information may indicate time-frequency resources and MCS levels assigned for data. In addition, the scheduling information may further include information on a code block segmentation method of data. The terminal 2720 may receive a signal including data in a time-frequency resource indicated by scheduling information and estimate data from the signal. At this time, the terminal 2720 may determine whether reception is successful for each code block by performing CRC check using the CRC attached to the code block.

In step S2711, the terminal 2720 transmits NACK to the base station 2710. That is, the example of FIG. 27 assumes that reception of at least one code block has failed. If reception is successful, the terminal 2720 may transmit ACK instead of NACK. Here, NACK may indicate which code block or code block group among at least one code block or code block group included in transmitted data requires retransmission.

In step S2713, the base station 2710 transmits retransmission scheduling information and data to the terminal 2720. After performing scheduling for retransmission, the base station transmits retransmission scheduling information and data. That is, the base station 2710 assigns resources for at least one code block or code block group for which retransmission is requested, and retransmits the at least one code block or code block group through the assigned resource.

Figure 28:
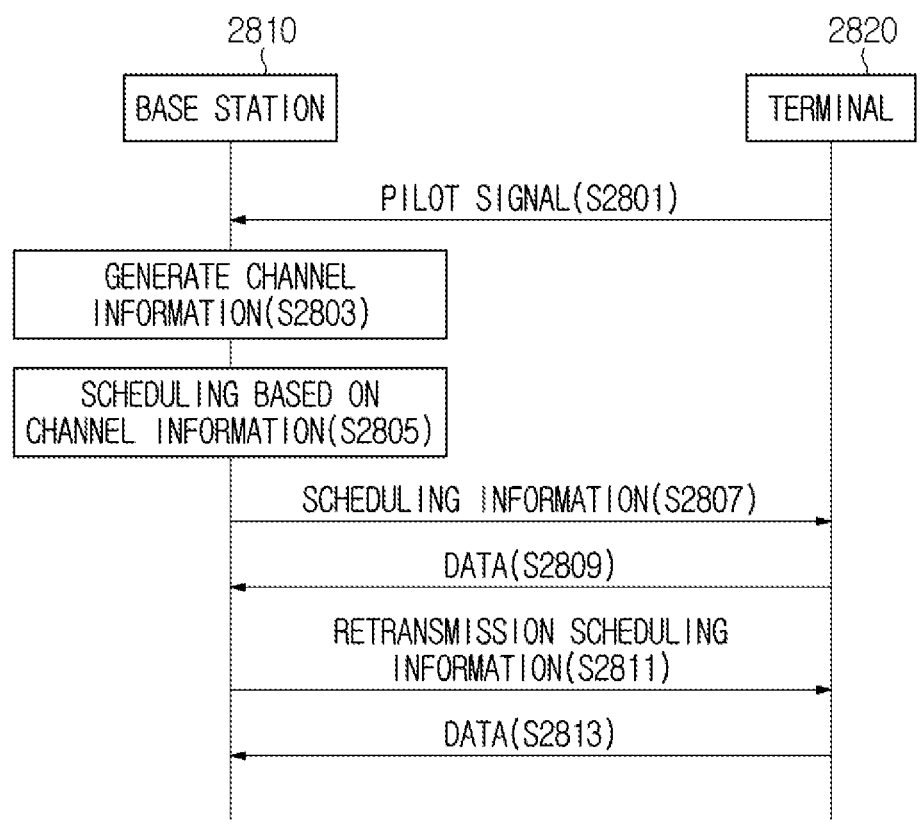
FIG. 28 is a diagram illustrating another embodiment of a procedure for uplink communication in a base station and a terminal applicable to the present disclosure.

FIG. 28 is a diagram illustrating another embodiment of a procedure for uplink communication in a base station and a terminal applicable to the present disclosure. FIG. 28 illustrates signal exchange between a base station 2810 and a terminal 2820. In FIG. 28, the base station 2810 includes the receiver of FIG. 26B and the terminal 2820 includes the transmitter of FIG. 26A.

Referring to FIG. 28, in step S2801, the terminal 2820 transmits a pilot signal to the base station 2810. The pilot signal may be repeatedly transmitted at least as many times as the number of candidate TACs, and the TAC used in each repetition may be different. For example, the terminal 2820 may periodically transmit a pilot signal composed of the promised TAC and modulation signals. Although not shown in FIG. 28, prior to transmission of a pilot signal, the base station 2810 may transmit configuration information for the pilot signal to the terminal. For example, the configuration information includes at least one of information related to a sequence or information related to a resource for a pilot signal.

In step S2803, the base station 2810 generates channel information. That is, the base station 2810 estimates a channel using the pilot signal and generates channel information representing the result of estimation. The channel information may include at least one of a first CQI related to the TAC, a second CQI related to the modulation symbols, a third CQI considering burst error, and an offset of the third CQI relative to the first CQI or the second CQI. The first CQI and the second CQI may be obtained from a pilot signal transmitted from the terminal 2820.

In step S2805, the base station 2810 performs scheduling based on the channel information. For example, the base station 2810 may determine an MCS level applied to data to be transmitted by the terminal 2820 and determine a code block assignment method.

In step S2807, the base station 2810 transmits scheduling information to the terminal 2820. Scheduling information may indicate time-frequency resources and MCS levels assigned for data. In addition, the scheduling information may further include information on a code block segmentation method of data. The terminal 2820 may identify time-frequency resources to be used for data transmission through the scheduling information.

In step S2809, the terminal 2820 transmits data to the base station 2810. That is, the terminal 2820 may perform channel coding and modulation on data according to the MCS level indicated by the scheduling information, form a GSM symbol, and transmit the GSM symbol including the data. Accordingly, the base station 2810 receives the GSM symbol and performs demodulation and channel decoding. In addition, the base station 2810 may determine whether reception is successful for each code block by performing CRC check using the CRC attached to the code block.

In step S2811, the base station 2810 transmits retransmission scheduling information to the terminal 2820. That is, the example of FIG. 28 assumes that reception of at least one code block has failed. If reception is successful, this step and the following step S2813 may be omitted. Here, the retransmission scheduling information may indicate which code block or code block group among at least one code block or code block group included in transmitted data requires retransmission.

In step S2813, the terminal 2820 retransmits data to the base station 2810. The terminal 2820 identifies a resource for at least one code block or code block group for which retransmission is requested based on the retransmission scheduling information, and retransmits the at least one code block or code block group through the identified resource.

As described with reference to FIGS. 27 and 28, the base station may perform scheduling based on channel information. Scheduling includes selection of time-frequency resources, selection of MCS levels, and the like, and more specifically, may include determination of the transport block size and the number of code blocks. The base station may determine the size of the transport block so that the block error rate (BLER) may reach a target level based on the CQI. More detailed operations for determining the size of the transport block will be described with reference to FIG. 29 below.

Figure 29:
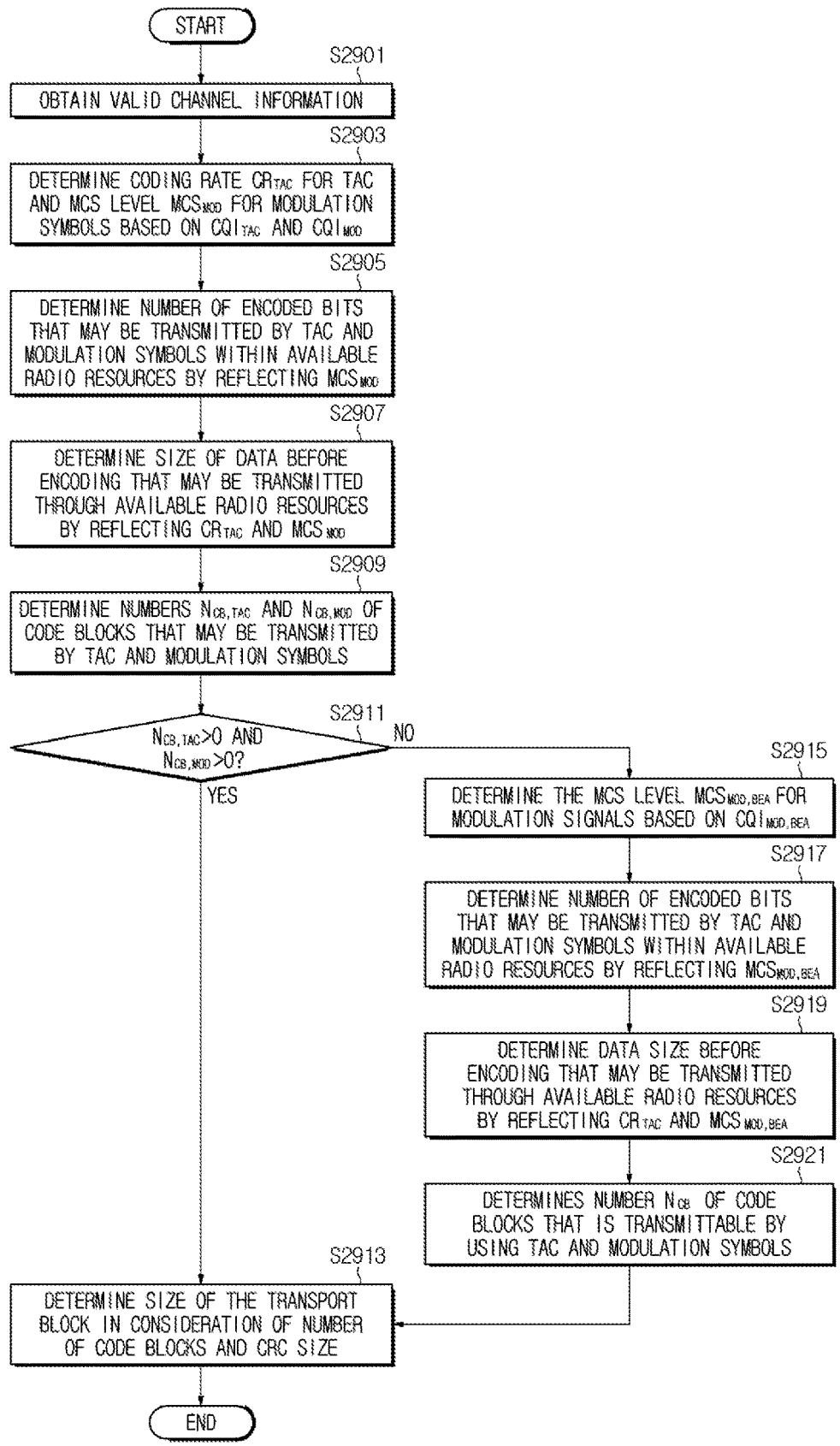
FIG. 29 is a diagram illustrating an embodiment of a procedure for determining the size of a transport block in an apparatus applicable to the present disclosure.

FIG. 29 is a diagram illustrating an embodiment of a procedure for determining the size of a transport block in an device applicable to the present disclosure. FIG. 29 illustrates operations for determining the size of a transport block during a scheduling procedure. FIG. 29 illustrates operations performed by a device that performs scheduling, and the device may be a base station, for example.

Referring to FIG. 29, in step S2901, the device obtains valid channel information. Channel information may be fed back from another device or measured by the device. Channel information may include at least one CQI value. For example, the channel information may include at least one of $CQI_{MOD}$, $CQI_{BEA-OFFSET}$ or $CQI_{MOD,BEA}$.

In step S2903, the device determines the coding rate $CR_{TAC}$ for the TAC and the MCS level $MCS_{MOD}$ for the modulation symbols based on $CQI_{TAC}$ and $CQI_{MOD}$. Here, $MCS_{MOD}$ includes a modulation method, a modulation order M, and a coding rate $CR_{MOD}$.

In step S2905, the device determines the number of encoded bits that may be carried by the TAC and modulation symbols within available radio resources by reflecting $MCS_{MOD}$. The number of bits may be expressed as in [Equation 3] below.

$$E_{TAC} = N_{symbol}\left\lfloor \log_2\binom{N_t}{N_a} \right\rfloor \qquad \text{[Equation 3]}$$

$$E_{MOD} = N_{symbol} N_a \log_2 M$$

In [Equation 3], $E_{TAC}$ denotes the number of bits that may be carried by the TAC, $N_{symbol}$ denotes the number of GSM symbols, $N_t$ denotes the number of transmit antennas, $N_a$ denotes the number of active antennas included in the TAC, and $E_{MOD}$ denotes the number of bits which may be carried by the modulation symbols, and M denotes a modulation order.

In step S2907, the device determines the size of data before encoding that may be transmitted through available radio resources by reflecting $CR_{TAC}$ and $MCS_{MOD}$. The data size before encoding, that is, the number of bits of original data may be calculated by multiplying the number of encoded bits and the coding rate. For example, the number of bits of the original data may be calculated as shown in [Equation 4] below.

$$S_{TAC} = \lfloor CR_{TAC} E_{TAC} \rfloor$$

$$S_{MOD} = \lfloor CR_{MOD} E_{MOD} \rfloor$$

$$S = S_{TAC} + S_{MOD} \qquad \text{[Equation 4]}$$

In [Equation 4], $S_{TAC}$ denotes the number of original bits that may be carried by the TAC, $CR_{TAC}$ is the coding rate for the TAC, $E_{TAC}$ denotes the number of encoded bits that may be carried by the TAC, and $S_{MOD}$ denotes the number of original bits which may be carried by the modulation symbols, $CR_{MOD}$ denotes the coding rate for the modulation symbols, $E_{MOD}$ denotes the number of encoded bits that may be carried by the modulation symbols, and S denotes the number of bits of the entire original data.

In step S2909, the device determines the numbers $N_{CB,TAC}$ and $N_{CB,MOD}$ of code blocks that may be carried by the TAC and modulation symbols. $N_{CB,TAC}$ and $N_{CB,MOD}$ may be determined as shown in [Equation 5] below.

$$N_{CB,TAC} = (S_{TAC} < K_{CB,min})?0:\{(S_{TAC} < 2K_{CB,min})?1:\lceil S_{TAC}/K_{CB,max}\rceil\}$$

$$N_{CB,MOD} = (S_{MOD} < K_{CB,min})?0:\{(S_{MOD} < 2K_{CB,min})?1:\lceil S_{MOD}/K_{CB,max}\rceil\}$$ [Equation 5]

In [Equation 5], $N_{CB,TAC}$ denotes the number of code blocks that may be carried by the TAC, $S_{TAC}$ denotes the number of original bits that may be carried by the TAC, $K_{CB,min}$ denotes the minimum size of one code block, $K_{CB,max}$ denotes the maximum size of one code block, $N_{CB,MOD}$ denotes the number of code blocks that may be carried by the modulation symbols, and $S_{MOD}$ denotes the number of original bits that may be carried by the modulation symbols. Here, $K_{CB,max}$ may be defined as a value equal to or greater than twice $K_{CB,max}$.

In step S2911, the device identifies whether $N_{CB,TAC}$ is greater than 0 and whether $N_{CB,MOD}$ is greater than 0. In other words, the device determines whether code blocks for each of the TAC and modulation symbols may be generated. That is, the device determines whether separate code blocks corresponding to each of the TAC and modulation symbols may be formed.

If $N_{CB,TAC}$ is greater than 0 and $N_{CB,MOD}$ is greater than 0, in step S2913, the device determines the size of the transport block in consideration of the number of code blocks and the CRC size. The device may determine the total number of code blocks and the size of the transport block based on $N_{CB,TAC}$ and $N_{CB,MOD}$. For example, the total number of code blocks and the size of the transport block may be determined as shown in [Equation 6] below.

$$N_{CB} = N_{CB,TAC} + N_{CB,MOD}$$

$$K_{TB} = S - N_{CB}K_{CB,CRC}$$ [Equation 6]

In [Equation 6], $N_{CB}$ denotes the total number of code blocks, $N_{CB,TAC}$ denotes the number of code blocks that may be carried by the TAC, $N_{CB,MOD}$ denotes the number of code blocks that may be carried by the modulation symbols, Km denotes the size of the transport block, S denotes the number of bits of the entire original data, and $K_{CB,CRC}$ denotes the size of the CRC attached to the code block. Here, $K_{CB,CRC}$ may be defined as smaller than $K_{CB,min}$.

On the other hand, if $N_{CB,TAC}$ is 0 or less or $N_{CB,MOD}$ is 0 or less, in step S2915, the device determines the MCS level $MCS_{MOD,BEA}$ for the modulation signals based on $CQI_{MOD,BEA}$. $MCS_{MOD,BEA}$ is an MCS level for the modulation symbols in which the effect of burst error is reflected, and includes a modulation method, a modulation order $M_{BEA}$, and a coding rate $CR_{MOD,BEA}$. Here, $CQI_{MOD,BEA}$ may be determined based on $CQI_{MOD}$ and $CQI_{BEA-OFFSET}$ or may be included in channel information.

In step S2917, the device determines the number of encoded bits that may be carried by the TAC and modulation symbols within available radio resources by reflecting $MCS_{MOD,BEA}$. The number of encoded bits may be determined as shown in [Equation 7] below.

$$E_{MOD,BEA} = N_{symbol} N_a \log_2 M_{BEA}$$ [Equation 7]

In [Equation 7], $E_{MOD,BEA}$ denotes the number of bits that may be transmitted by modulation symbols, $N_{symbol}$ denotes the number of GSM symbols, $N_a$ denotes the number of active antennas included in the TAC, and $M_{BEA}$ denotes a modulation order reflecting the effect of burst error.

In step S2919, the device determines the data size before encoding that may be transmitted through available radio resources by reflecting $CR_{TAC}$ and $MCS_{MOD,BEA}$. The data size before encoding, that is, the number of bits of the original data, may be calculated by multiplying the number of encoded bits and the coding rate. For example, the number of bits of the original data may be calculated as shown in [Equation 8] below.

$$S_{MOD,BEA} = \lfloor CR_{MOD,BEA} E_{MOD,BEA} \rfloor$$

$$S_{BEA} = S_{TAC} + S_{MOD,BEA}$$ [Equation 8]

In [Equation 8], $S_{MOD,BEA}$ denotes the number of original bits that may be carried by the modulation symbols, $C_{MOD,BEA}$ denotes the coding rate for the modulation symbols reflecting the effect of burst error, and $E_{MOD,BEA}$ denotes the number of encoded bits that may be carried by the modulation symbols, $S_{BEA}$ denotes the number of bits of the entire original data, and $S_{TAC}$ denotes the number of original bits that may be carried by the TAC.

In step S2921, the device determines the number $N_{CB}$ of code blocks that is transmittable by using the TAC and modulation symbols together. Then, in step S2913, the device determines the size of the transport block Km in consideration of the number of code blocks and the CRC size. $N_{CB}$ and $K_{TB}$ may be determined as shown in [Equation 9] below.

$$N_{CB} = \lceil S_{BEA}/K_{CB,max} \rceil$$

$$K_{TB} = (N_{CB} = 1)?S_{BEA}:(S_{BEA} - N_{CB}K_{CB,CRC})$$ [Equation 9]

In [Equation 5], $N_{CB}$ denotes the number of code blocks that may be transmitted, $S_{BEA}$ denotes the number of bits of the entire original data, $K_{CB,max}$ denotes the maximum size of one code block, Km denotes the size of the transport block, and $N_{CB}$ denotes the number of code blocks, $K_{CB,CRC}$ denotes the size of the CRC attached to the code block. Here, $K_{CB,CRC}$ may be defined as smaller than $K_{CB,min}$.

The size of actually transmitted data is calculated as shown in [Equation 10] below.

$$K_{TB,data} = K_{TB} - K_{TB,CRC}$$ [Equation 10]

In [Equation 10], $K_{TB,data}$ denotes data transmitted through a transport block, Km denotes the size of the transport block, and $K_{TB,CRC}$ denotes the size of CRC attached to the transport block.

As described with reference to FIG. 29, the size of the transport block may be determined differently depending on whether bits carried by the TAC and bits carried by the modulation symbols may be formed as separate code blocks. Whether each of the TAC and modulation symbols may correspond to separate code blocks also affects channel coding and decoding operations of GSM symbols.

If a transport block is segmented into two or more code blocks and one or more code blocks may be assigned to each of the TAC and modulation symbols, each code block may be transmitted by any one of the TAC or modulation symbols. In this case, the receiver may first correct errors by decoding the code block carried by the TAC, and mitigate the burst error of the data transmitted with modulation symbols due to TAC detection error. For convenience of description below, a method of assigning each code block to one of the TAC and modulation symbols is referred to as a 'first code block assignment method'. Structures and operations of a transmitter and a receiver in which the first code block assignment method is used will be described with reference to FIGS. 30A to 32.

If a transport block cannot be segmented into two or more code blocks or an independent code block cannot be assigned to one of the TAC and modulation symbols, the data of each code block may be transmitted using both the TAC and the modulation symbols. In this case, gain due to the diversity of transport channels can be maximized. For convenience of description below, a method of assigning one code block to the TAC and the modulation symbols is referred to as a 'second code block assignment method'. Structures and operations of a transmitter and a receiver in which the second code block assignment method is used will be described with reference to FIGS. 33A to 35.

Figure 30A:
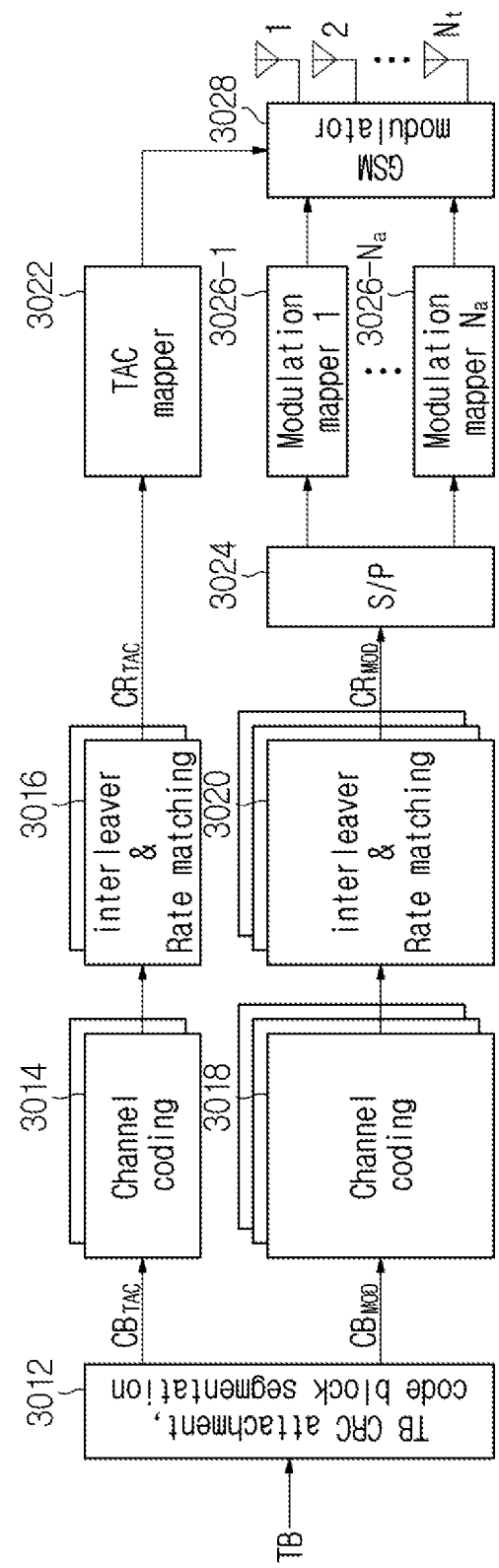
FIG. 30A is a diagram showing a structure of a transmitter for a first code block assignment method applicable to the present disclosure.

FIG. 30A is a diagram showing a structure of a transmitter for a first code block assignment method applicable to the present disclosure.

Referring to FIG. 30A, the transmitter includes a TB CRC attachment and CB segmentation unit 3012, a first channel coding unit 3014, a first interleaver and rate matching unit 3016, a second channel coding unit 3018, a second interleaver and rate matching unit 3020, a TAC mapper 3022, a serial-to-parallel converter 3024, a plurality of modulation mappers 3026-1 to 3026-$N_a$, and a GSM modulator 3028.

The TB CRC attachment and CB segmentation unit 3012 attaches CRC to a transport block and segments the CRC-attached transport block into a plurality of code blocks. For example, the TB CRC attachment and CB segmentation unit 3012 receives data with one transport block size (e.g., $K_{TB,data}$) from a higher layer and attaches CRC to form a transport block. In addition, the TB CRC attachment and CB segmentation unit 3012 segments the transport block into a first part to be carried by the TAC and a second part to be carried by the modulation symbols. In this case, the sizes of the first part and the second part may be expressed as shown in [Equation 11] below.

$$K_{TB,TAC}=S_{TAC}-N_{CB,TAC}K_{CB,CRC}$$

$$K_{TB,MOD}=K_{TB}-K_{TB,TAC} \quad \text{[Equation 11]}$$

In [Equation 11], $K_{TB,TAC}$ denotes the number of bits to be carried by the TAC of one transport block, $S_{TAC}$ denotes the number of original bits to be carried by the TAC, and $N_{CB,TAC}$ denotes the number of code blocks to be transmitted through the TAC among the code blocks from one transport block, $K_{CB,CRC}$ denotes the size of CRC attached to the code block, $K_{TB,MOD}$ denotes the number of bits to be carried by the modulation symbols of one transport block, and $K_{TB}$ denotes the size of the transport block.

The first channel coding unit 3014 attaches CRC to at least one code block (e.g., $N_{CB,TAC}$ code blocks) assigned to the TAC output from the TB CRC attachment and CB segmentation unit 3012, and performs channel coding on at least one CRC-attached code block. The first interleaver and rate matching unit 3016 interleaves bits in at least one channel-coded code block according to a set rule and performs rate matching. For example, the first interleaver and rate matching unit 3016 may repeat or shorten/puncture some of the interleaved bits. In FIG. 30A, the first channel coding unit 3014 and the first interleaver and rate matching unit 3016 are shown as a plurality of blocks to represent that channel coding/interleaving/rate matching operations are performed for each code block. It can be understood that a plurality of circuits is present in parallel or one circuit performs channel coding/interleaving/rate matching operations repeatedly or in parallel.

The second channel coding unit 3018 attaches CRC to at least one code block (e.g., $N_{CB,MOD}$ code blocks) assigned to the modulation symbols output from the TB CRC attachment and CB segmentation unit 3012, and performs channel coding on at least one CRC-attached code block. The second interleaver and rate matching unit 3020 interleaves bits in at least one channel-coded code block according to a set rule and performs rate matching. For example, the second interleaver and rate matching unit 3020 may repeat or shorten/puncture some of the interleaved bits. In FIG. 30A, the second channel coding unit 3018 and the second interleaver and rate matching unit 3020 are shown as a plurality of blocks to represent that channel coding/interleaving/rate matching operations are performed for each code block. It can be understood that a plurality of circuits is present in parallel or one circuit performs channel coding/interleaving/rate matching operations repeatedly or in parallel.

The TAC mapper 3022 determines an antenna combination to be used to transmit the modulation symbols based on the bits of the channel-coded first part, and provides the result of determination to the GSM modulator 3028. The serial-to-parallel converter 3024 parallelizes bits of the channel-coded second part. The plurality of modulation mappers 3026-1 to 3026-$N_a$ generates modulation symbols according to the constellation. The GSM modulator 3028 forms a GSM symbol such that modulation symbols output from the plurality of modulation mappers 3026-1 to 3026-$N_a$ are transmitted through at least one transmit antenna determined by the TAC mapper 3022. The modulation symbols mapped to antennas are transmitted through $N_a$ antennas determined by the TAC mapper 3022 among $N_t$ transmit antennas after processing such as analog conversion, RF conversion, and amplification.

In FIG. 30A, the first channel coding unit 3014 channel-codes at least one code block assigned to the TAC, and the second channel coding unit 3018 channel-codes at least one code block assigned to the modulation symbols. do. In this case, coding schemes applied to code blocks carried by the TAC and code blocks carried by the modulation symbols may be different from each other. For example, the first channel coding unit 3014 may use a turbo code, and the second channel coding unit 3018 may use a low density parity check (LDPC) code.

Figure 30B:
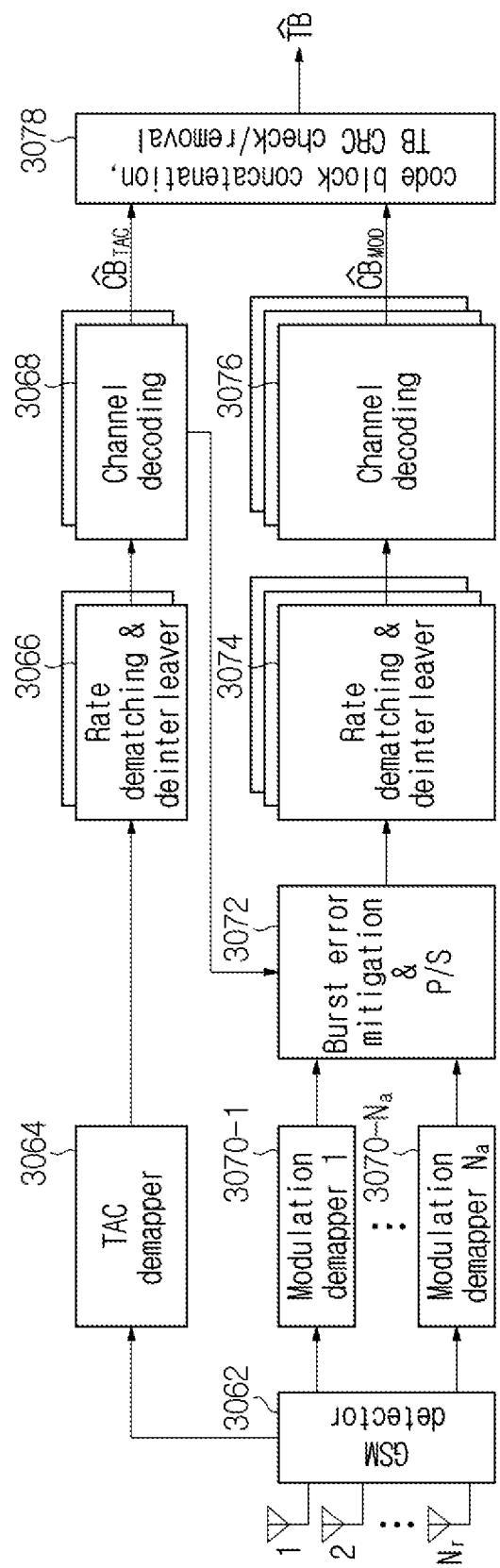
FIG. 30B is a diagram showing a structure of a receiver for a first code block assignment method applicable to the present disclosure.

FIG. 30B is a diagram showing a structure of a receiver for a first code block assignment method applicable to the present disclosure.

Referring to FIG. 30B, the receiver includes a GSM detector 3062, a TAC demapper 3064, a first rate dematching and deinterleaver 3066, and a first channel decoding unit 3068, a plurality of modulation demappers 3070-1 to 3070-$N_a$, a burst error mitigation and parallel-to-serial (P/S) converter 3072, a second rate dematching and deinterleaver 3074, a second channel decoding unit 3076, and a code block (CB) concatenation and transport block CRC check/removal unit 3078.

The GSM detector 3062 detects GSM symbols received through $N_r$ antennas. That is, the GSM detector 3062 identifies at least one antenna used by the transmitter to transmit the modulation symbols and detects the modulation symbols. The TAC demapper 3064 estimates bits corresponding to the transmit antenna combination detected by the GSM detector 3062.

The first rate dematching and deinterleaver 3066 performs rate dematching on bits output from the TAC demapper 3064, and deinterleaves the dematched bits according to a set rule. Here, deinterleaving corresponds to interleaving performed by the interleaver and rate matching unit 3016 of FIG. 30A. The first channel decoding unit 3068 performs channel decoding on deinterleaved bits according to a set coding rate and code. Also, the first channel decoding unit 3068 may perform CRC check using the CRC attached to each code block. In this case, the bit input to the first channel decoding unit 3068 may be a hard decision bit or may include a log-likelihood ratio (LLR) or other type of soft decision value.

The plurality of modulation demappers 3070-1 to 3070-$N_a$ estimates bits corresponding to the modulation symbols detected by the GSM detector 3062 according to the constellation. The burst error mitigation and P/S converter 3072 serializes bits after performing burst error mitigation processing based on a channel decoding result for at least one code block assigned to the TAC. Processing for mitigating burst error may be performed based on the TAC by the GSM detector 3062 and the TAC derived from the channel decoding result. According to an embodiment, when the TAC by the GSM detector 3062 and the TAC derived from the channel decoding result are different, the burst error mitigation and P/S converter 3072 may change the position of some of the bits obtained from the modulation symbols and set the other bits to erasure (E) bits. Here, the erase bit is a bit whose received value is unknown, and may be treated as a bit in which the probability of 0 and the probability of 1 are the same.

The second rate dematching and deinterleaver 3074 performs rate dematching on the bits output from the burst error mitigation and P/S converter 3072, and deinterleaves the dematched bits according to a set rule. Here, deinterleaving corresponds to interleaving performed by the second interleaver and rate matching unit 3020 of FIG. 30A. The second channel decoding unit 3076 performs channel decoding on deinterleaved bits according to a set coding rate and code. In addition, the second channel decoding unit 3076 may perform CRC check using the CRC attached to each code block. In this case, the bit input to the second channel decoding unit 3076 may be a hard decision bit or may include a log-likelihood ratio (LLR) or other type of soft decision value.

The CB concatenation and transport block CRC check/removal unit 3078 concatenates the channel-decoded code blocks provided from the first channel decoding unit 3068 and the second channel decoding unit 3076 to form a transport block, and perform CRC check using CRC attached to the transport block. A CRC check result by the first channel decoding unit 3068, the second channel decoding unit 3076, or the CB concatenation and transport block CRC check/removal unit 3078 may be used to generate ACK/NACK information to be fed back to the transmitter.

Figure 31:
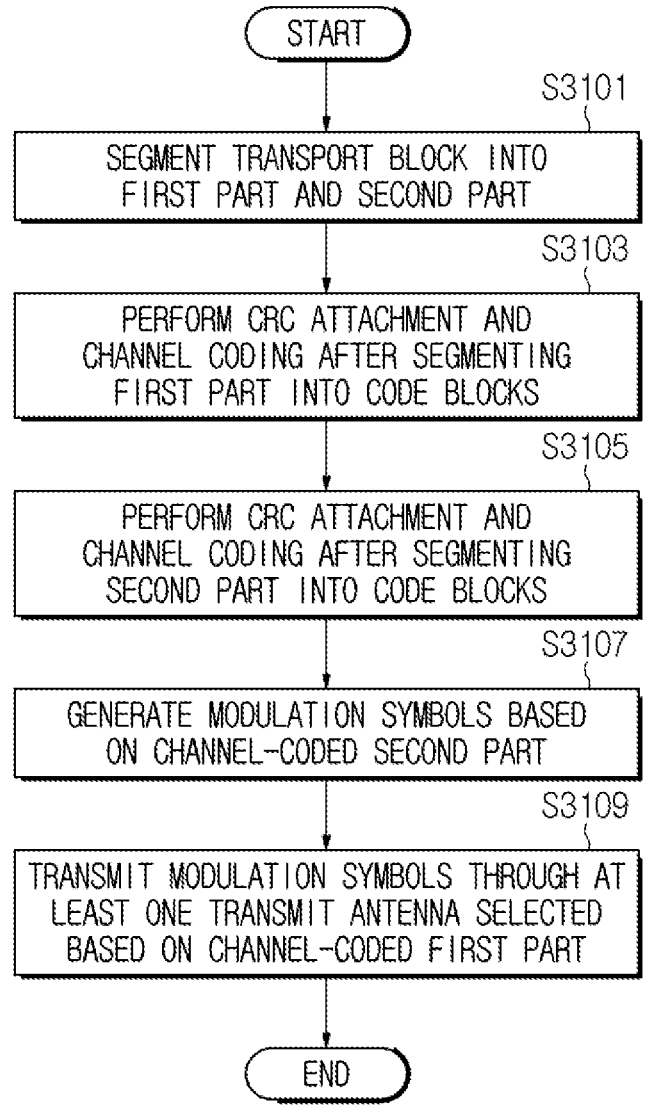
FIG. 31 is a diagram illustrating an embodiment of a procedure for transmitting a signal according to a first code block assignment method in an apparatus applicable to the present disclosure.

FIG. 31 is a diagram illustrating an embodiment of a procedure for transmitting a signal according to a first code block assignment method in a device applicable to the present disclosure. FIG. 31 illustrates a method of operating a device including a transmitter (e.g., the transmitter 2310 of FIG. 23, the transmitter of FIG. 26A, or the transmitter of FIG. 30A). In the following description, the operating subject of FIG. 31 is referred to as an 'device', but may be referred to as a transmission end, a transmission device, a transmitter, or other terms having equivalent technical meaning.

Referring to FIG. 31, in step S3101, the device segments the transport block into a first part and a second part. The segmented first and second parts are then processed as separate code blocks.

In step S3103, the device segments the first part into code blocks, and performs CRC attachment for each code block and channel coding. Additionally, the device may further perform at least one of interleaving or rate matching.

In step S3105, the device segments the second part into code blocks, and performs CRC attachment for each code block and channel coding. Additionally, the device may further perform at least one of interleaving or rate matching.

In step S3107, the device generates modulation symbols based on the channel-coded second part. In other words, the device generates modulation symbols corresponding to the value of the channel-coded second part based on a constellation according to a set modulation order. In this case, the number of modulation symbols may be equal to the number of antennas included in the selected TAC.

In step S3109, the device transmits modulation symbols through at least one transmit antenna selected based on the channel-coded first part. That is, the device selects at least one transmit antenna based on the channel-coded first part. In addition, the device transmits modulation symbols generated based on the channel-coded second part through the selected at least one transmit antenna.

Figure 32:
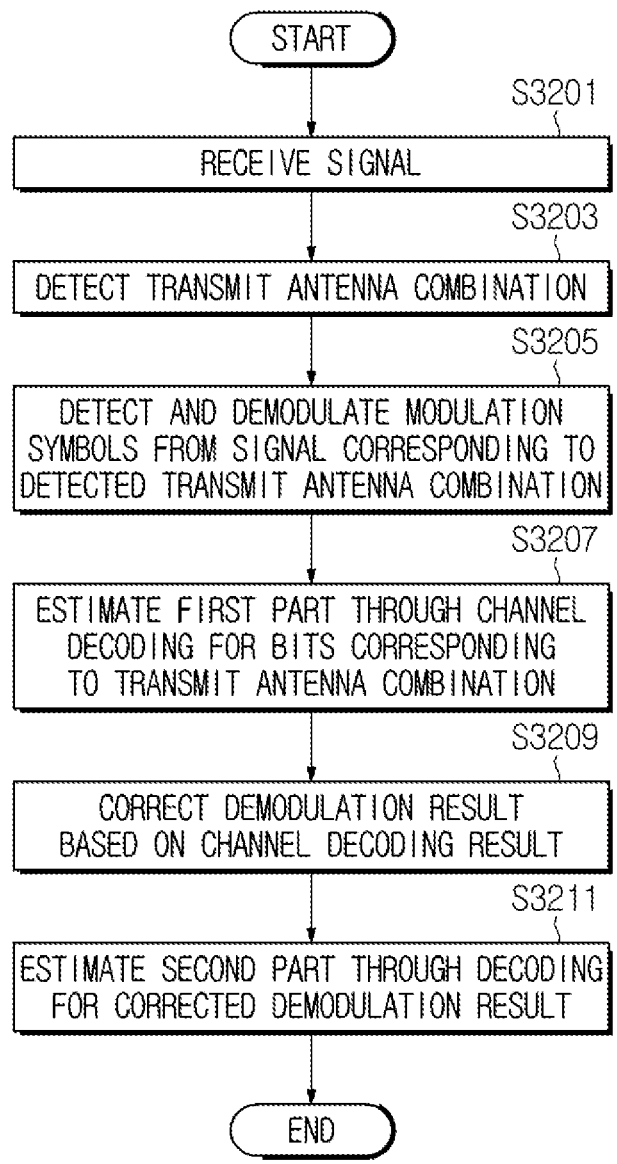
FIG. 32 is a diagram illustrating an embodiment of a procedure for receiving a signal according to a first code block assignment method in an apparatus applicable to the present disclosure.

FIG. 32 is a diagram illustrating an embodiment of a procedure for receiving a signal according to a first code block assignment method in a device applicable to the present disclosure. FIG. 32 illustrates a method of operating a device including a receiver (e.g., the receiver 2360 of FIG. 23, the receiver of FIG. 26B, or the receiver of FIG. 30B). In the following description, the operating subject of FIG. 32 is referred to as an 'device', but may be referred to as a reception end, a reception device, a receiver, or other terms having equivalent technical meaning.

Referring to FIG. 32, in step S3201, the device receives a signal. The device may generate the received signal on the premise that signals are transmitted through all transmit antennas available in the counterpart device. The received signal is a vector or matrix of signals, and may include signals for each transmit antenna of the counterpart device. In this case, at least one signal corresponding to some antennas may include only noise.

In step S3203, the device detects a transmit antenna combination. The device may detect the transmit antenna combination based on the received signal. Among the signals for each antenna included in the received signal, a signal corresponding to an antenna that did not transmit the signal in the counterpart device may have a lower energy value than a signal corresponding to an antenna that transmitted a signal. Accordingly, the device may identify at least one antenna that transmitted a signal, that is, a transmit antenna combination, based on the energy level of signals for each transmit antenna included in the received signal.

In step S3205, the device detects modulation symbols corresponding to the detected transmit antenna combination and performs demodulation. The device may detect modulation symbols corresponding to at least one antenna belonging to a transmit antenna combination from the received signal by performing MIMO detection operation. In addition, the device estimates a second part of transmission bits corresponding to the modulation symbols by demodulating the detected modulation symbols.

In step S3207, the device estimates a first part through channel decoding for bits corresponding to the transmit antenna combination. The first part is bits corresponding to the TAC among original bits and may include at least one code block. Additionally, prior to channel decoding, the device may further perform at least one of rate dematching or deinterleaving. By channel decoding, detection errors for the transmit antenna combination may be corrected.

In step S3209, the device corrects the demodulation result based on the channel decoding result. For example, when it is identified by secondary channel decoding operation that there is an error in the transmit antenna combination detected in step S3203, this means that modulation symbols are detected from a signal corresponding to an antenna that did not transmit the signal, that is, from noise. Thus, the device may remove at least one bit corresponding to the detected modulation symbols from the noise. In addition, presence of an error in the transmit antenna combination means that the order of the modulation symbols detected from the signal corresponding to the antenna that transmitted the signal, that is, the existing signal, is incorrect. Thus, if necessary, the device may change the position of at least one bit corresponding to the modulation symbol detected from the existing signal. In addition, presence of an error in the transmit antenna combination means that the modulation symbol is not detected from the signal corresponding to at least one antenna that transmitted the signal, that is, the existing signal. Accordingly, the device may add at least one erase bit as needed. However, if there is no error in the transmit antenna combination detected in step S3203, step S3209 may be omitted.

In step S3211, the device estimates the second part through channel decoding for the corrected demodulation result. The second part is bits corresponding to modulation symbols among original bits, and may include at least one code block. Additionally, prior to channel decoding, the device may further perform at least one of rate dematching or deinterleaving.

Figure 33A:
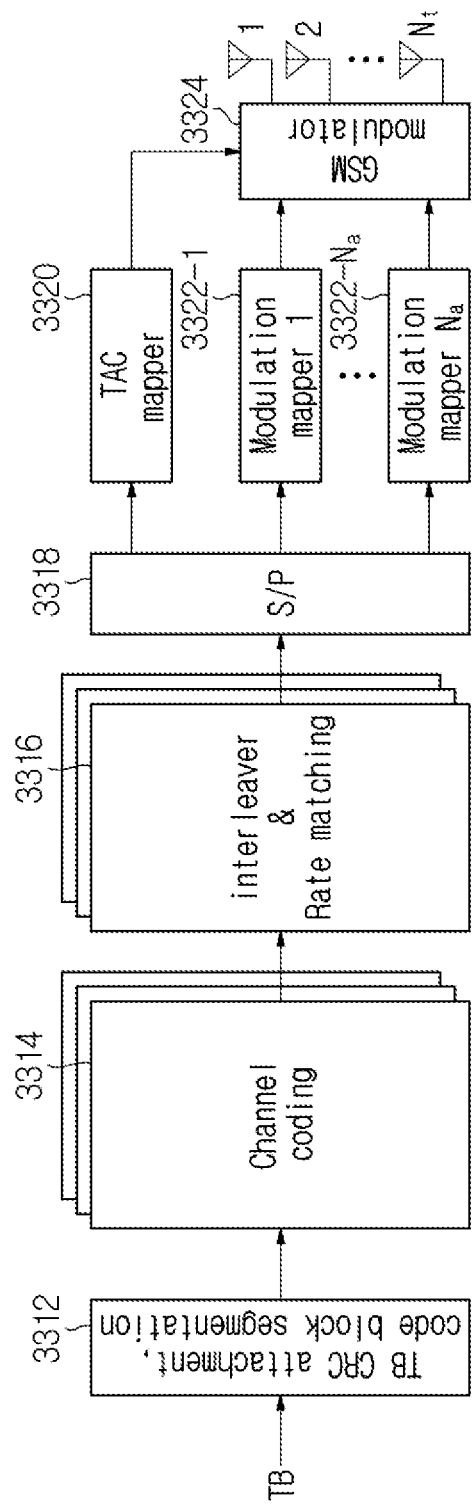
FIG. 33A is a diagram showing a structure of a transmitter for a second code block assignment method applicable to the present disclosure.

FIG. 33A is a diagram showing a structure of a transmitter for a second code block assignment method applicable to the present disclosure.

Referring to FIG. 33A, the transmitter includes a transport block CRC attachment and code block segmentation unit 3312, a channel coding unit 3314, an interleaver and rate matching unit 3316, a serial-to-parallel (SP) converter 3318, a TAC mapper 3320, a plurality of modulation mapper 3322-1 to 3322-$N_a$, and a GSM modulator 3324.

The transport block CRC attachment and code block segmentation unit 3312 attaches CRC to a transport block and segments the CRC-attached transport block into a plurality of code blocks. For example, the transport block CRC attachment and code block segmentation unit 3312 receives data having a size of one transport block (e.g., $K_{TB,data}$) from a higher layer and attaches CRC to form a transport block. In addition, the transport block CRC attachment and code block segmentation unit 3312 segments the transport block into at least one code block. In this case, each code block may include bits to be carried by the TAC and bits to be carried by the modulation symbols.

The channel coding unit 3314 performs channel coding on at least one code block (e.g., one code block or $N_{CB}$ code blocks) output from the transport block CRC attachment and code block segmentation unit 3312. At this time, when a plurality of code blocks is provided, the channel coding unit 3314 attaches CRC to each of the code blocks and then performs channel coding on the CRC-attached code blocks. The interleaver and rate matching unit 3316 interleaves bits in at least one channel-coded code block according to a set rule and performs rate matching. For example, the first interleaver and rate matching unit 3316 may repeat or shorten/puncture some of the interleaved bits. In FIG. 33A, the channel coding unit 3314 and the interleaver and rate matching unit 3316 are shown as a plurality of blocks to represent that channel coding/interleaving/rate matching operations are performed for each code block. It can be understood that a plurality of circuits is present in parallel or one circuit performs channel coding/interleaving/rate matching operations repeatedly or in parallel.

The S/P converter 3318 parallelizes input bits. Some of the parallelized bits are provided to the TAC mapper 3320 and the remaining bits are provided to the plurality of modulation mappers 3322-1 to 3322-$N_a$. The TAC mapper 3320 determines an antenna combination to be used to transmit modulation symbols based on the bits output from the S/P converter 3318, and provides the determination result to the GSM modulator 3324. The plurality of modulation mappers 3322-1 to 3322-$N_a$ generates modulation symbols according to a constellation based on bits output from the S/P converter 3318. The GSM modulator 3324 forms a GSM symbol such that the modulation symbols output from the plurality of modulation mappers 3322-1 to 3322-$N_a$ are transmitted through at least one transmit antenna determined by the TAC mapper 3320. The modulation symbols mapped to the antennas are transmitted through $N_a$ antennas determined by the TAC mapper 3320 among $N_t$ transmit antennas after processing such as analog conversion, RF conversion, and amplification.

Figure 33B:
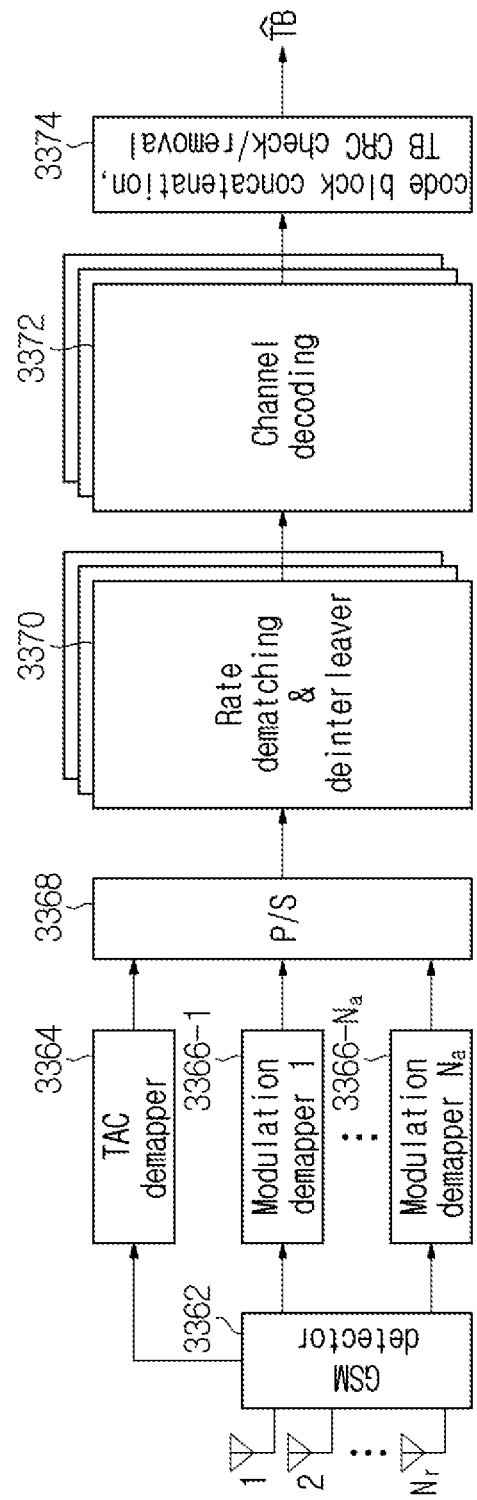
FIG. 33B is a diagram showing a structure of a receiver for a second code block assignment method applicable to the present disclosure.

FIG. 33B is a diagram showing a structure of a receiver for a second code block assignment method applicable to the present disclosure.

Referring to FIG. 33B, the receiver includes a GSM detector 3362, a TAC demapper 3364, a plurality of modulation demappers 3366-1 to 3366-$N_a$, a parallel-to-serial converter 3368, a rate dematching and deinterleaver 3370, a channel decoding unit 3372, and a code block concatenation and transport block CRC check/removal unit 3374.

The GSM detector 3362 detects GSM symbols received through $N_r$ antennas. That is, the GSM detector 3362 identifies at least one antenna used by the transmitter to transmit modulation symbols and detects the modulation symbols. The TAC demapper 3364 estimates bits corresponding to the transmit antenna combination detected by the GSM detector 3362. The plurality of modulation demappers 3366-1 to 3366-$N_a$ outputs bits corresponding to modulation symbols detected by the GSM detector 3362 according to the constellation. The parallel-to-serial converter 3368 serializes input bits.

The bit rate dematching and deinterleaver 3370 performs bit rate dematching on the bits output from the parallel-to-serial converter 3368, and de-interleaves the dematched bits according to a set rule. Here, deinterleaving corresponds to interleaving performed by the interleaver and rate matching unit 3316 of FIG. 33A. The channel decoding unit 3372 performs channel decoding on the deinterleaved bits according to a set coding rate and code. Also, when the number of code blocks is two or more, the channel decoding unit 3372 may perform CRC check using CRC attached to each code block. In this case, the bit input to the channel decoding unit 3372 may be a hard decision bit or may include a log-likelihood ratio (LLR) or other type of soft decision value.

The code block concatenation and transport block CRC check/removal unit 3374 concatenates the channel-decoded code blocks provided from the channel decoding unit 3372 to form a transport block, and performs CRC check using the CRC attached to the transport block. The CRC check result by the channel decoding unit 3372 or the code block concatenation and transport block CRC check/removal unit 3374 may be used to generate ACK/NACK information to be fed back to the transmitter.

Figure 34:
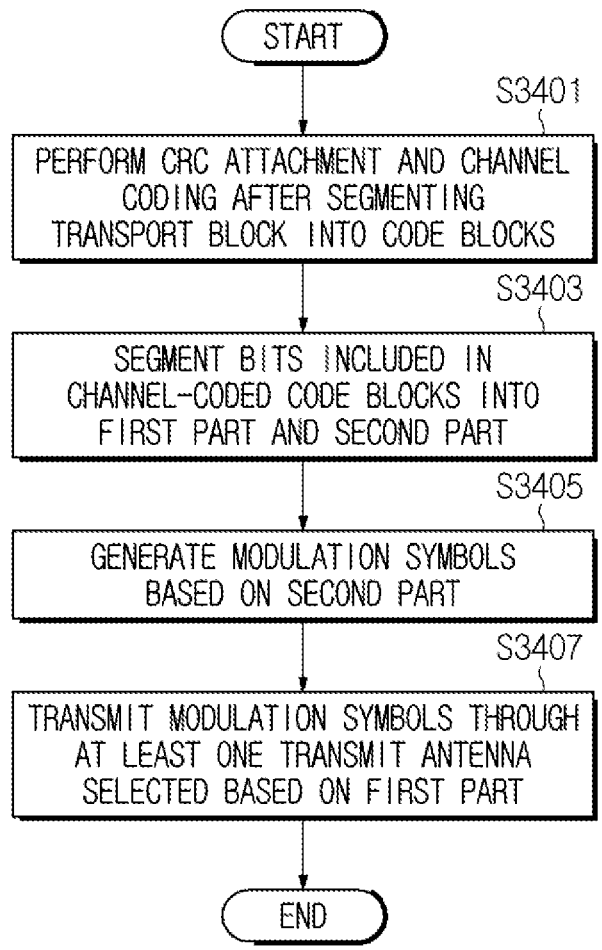
FIG. 34 is a diagram illustrating an embodiment of a procedure for transmitting a signal according to a second code block assignment method in an apparatus applicable to the present disclosure.

FIG. 34 is a diagram illustrating an embodiment of a procedure for transmitting a signal according to a second code block assignment method in a device applicable to the present disclosure. FIG. 34 illustrates a method of operating a device including a transmitter (e.g., the transmitter 2340 of FIG. 23, the transmitter of FIG. 26A, or the transmitter of FIG. 33A). In the following description, the operating subject of FIG. 34 is referred to as an 'device', but may be referred to as a transmission end, a transmission device, a transmitter, or other terms having equivalent technical meaning.

Referring to FIG. 34, in step S3401, the device segments the transport block into code blocks, and performs CRC attachment for each code block and channel coding. However, when only one code block is generated from the transport block, operation for attaching CRC may be omitted. Additionally, the device may further perform at least one of interleaving or rate matching.

In step S3401, the device segments bits included in the channel-coded transport blocks into a first part and a second part. At this time, each code block may be segmented into a first part and a second part.

In step S3405, the device generates modulation symbols based on the second part. In other words, the device generates modulation symbols corresponding to the value of the second part based on a constellation according to a set modulation order. In this case, the number of modulation symbols may be equal to the number of antennas included in the selected TAC.

In step S3407, the device transmits modulation symbols through at least one transmit antenna selected based on the first part. That is, the device selects at least one transmit antenna based on the first part. And, the device transmits the modulation symbols generated based on the second part through the selected at least one transmit antenna.

Figure 35:
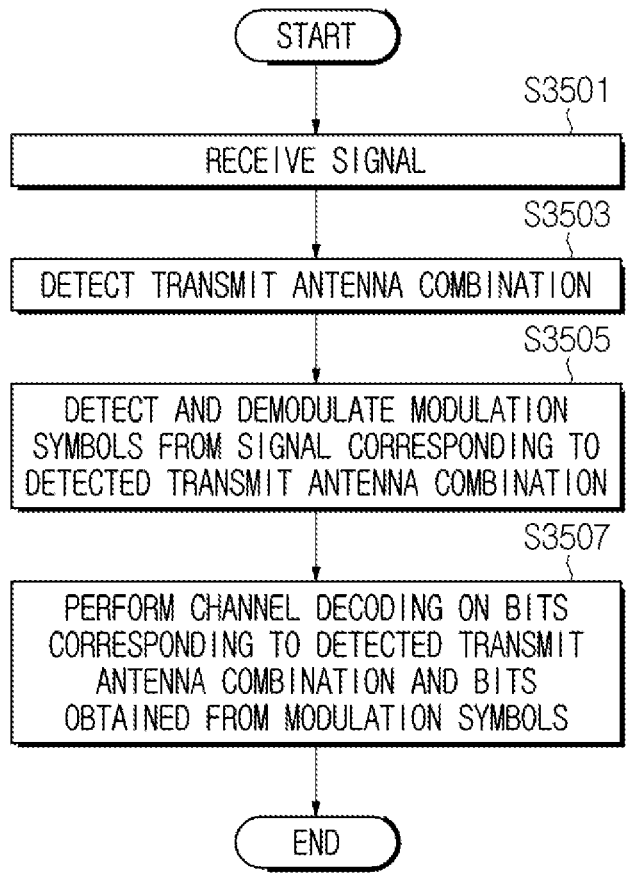
FIG. 35 is a diagram illustrating an embodiment of a procedure for receiving a signal according to a second code block assignment method in an apparatus applicable to the present disclosure.

FIG. 35 is a diagram illustrating an embodiment of a procedure for receiving a signal according to a second code block assignment method in a device applicable to the present disclosure. FIG. 35 illustrates a method of operating a device including a receiver (e.g., the receiver 2360 of FIG. 23, the receiver of FIG. 26B, or the receiver of FIG. 33B). In the following description, the operating subject of FIG. 32 is referred to as an 'device', but may be referred to as a reception end, a reception device, a receiver, or other terms having equivalent technical meaning.

Referring to FIG. 35, in step S3501, the device receives a signal. The device may generate the received signal on the premise that signals are transmitted through all transmit antennas available in the counterpart device. The received signal is a vector or matrix of signals, and may include signals for each transmit antenna of the counterpart device. In this case, at least one signal corresponding to some antennas may include only noise.

In step S3503, the device detects a transmit antenna combination. The device may detect the transmit antenna combination based on the received signal. Among the signals for each antenna included in the received signal, a signal corresponding to an antenna that did not transmit the signal in the counterpart device may have a lower energy value than a signal corresponding to an antenna that transmitted a signal. Accordingly, the device may identify at least one antenna that transmitted a signal, that is, a transmit antenna combination, based on the energy level of signals for each transmit antenna included in the received signal.

In step S3505, the device detects modulation symbols corresponding to the detected transmit antenna combination and performs demodulation. The device may detect a modulation symbol corresponding to at least one antenna belonging to the transmit antenna combination from the received signal by performing MIMO detection operation. In addition, the device estimates a second part of transmission bits corresponding to the modulation symbols by demodulating the detected modulation symbols.

In step S3507, the device performs channel decoding on bits corresponding to the transmit antenna combination and bits obtained from the modulation symbols. Through this, the device may reconstruct the original bits included in the transport block. Additionally, prior to channel decoding, the device may further perform at least one of rate dematching or deinterleaving.

As described above, the transport block may be transmitted according to the first code block assignment method or the second code block assignment method. To this end, a MCS level is determined based on channel quality, and it may be determined whether at least one code block may be assigned to each of the TAC and symbols based on the determined MCS level.

When the transport block is transmitted according to the first code block assignment method or the second code block assignment method, retransmission may be performed according to the decoding and CRC check result at the receiver. When an error is detected in all or part of the transport block, the receiver may transmit ACK/NACK information to the transmitter. When an error occurs in all code blocks, the transport block is transmitted again in the same way as the initial transmission. At this time, when IR is applied, a redundancy version (RV) different from initial transmission may be used.

When an error occurs in some code blocks, a code block initially transmitted is maintained, and a code block to be retransmitted is transmitted along with both the TAC and modulation symbols. When the first code block assignment method is used in the initial transmission (e.g., transmission according to the structure shown in FIG. 30A), the code blocks to be retransmitted may be sequentially transmitted using both the TAC and modulation symbols. On the other hand, when the second code block assignment method is used in the initial transmission (e.g., transmission according to the structure shown in FIG. 33A), the code blocks to be retransmitted may be sequentially transmitted using both the TAC and modulation symbols, similarly to the initial transmission. That is, when an error occurs for some code blocks, regardless of the code block assignment method used in initial transmission, channel-coded coding blocks are transmitted using both the TAC and modulation symbols.

Structures of a transmitter for performing retransmission and a receiver for receiving retransmitted data when the first code block assignment method is used during initial transmission will be described below with reference to FIGS. 36A and 36B.

Figure 36A:
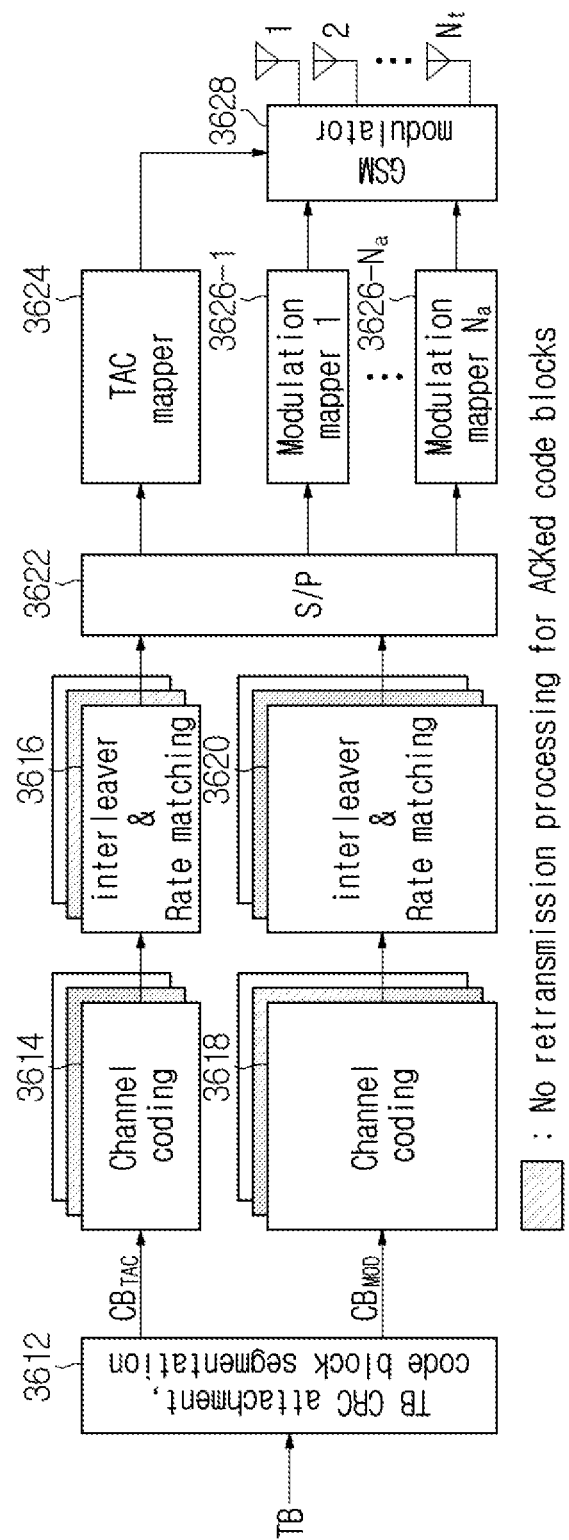
FIG. 36A is a diagram illustrating a structure for retransmitting data according to a first code block assignment method of a transmitter using a GSM technique applicable to the present disclosure.

FIG. 36A is a diagram illustrating a structure for retransmitting data according to a first code block assignment method of a transmitter using a GSM technique applicable to the present disclosure. FIG. 36A illustrates a structure of a transmitter for performing retransmission of some code blocks after initial transmission is performed according to the first code block assignment method.

Referring to FIG. 36A, the transmitter includes a transport block CRC attachment and code block segmentation unit 3612, a first channel coding unit 3614, a first interleaver and rate matching unit 3616, a second channel coding unit 3618, a second interleaver and rate matching unit 3620, a serial-to-parallel converter 3622, a TAC mapper 3624, a plurality of modulation mappers 3626-1 to 3626-$N_a$, and a GSM modulator 3628.

The transport block CRC attachment and code block segmentation unit 3612 attaches CRC to a transport block and segments the CRC-attached transport block into a plurality of code blocks. For example, the transport block CRC attachment and code block segmentation unit 3612 forms a transport block by attaching CRC to data having the size of one transport block (e.g., $K_{TB,data}$). At this time, the transport block includes a code block that has been successfully received by the receiver and a code block that has failed to be received. In addition, the transport block CRC attachment and code block segmentation unit 3612 segments the transport block into a first part and a second part in the same way as in initial transmission.

The first channel coding unit 3614 attaches CRC to at least one code block that has failed to be received by the receiver among the code blocks output from the transport block CRC attachment and code block segmentation unit 3612, and performs channel coding on at least one CRC-attached code block. That is, when there is at least one successfully received code block, the at least one successfully received code block is not channel-coded. The first interleaver and rate matching unit 3616 interleaves bits in at least one channel-coded code block according to a set rule and performs rate matching by performing at least one of repetition, shortening or puncturing. In performing rate matching, when IR is applied, bits different from bits transmitted in a previous transmission (e.g., initial transmission or subsequent retransmission) may be selected.

The second channel coding unit 3618 attaches CRC to at least one code block that has failed to be received by the receiver among the code blocks output from the transport block CRC attachment and code block segmentation unit 3612, and performs channel coding on at least one CRC-attached code block. That is, when there is at least one successfully received code block, the at least one successfully received code block is not channel-coded. The second interleaver and rate matching unit 3620 interleaves bits in at least one channel-coded code block according to a set rule and performs rate matching by performing at least one of repetition, shortening or puncturing. In performing rate matching, when IR is applied, bits different from bits transmitted in a previous transmission (e.g., initial transmission or subsequent retransmission) may be selected.

The serial-to-parallel converter 3622 segments bits included in the channel-coded code blocks into bits to be carried by the TAC and bits to be carried by the modulation symbols. The TAC mapper 3624 determines an antenna combination to be used to transmit modulation symbols based on the bits output from the serial-to-parallel converter 3622, and provides the determination result to the GSM modulator 3628. The plurality of modulation mappers 3626-1 to 3626-$N_a$ generates modulation symbols according to a constellation. The GSM modulator 3628 forms a GSM symbol so that the modulation symbols output from the plurality of modulation mappers 3626-1 to 3626-$N_a$ are transmitted through at least one transmit antenna determined by the TAC mapper 3624. The modulation symbols mapped to the antennas are transmitted through $N_a$ antennas determined by the TAC mapper 3624 among $N_t$ transmit antennas after processing such as analog conversion, RF conversion, and amplification.

Figure 36B:
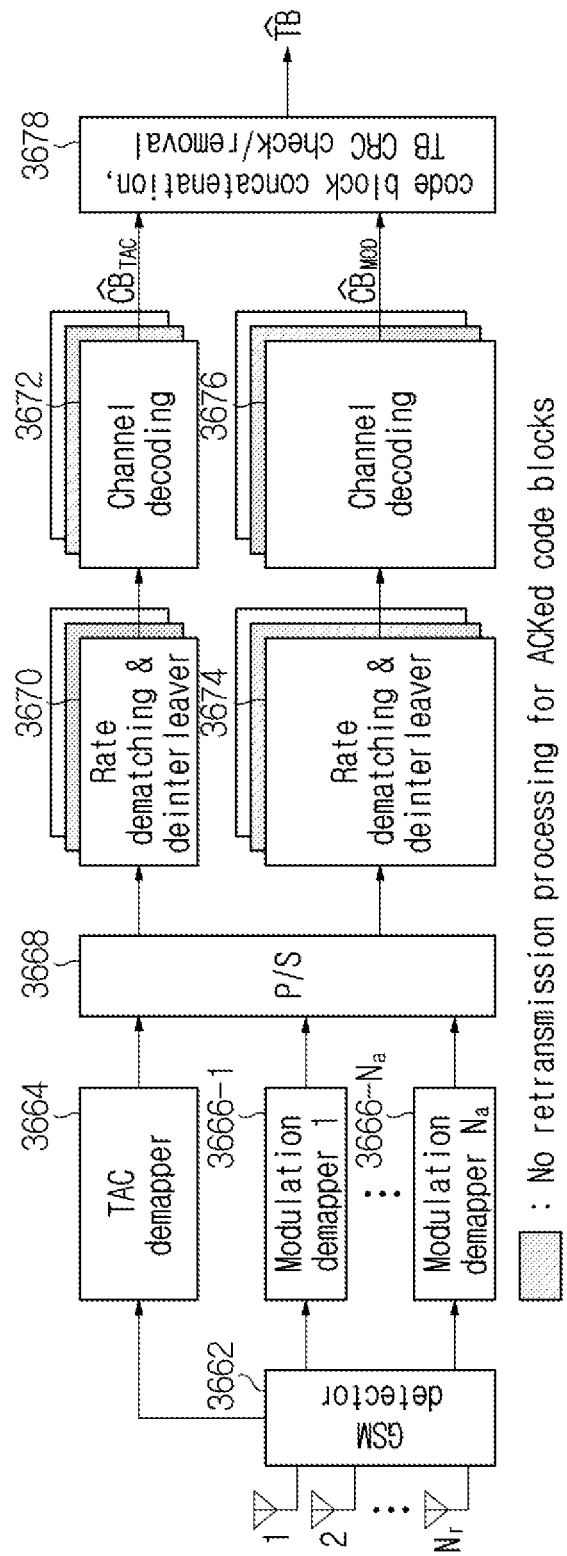
FIG. 36B is a diagram showing a structure for receiving data retransmitted according to a first code block assignment method of a receiver using a GSM technique applicable to the present disclosure.

FIG. 36B is a diagram showing a structure for receiving data retransmitted according to a first code block assignment method of a receiver using a GSM technique applicable to the present disclosure. FIG. 36B illustrates a structure of a receiver for receiving some retransmitted code blocks after initial transmission is performed according to the first code block assignment method.

Referring to FIG. 36B, the receiver includes a GSM detector 3662, a TAC demapper 3664, a plurality of modulation demappers 3666-1 to 3666-$N_a$, a parallel-to-serial converter 3668, and a first rate dematching and deinterleaver 3670, a first channel decoding unit 3672, a second rate dematching and deinterleaver 3674, a second channel decoding unit 3676, a code block concatenation and transport block CRC check/removal unit 3678.

The GSM detector 3662 detects GSM symbols received through $N_r$ antennas. That is, the GSM detector 3662 identifies at least one antenna used by the transmitter to transmit modulation symbols and detects the modulation symbols. The TAC demapper 3664 estimates bits corresponding to the transmit antenna combination detected by the GSM detector 3662. The plurality of modulation demappers 3666-1 to 3666-$N_a$ outputs bits corresponding to the modulation symbols detected by the GSM detector 3662 according to the constellation. The parallel-to-serial converter 3668 serializes input bits.

The first rate dematching and deinterleaver 3670 performs rate dematching on the bits output from the parallel-to-serial converter 3668 and deinterleaves the dematched bits according to a set rule. The deinterleaved bits are combined with previously received bits, and the combined bits are hard decision bits or include log-likelihood ratio (LLR) or other forms of soft decision values. The first channel decoding unit 3672 performs channel decoding on bits obtained by combining previously received bits and deinterleaved bits according to a set coding rate and code. Also, the first channel decoding unit 3672 may perform CRC check using the CRC attached to each code block.

The second rate dematching and deinterleaver 3674 performs rate dematching on the bits output from the parallel-to-serial converter 3668, and deinterleaves the dematched bits according to a set rule. Here, deinterleaving corresponds to interleaving performed by the second interleaver and rate matching unit 3620 of FIG. 36A. The deinterleaved bits are combined with previously received bits, and the combined bits may be hard decision bits or include a log-likelihood ratio (LLR) or other form of soft decision value. The second channel decoding unit 3676 performs channel decoding on bits obtained by combining previously received bits and deinterleaved bits according to a set coding rate and code. Also, the second channel decoding unit 3676 may perform CRC check using the CRC attached to each code block.

The code block concatenation and transport block CRC checking/removal unit 3678 concatenates the previously successfully received coding blocks and the channel-coded code blocks provided from the first channel decoding unit 3672 and the second channel decoding unit 3676 to form a transport block, and performs CRC check using CRC attached to the transport block. The CRC check result by the first channel decoding unit 3672, the second channel decoding unit 3676 or the code block concatenation and transport block CRC check/removal unit 3678 may be used to generate ACK/NACK information to be fed back to the transmitter.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

What is claimed is:

1. A method of operating a user equipment (UE) in a wireless communication system, the method comprising:
   receiving a reference signal from a base station;
   generating channel information based on the reference signal;
   transmitting the channel information to the base station;
   receiving a signal including a channel-coded transport block according to at least one coding rate and modulation order determined based on the channel information;
   obtaining a first part of the channel-coded transport block by detecting a transmit antenna combination (TAC); and
   obtaining a second part of the channel-coded transport block by demodulating modulation symbols of the signal,
   wherein the channel information comprises first information related to first channel quality for the TAC, second information related to second channel quality for the modulation symbols, and third information related to third channel quality for modulation symbols which are affected by a TAC detection error.

2. The method of claim 1, wherein the third information comprises an offset between the second channel quality and the third channel quality.

3. The method of claim 1, further comprising transmitting the channel information to the base station.

4. The method of claim 1, further comprising transmitting information related to the at least one coding rate and modulation order to the base station.

5. The method of claim 1, further comprising receiving information related to the at least one coding rate and modulation order from the base station.

6. A user equipment (UE) in a wireless communication system, the UE comprising:
   a transceiver; and
   a processor coupled to the transceiver and configured to:
   receive a reference signal from a base station;
   generate channel information based on the reference signal;
   transmit the channel information to the base station;
   receive a signal including a channel-coded transport block according to at least one coding rate and modulation order determined based on the channel information;
   obtain a first part of the channel-coded transport block by detecting a transmit antenna combination (TAC); and
   obtain a second part of channel-coded transport block by demodulating modulation symbols of the signal,
   wherein the channel information comprises first information related to first channel quality for the TAC, second information related to second channel quality for the modulation symbols, and third information related to third channel quality for modulation symbols which are affected by a TAC detection error.

7. The UE of claim 6, wherein the third information comprises an offset between the second channel quality and the third channel quality.

8. The UE of claim 6, wherein the processor is further configured to:
   transmit the channel information to the base station.

9. The UE of claim 6, wherein the processor is further configured to:
   transmit information related to the at least one coding rate and modulation order to the base station.

10. The UE of claim 6, wherein the processor is further configured to:
    receive information related to the at least one coding rate and modulation order from the base station.

11. A base station in a wireless communication system, the base station comprising:
    a transceiver; and
    a processor coupled to the transceiver and configured to:
    transmit a reference signal to a user equipment (UE);
    receive the channel information from the UE;
    determine at least one coding rate and modulation order based on the channel information generated based on the reference signal;
    perform channel-coding a transport block according to the at least one coding rate and modulation order; and
    transmit at least one modulation symbol generated based on a second part of the transport block to the UE through a transmit antenna combination (TAC) determined based on a first part of the channel-coded transport block,
    wherein the channel information comprises first information related to first channel quality for the TAC, second information related to second channel quality for the modulation symbols, and third information related to third channel quality for modulation symbols which are affected by a TAC detection error.

12. The base station of claim 11, wherein the third information comprises an offset between the second channel quality and the third channel quality.

13. The base station of claim 11, wherein the at least one coding rate and modulation order comprise a first coding rate applied to at least one code block assigned to the TAC and a modulation order and second coding rate applied to at least one code block assigned to the modulation symbols,
    wherein the transport block comprises a first code block that is channel-coded according to the first coding rate and a second code block that is channel-coded according to the second coding rate,
wherein the channel-coded first code block is carried by the TAC, and
wherein the channel-coded second code block is modulated according to the modulation order and then carried by the modulation symbols.

14. The base station of claim 11, wherein the at least one coding rate and modulation order comprise a coding rate applied to bits to be carried by the TAC and the modulation symbols and a modulation order applied to bits to be carried by the modulation symbols,
wherein the transport block comprises a code block that is channel-coded according to the coding rate, and
wherein the channel-coded code block comprises at least one bit carried by the TAC and at least one bit carried by the modulation symbols.

15. The base station of claim 11, wherein the processor is further configured to:
determine whether at least one code block is able to be assigned to each of the TAC and the modulation symbols based on the first channel quality and the second channel quality;
determine a transport block size based on the first channel quality and the second channel quality in case that at least one code block is assigned to each of the TAC and the modulation symbols; and
determine a transport block size based on the first channel quality and the third channel quality in case that a code block is not assigned to at least one of the TAC or the modulation symbols.

16. The base station of claim 11, wherein the processor is further configured to:
determine a first number of bits before channel coding, which are able to be transmitted through a TAC, and a second number of bits before channel coding, which are able to be transmitted through modulation symbols, based on the first information, the second information and available radio resource;
perform channel-coding code blocks separately assigned to the TAC and the modulation symbols, in case that the first number of bits is greater than or equal to a minimum size of a code block and the second number of bits is greater to or equal to the minimum size of the code block; and
channel-coding code blocks generated without distinction between the TAC and the modulation symbols in case that at least one of the first number of bits or the second number of bits is less than the minimum size of the code block.

17. The base station of claim 11, wherein the processor is further configured to:
identify a retransmission request for all code blocks included in the transport block; and
retransmit the transport block according to a code block assignment method used for initial transmission.

18. The base station of claim 11, wherein the processor is further configured to:
identify a retransmission request for some of code blocks included in the transport block; and
retransmit at least one channel-coded code block using a TAC and modulation symbols.

19. The base station of claim 11, wherein the processor is further configured to:
receive the channel information from the UE.

20. The base station of claim 11, wherein the processor is further configured to:
receive information related to the at least one coding rate and modulation order from the UE.

* * * * *